(12) United States Patent
Shih

(10) Patent No.: US 6,943,224 B2
(45) Date of Patent: Sep. 13, 2005

(54) PROCESS FOR PREPARING SUPPORTED TRANSITION METAL CATALYST SYSTEMS AND CATALYST SYSTEMS PREPARED THEREBY

(75) Inventor: Keng-Yu Shih, Columbia, MD (US)

(73) Assignee: W. R. Grace & Co.-Conn., Columbia, MD (US)

(*) Notice: Subject to any disclaimer, the term of this patent is extended or adjusted under 35 U.S.C. 154(b) by 0 days.

(21) Appl. No.: 10/120,331

(22) Filed: Apr. 10, 2002

(65) Prior Publication Data

US 2003/0224927 A1 Dec. 4, 2003

Related U.S. Application Data

(60) Provisional application No. 60/287,602, filed on Apr. 30, 2001, and provisional application No. 60/287,607, filed on Apr. 30, 2001.

(51) Int. Cl.$^7$ .............................. C08F 4/64; C08F 4/26
(52) U.S. Cl. .................. 526/113; 502/113; 502/120; 502/152; 502/167; 526/129; 526/130; 526/160; 526/172
(58) Field of Search ................ 502/113, 120, 502/152, 167, 112; 526/113, 129, 130, 160, 172

(56) References Cited

U.S. PATENT DOCUMENTS

| | | | |
|---|---|---|---|
| 4,131,452 A | 12/1978 | Collin ............................ | 75/60 |
| 4,176,090 A | 11/1979 | Vaughan et al. ............. | 252/455 |
| 4,216,188 A | 8/1980 | Shabtai et al. ............... | 423/118 |
| 4,238,364 A | 12/1980 | Shabtai ........................ | 252/455 |
| 4,248,739 A | 2/1981 | Vaughan et al. ............. | 252/455 |
| 4,271,043 A | 6/1981 | Vaughan et al. ............. | 252/455 |
| 4,367,163 A | 1/1983 | Pinnavaia et al. ........... | 252/455 |
| 4,375,406 A | 3/1983 | Santilli ........................ | 208/251 |
| 4,629,712 A | 12/1986 | Pinnavaia et al. ............ | 502/63 |
| 4,637,992 A | 1/1987 | Lewis et al. .................. | 502/64 |
| 4,761,391 A | 8/1988 | Occelli ........................ | 502/63 |
| 4,859,648 A | 8/1989 | Landis et al. ................ | 502/242 |
| 4,981,825 A | 1/1991 | Pinnavaia et al. ............ | 502/63 |
| 4,995,964 A | 2/1991 | Gortsema et al. ............ | 208/112 |
| 5,064,802 A | 11/1991 | Stevens et al. .............. | 502/155 |
| 5,225,500 A | 7/1993 | Elder et al. .................. | 526/127 |
| 5,238,892 A | 8/1993 | Chang ........................ | 502/111 |
| 5,241,025 A | 8/1993 | Hlatky et al. ................ | 526/129 |
| 5,243,002 A | 9/1993 | Razavi ........................ | 526/170 |
| 5,250,277 A | 10/1993 | Kresge et al. ............ | 423/329.1 |
| 5,308,811 A | 5/1994 | Suga et al. .................. | 502/62 |
| 5,321,106 A | 6/1994 | LaPointe .................... | 526/126 |
| 5,359,015 A * | 10/1994 | Jejelowo | |
| 5,360,775 A | 11/1994 | Suda et al. .................. | 502/84 |
| 5,362,825 A | 11/1994 | Hawley et al. ............. | 526/125 |
| 5,395,808 A | 3/1995 | Miller et al. .................. | 502/7 |
| 5,399,636 A | 3/1995 | Alt et al. ..................... | 526/129 |
| 5,403,799 A | 4/1995 | Miller et al. ................ | 502/64 |
| 5,403,809 A | 4/1995 | Miller et al. ................ | 502/413 |
| 5,427,991 A | 6/1995 | Turner ........................ | 502/103 |
| 5,541,272 A | 7/1996 | Schmid et al. .............. | 526/160 |
| 5,569,634 A | 10/1996 | Miller et al. ................. | 502/64 |
| 5,624,878 A | 4/1997 | Devore et al. .............. | 502/152 |
| 5,633,419 A | 5/1997 | Spencer et al. ............. | 585/522 |
| 5,643,847 A | 7/1997 | Walzer, Jr. .................. | 502/117 |
| 5,714,424 A | 2/1998 | Warthen et al. ............. | 502/105 |
| 5,753,577 A | 5/1998 | Hamura et al. ............. | 502/113 |
| 5,807,800 A | 9/1998 | Shamshoum et al. ....... | 502/104 |
| 5,807,938 A | 9/1998 | Kaneko et al. ............. | 526/160 |
| 5,817,724 A | 10/1998 | Aoki et al. .................. | 526/127 |

(Continued)

FOREIGN PATENT DOCUMENTS

| | | | |
|---|---|---|---|
| DE | 19943936 | 9/1999 | ............. C08F/4/52 |
| EP | 426637 | 5/1991 | ........... C08F/4/603 |
| EP | 426638 | 5/1991 | ........... C08F/4/602 |
| EP | 490226 | 6/1992 | ............. B01J/2/00 |
| EP | 849288 | 12/1997 | ........... C08F/10/00 |
| EP | 849292 | 6/1998 | ........... C08F/10/00 |
| EP | 874006 | 10/1998 | ........... C08F/10/00 |
| EP | 881232 | 12/1998 | ........... C08F/4/602 |
| EP | 890581 | 1/1999 | ............. C08F/4/64 |
| JP | 2-78663 | 3/1990 | ......... C07D/213/53 |
| JP | 10-338516 | 12/1998 | ........... C01B/33/40 |

(Continued)

OTHER PUBLICATIONS

George J.P. Britovsek, Vernon C. Gibson, and Duncan F. Wass, Agnew. Chem. Int. Ed 1999, vol. 38, pp 428–447 "The Search for New–Generation Olefin Polymerization Catalysts: Life Beyond Metallocenes".

Pasquale Longo, Fabia Grisi, Antonio Proto, Adolfo Zambelli, "New Ni(II) based catalysts in the polymerization of olefins", Macromol. Rapid Commun. 19, 31–34 (1998).

(Continued)

Primary Examiner—Caixia Lu
(74) Attorney, Agent, or Firm—Robert A. Maggio

(57) ABSTRACT

A process for forming a coordination catalyst system comprising sequentially or substantially simultaneously contacting: (I) pre-catalyst reactants comprising (a) at least one first ligand-containing reactant; and (b) at least one first transition metal reactant suitable to form at least one metallocene or constrained geometry pre-catalyst compound (e.g., rac-ethylene bis(indenyl)zirconiUm dichloride); an optionally (c) at least one second ligand-containing reactant and (d) at least one second transition metal reactant suitable to form at least one non-metallocene, non-constrained geometry, bidentate or tridentate transition metal compound (e.g., tridentate 2,6-diacetylpyridine-bis(2,4,6-trimethylanaline) FeCl$_2$) and (II) further contacting, jointly or individually, the pre-catalyst compound(s) and optional bidentate or tridentate compound(s) with at least one support-activator agglomerate (e.g., spray dried silica/clay agglomerate). When individually contacted, the supported catalyst components can be mixed or blended. The resulting transition metal catalyst systems are suitable for addition polymerization of unsaturated monomers, e.g., ethylene and propylene.

43 Claims, No Drawings

U.S. PATENT DOCUMENTS

| | | | |
|---|---|---|---|
| 5,830,820 A | 11/1998 | Yano et al. .................... | 502/62 |
| 5,866,663 A | 2/1999 | Brookhart et al. .......... | 526/170 |
| 5,880,241 A | 3/1999 | Brookhart .................... | 526/348 |
| 5,880,323 A | 3/1999 | Brookhart, III et al. .... | 585/527 |
| 5,886,224 A | 3/1999 | Brookhart et al. .......... | 564/272 |
| 5,891,963 A | 4/1999 | Brookhart et al. ....... | 525/326.1 |
| 5,928,982 A | 7/1999 | Suga et al. .................. | 502/118 |
| 5,955,555 A | 9/1999 | Bennett ....................... | 526/133 |
| 5,973,084 A | 10/1999 | Suga et al. .................. | 526/129 |
| 6,110,858 A | 8/2000 | Kaneko et al. ................ | 502/62 |
| 6,184,171 B1 | 2/2001 | Shih ........................... | 502/158 |
| 6,399,535 B1 | 6/2002 | Shih et al. ................... | 502/167 |
| 6,559,090 B1 * | 5/2003 | Shih et al. | |

FOREIGN PATENT DOCUMENTS

| | | | |
|---|---|---|---|
| JP | 11-292912 | 3/2000 | ............ C08F/4/52 |
| WO | WO 91/14713 | 10/1991 | ........... C08F/4/642 |
| WO | WO 92/00333 | 1/1992 | ........... C08F/10/00 |
| WO | WO 96/23010 | 8/1996 | ........... C08F/210/16 |
| WO | WO 97/19959 | 10/1996 | ........... C08F/4/603 |
| WO | WO 97/48743 | 12/1997 | ........... C08F/10/00 |
| WO | WO 98/27124 | 6/1998 | ........... C08F/10/00 |
| WO | WO 98/30612 | 7/1998 | ........... C08F/10/06 |
| WO | WO 99/40131 | 8/1999 | ........... C08F/10/02 |
| WO | WO 99/46302 | 9/1999 | ............ C08F/4/40 |
| WO | WO 99/46303 | 9/1999 | ........... C08F/10/00 |
| WO | WO 999/46304 | 9/1999 | ............ C08F/4/70 |
| WO | WO 00/50475 | 8/2000 | ........... C08F/10/02 |
| WO | WO 01/25149 | 4/2001 | ......... C01B/33/154 |
| WO | WO 01/32721 | 5/2001 | ........... C08F/10/00 |
| WO | WO 01/32722 | 5/2001 | ........... C08F/10/00 |
| WO | WO 01/42320 | 6/2001 | ........... C08F/10/00 |
| WO | WO 01/49747 | 7/2001 | ............ C08F/4/02 |

OTHER PUBLICATIONS

Lynda K. Johnson, Stefan Mecking, and Maurice Brookhart, "Copolymerization of Ethylene and Propylene with Functionalized Vinyl Monomers by Palladium (II) Catalysts", 1996 American Chemical Society, vol. 118, No. 1, 1996.

Lynda K. Johnson, Christopher M. Killian, and Maurice Brookhart, "New Pd(II)– and Ni(II)– Based Catalysts for Polymerization of Ethylene and a–olefins", Journal American Chemical Society 1995, 177, 6414–6415.

"Novel polymerization reactions catalyzed by homogeneous Pd(II) and Ni(ii) a–diimino complexes", CatTech Highlights, Mar. 1997; p. 65–66.

"Move Over Metallocenes", Chemical Week, Apr. 29, 1998, p. 72.

"New Catalysts to Polymerize Olefins", C&EN, Apr. 13, 1998, pp 11–12.

Rip A. Lee, Rene J. Lachicotte, and Guillermo C. Bazan, "Zirconium Complexes of 9–Phenyl–9–borataanthracene. Synthesis, Structural Characterization, and Reactivity", Journal American Chemical Society 1998, 120, 6037–6046.

Brooke L. Small, Maurice Brookhart, and Alison M.A. Bennett, "Highly Active Iron and Cobalt Catalysts for the Polymerization of Ethylene", Journal American Chemical Society 1998, 120, 4049–4050.

John A. Ewen, Robert L. Jones, A. Razavi, "Syndiospecific Propylene Polymerizations with Group 4 Metallocenes", J. Am. Chem. Soc. 1988, 110, 6255–6256.

Thomas J. Pinnavaia "Intercalated Clay Catalysts", Science. Apr. 22, 1983, vol. 220, No. 4595, pp 365–371.

Yoshinori Suga, Eiji Isobe, Toru Suzuki, Kiyotoshi Fujioka, "Novel Clay Mineral–Supported Metallocene Catalysts For Olefin Polymerization," Publication Presentation at MetCon 99: "Polymers in Transition," Jun. 9–10, 1999, Houston, Texas, United States of America.

Nakamura, Yuji et al., "Clay Column Chromatography for Optical Resolution: Partial Resolution of 1,1'–Binaphthol on Optically Active [Co(phen)3–x(am)x]n+–Montmorillonite Columns", Clay Sci. (1990), 8(1), 17–23, XP000983072, p. 18.

Ferdinand and R.W.P. Wild, Laszlo Zsolnai, Gottfried Huttner and Hans H. Brintzinger, "Synethesis and Molecular Structures of Chiral ansa–Titanocene Derivatives with Bridged Tetrahydroindenyl Ligands", Journal of Organmetallic Chemistry, 232 (1982) 233–247.

Stephen Brunauer, P. H. Emmett and Edward Teller, "Adsorption of Gases in Multimolecular Layers"; Journal of American Chemical society, 60 pp 309–319.

* cited by examiner

PROCESS FOR PREPARING SUPPORTED TRANSITION METAL CATALYST SYSTEMS AND CATALYST SYSTEMS PREPARED THEREBY

CROSS-REFERENCE TO RELATED APPLICATIONS

The present application claims benefit of U.S. Provisional Patent Application Ser. Nos. 60/287,602 and No. 60/287,607, both filed Apr. 30, 2001, the disclosures of which are hereby incorporated by reference herein.

BACKGROUND OF THE INVENTION

The invention relates to coordination catalyst systems and methods of their preparation. Such coordination catalyst systems comprise a support-activator in agglomerate form, hereinafter referred to as support-activator agglomerate, and transition metal catalyst comprising at least one metallocene and/or constrained geometry pre-catalyst and optionally at least one bi- or tridentate late transition metal pre-catalyst. Coordination catalyst systems, which are usually based on transition metal compounds of Groups 3 to 10 and organometallic compounds of Group 13 of the Periodic Table of the Elements, are exceptionally diverse catalysts which are employed in chemical reactions of and with olefinically unsaturated compounds. Such reactions are embodied in processes for the preparation of olefin polymers by coordination polymerization. The preparation of polyethylene of increased density (high-density polyethylene, HDPE) and of polymers and copolymers of ethylene, propylene or other 1-alkenes is of considerable industrial importance.

The prevailing belief regarding the reaction mechanism of coordination catalysts is that a transition metal compound forms a catalytically active center to which the unsaturated compound, typically olefinically unsaturated, bonds by coordination in a first step. Olefin polymerization takes place via coordination of the monomers and a subsequent insertion reaction into a transition metal-carbon or a transition metal-hydrogen bond.

The presence of organometallic compounds (e.g., organoaluminum compounds such as methylalumoxane) in the coordination catalyst systems or during the catalyzed reaction is thought to be necessary in order to activate the catalyst, or maintain its activity, by reduction and, where appropriate, alkylation or formation of a complex system. These compounds were therefore also called cocatalysts. For purposes of the present invention, the transition metal is contributed to the coordination catalyst by the use of a suitable compound or reactant comprising the transition metal. Suitable transition metals may be the same or different depending on whether the coordination pre-catalyst is a metallocene, constrained geometry, bidentate or tridentate pre-catalyst. For example, as will be described in greater detail hereinafter, with regard to metallocene and constrained geometry pre-catalysts, the transition metal is preferably Ti, Zr or Hf; whereas with regard to bidentate and tridentate pre-catalysts the transition metal is preferably Fe, Co, Ni or Pd. Therefore, for ease of reference, where the present disclosure refers to a metallocene or constrained geometry transition metal compound or a bidentate or tridentate transition metal compound, it is to be understood that such reference is to the compound that contributes the transition metal to what will become the corresponding metallocene, constrained geometry, bidentate or tridentate pre-catalyst. As used herein, the term "ligand" means a molecule, ion, or atom that is attached to the central atom of a coordination compound, a chelate or other complex. In the present invention, such central atom is a metal, the nature which or group(s) of the Periodic Table of the Elements from which such metals are selected will be further identified hereinafter. Furthermore, prior to attachment to the central atom, the compound that contributes the molecule, ion, or atom that comprises a ligand can be referred to in the present invention using alternative, equivalent terms, including "ligand-containing compound" or "ligand-forming compound" or "ligand-containing precursor" or "ligand-containing reactant." For purposes of the present invention, the coordination catalyst compound containing the transition metal atom, which coordination catalyst compound is activated, is typically called the pre-catalyst and after activation, is also referred to as the primary catalyst.

The best known industrially used catalyst systems for coordination polymerization are those of the "Ziegler-Natta catalyst" type and the "Phillips catalyst" type. The former comprise the reaction product of a metal alkyl or hydride of elements of the first three main groups of the Periodic Table and a reducible compound of a transition metal element of Groups 4 to 7 the combination used most frequently comprising an aluminum alkyl, such as diethylaluminum chloride, and titanium (IV) chloride. More recent highly active Ziegler-Natta catalysts are systems in which the titanium compound is fixed chemically to the surface of magnesium compounds, such as, in particular, magnesium chloride.

More recent developments have focused on single-site catalyst systems. Such systems are characterized by the fact that their metal centers behave alike during polymerization thus making very uniform polymers. Catalysts are judged to behave in a single-site manner when the polymer they make meets some basic criteria (e.g., narrow molecular weight distribution, or uniform comonomer distribution). Thus, the metal can have any ligand set around it and be classified as "single-site" as long as the polymer that it produces has certain properties.

Included within single-site catalyst systems are metallocene catalysts and constrained geometry catalysts. A "metallocene" is conventionally understood to mean a metal (e.g., Zr, Ti, Hf, So, Y, V or La) complex that is bound to two cyclopentadienyl (Cp) rings, or derivatives thereof, such as indenyl, tetrahydroindenyl, fluorenyl and mixtures. In addition to the two Cp ligands, other groups can be attached to the metal center, most commonly halides and alkyls. The Cp rings can be linked together (so-called "bridged metallocene" structure), as in most polypropylene catalysts, or they can be independent and freely rotating, as in most (but not all) metallocene-based polyethylene catalysts. The defining feature is the presence of at least one and preferably two Cp ligands or derivatives. Metallocene catalysts can be employed either as so-called "neutral metallocenes" in which case an alumoxane, such as methylalumoxane, is used as a co-catalyst, or they can be employed as so-called "cationic metallocenes" which are neutral metallocenes which have been activated, e.g., ionized, by an activator such that the active catalyst species incorporates a stable and loosely bound non-coordinating anion as a counter ion to a cationic metal metallocene center. Cationic metallocenes are disclosed in U.S. Pat. Nos. 5,064,802; 5,225,500; 5,243,002; 5,321,106; 5,427,991; and 5,643,847; and EP 426 637 and EP 426 638, the disclosures of which are incorporated herein by reference.

"Constrained geometry" is a term that refers to a particular class of organometallic complexes in which the metal center is bound by only one modified Cp ring or derivative.

The Cp ring is modified by bridging to a heteroatom such as nitrogen, phosphorus, oxygen, or sulfur, and this heteroatom also binds to the metal site. The bridged structure forms a fairly rigid system, thus the term "constrained geometry". By virtue of its open structure, the constrained geometry catalyst can produce resins having long chain branching that are not possible with normal metallocene catalysts. Constrained geometry catalysts are disclosed in U.S. Pat. Nos. 5,064,802 and 5,321,106. Constrained geometry catalysts can also be employed in neutral or cationic form and use methylalumoxane or ionization activators respectively in the same fashion as metallocenes.

Still more recently, late transitional metal (e.g., Fe, Co, Ni, or Pd) bidentate and tridentate catalyst systems have been developed. Representative disclosures of such late transition metal catalysts are found in U.S. Pat. No. 5,880,241 and its divisional counterparts U.S. Pat. Nos. 5,880,323; 5,866,663; 5,886,224; and 5,891,963, and PCT International Application Nos. PCT/US98/00316; PCT/US97/23556; PCT/GB99/00714; PCT/GB99/00715; and PCT/GB99/00716.

Both the single site and late transition metal pre-catalysts typically require activation to form a cationic metal center by an organometal Lewis acid (e.g., methylalumoxane (MAO)) (characterized as operating through a hydrocarbyl abstraction mechanism). Such activators or cocatalysts are pyrophoric, and are typically employed in quantities which are multiples of the catalyst. Attempts to avoid such disadvantages have led to the development of borane (e.g., trispentafluorophenylborane) and borate (e.g., ammonium tetrakispentafluorophenylborate) activators which are non-pyrophoric but more expensive to manufacture and require pyrophoric reagents to make the same. These factors complicate the development of heterogeneous versions of such catalyst systems in terms of meeting cost and performance targets.

Use of these catalysts and related types in various polymerization processes can give products sometimes having different properties. In the case of olefin polymers, which are generally known to be important as materials, the suitability for particular applications depends, on the one hand, on the nature of the monomers on which they are based and on the choice and ratio of comonomers and the typical physical parameters which characterize the polymer, such as average molecular weight, molecular weight distribution, degree of branching, degree of crosslinking, crystallinity, density, presence of functional groups in the polymer and the like, and on the other hand, on properties resulting from the process, such as content of low molecular weight impurities and presence of catalyst residues, and, last but not least, on costs.

In addition to realizing desired product properties, other factors are decisive for evaluating the efficiency of a coordination catalyst system, such as the activity of the catalyst system, that is to say, the amount of catalyst required for economic conversion of a given amount of olefin, the product conversion per unit time and the product yield. The stability and ease of handling of the catalyst or its components is another factor that affects the choice of commercial embodiments thereof. Practically all known coordination catalysts are extremely sensitive to air and moisture to varying degrees. Coordination catalysts are typically reduced in their activity or irreversibly destroyed by access to (atmospheric) oxygen and/or water. Most Ziegler-Natta and metallocene catalysts, for example, deactivate spontaneously on access to air and become unusable. Most coordination catalysts must therefore typically be protected from access of air and moisture during preparation, storage and use, which of course makes handling difficult and increases the expenditure required.

A still further factor to be considered is the ability to utilize the coordination catalyst as a heterogeneous catalyst system. The advantages of a heterogeneous catalyst system are more fully realized in a slurry polymerization process. More specifically, slurry polymerizations are often conducted in a reactor wherein monomer, catalysts, and diluent are continuously fed into the reactor. The solid polymer that is produced (typically in the form of polymer "fluff") is not dissolved in the diluent and is allowed to settle out before being periodically withdrawn form the reactor. In this kind of polymerization, factors other than activity and selectivity, which are always present in solution processes, become of paramount importance. For example, in the slurry process it is desired to have a supported catalyst which produces relatively high bulk density polymer. If the bulk density is too low, the handling of the solid polymer becomes impractical. It is also an advantage to have the polymer formed as uniform, spherical particles that are relatively free of fines. Although fines can have a high bulk density, they also do not settle as well as larger particles and they present additional handling problems with the later processing of the polymer fluff. Furthermore, slurry polymerization processes differ in other fundamental ways from the typical solution polymerization processes. The latter requires higher reaction temperatures (>130° C.) and pressures (>450 psi) and often results in lower molecular weight polymers. The lower molecular weight is attributed to the rapid chain-termination rates under such reaction conditions. Although lowering the reaction temperature and/or pressure, or changing molecular structure of the metallocene catalyst can produce higher molecular weight polymer in a solution process, it becomes impractical to process the resulting high molecular weight polymers in the downstream equipment due to the high solution viscosity. In contrast, a slurry reaction process overcomes many of the above disadvantages by simply operating at lower temperature (<100° C.). As a result, a higher molecular weight polymer with a uniform particle size and morphology can be routinely obtained. It is also advantageous to carry out slurry reactions with sufficiently high polymerization efficiencies such that residues from the polymerization catalysts do not have to be removed from the resulting polymers.

The above-discussed advantages of slurry polymerization processes provide incentive for developing coordination catalysts in heterogeneous form. Thus far, gas phase polymerization processes are only practical with a heterogeneous catalyst system.

Finally, evaluation of a coordination catalyst system must include process considerations that influence the morphology (e.g., bulk density) of the resulting polymer, the environmental friendliness of the process, and the avoidance of reactor fouling. Thus, there has been a continuing search to develop a coordination catalyst system, preferably a heterogeneous coordination catalyst system, which demonstrates high catalyst activity, is free of reactor fouling, produces polymer products having good morphology while simultaneously being process friendly (e.g., easy to make) and inexpensive to make. There has also been a particular need to discover catalyst systems that are adapted more readily to cope with the propensity to deactivate and/or are less hazardous in use. The present invention was developed in response to these needs.

International application No. PCT/US97/11953 (International Publication No. WO 97/48743) is directed to frangible, spray dried agglomerate catalyst supports of silica gel, which possess a controlled morphology of microspheroidal shape, rough scabrous appearance, and interstitial void spaces which penetrate the agglomerate surface and are of substantially uniform size and distribution. The agglomerates also possess a 1–250 micron particle size, 1–1000 $m^2/g$ surface area, and an Attrition Quality Index (AQI, defined in the publication) of at least 10. The agglomerates are derived from a mixture of dry milled inorganic oxide particles, e.g., silica gel and optionally but preferably wet milled inorganic oxide particles, e.g., silica gel particles (which preferably contain colloidal particles of less than 1 micron particle size), slurried in water for spray drying. The high AQI assures that the agglomerates are frangible and that the polymerization performance is improved. The controlled morphology is believed to permit the constituent particles of the agglomerates to be more uniformly impregnated or coated with conventional olefin polymerization catalysts. Clay is not disclosed as suitable metal oxide. The teaching of the above cited reference, particularly with regard to the preparation of a support having defined AQI characteristics, is incorporated herein in its entirety by reference.

U.S. Pat. No. 5,633,419 discloses the use of spray dried silica gel agglomerates as supports for Ziegler-Natta catalyst systems.

U.S. Pat. No. 5,395,808 discloses bodies made by preparing a mixture of ultimate particles of bound clay, with one or more optional ingredients such as inorganic binders, extrusion or forming aids, burnout agents or forming liquid, such as water. Preferably the ultimate particles are formed by spray drying. Suitable binders include silica when Kaolin clay is used as the inorganic oxide. The bodies are made from the ultimate particles and useful methods for forming the bodies include extrusion, pelletization, balling, and granulating. Porosity is introduced into the bodies during their assembly from the ultimate particles, and results primarily from spaces between the starting particles. The porous bodies are disclosed to be useful as catalyst supports. See also U.S. Pat. Nos. 5,569,634; 5,403,799; and 5,403,809; and EP 490 226 for similar disclosures.

U.S. Pat. No. 5,362,825 discloses olefin polymerization catalysts produced by contacting a pillared clay with a Ziegler-Natta catalyst, i.e., a soluble complex produced from the mixture of a metal dihalide with at least one transition metal compound in the presence of a liquid diluent. The resulting mixture is in turn contacted with an organoaluminum halide to produce the catalyst.

U.S. Pat. No. 5,807,800 is directed to a supported metallocene catalyst comprising a particulate catalyst support, such as a molecular sieve zeolite, and a stereospecific metallocene, supported on the particulate support and incorporating a metallocene ligand structure having two sterically dissimilar cyclopentadienyl ring structures coordinated with a central transition metal atom. At column 4 of the background discussion, it is disclosed that cationic metallocenes which incorporate a stable non-coordinating anion normally do not require the use of alumoxane.

EP 426,638 discloses a process for polymerizing olefins which comprises mixing an aluminum alkyl with the olefin to be polymerized, preparing the metallocene catalyst, and mixing the catalyst with the aluminum alkyl-olefin mixture without a methylalumoxane co-catalyst. The metallocene catalyst is an ion pair formed from a neutral metallocene compound and an ionizing compound such as triphenylcarbenium tetrakis (pentafluorophenyl) borate.

U.S. Pat. No. 5,238,892 discloses the use of undehydrated silica as a support for metallocene and trialkylaluminum compounds.

U.S. Pat. No. 5,308,811 discloses an olefin polymerization catalyst obtained by contacting (a) a metallocene-type transition metal compound, (b) at least one member selected from the group consisting of clay, clay minerals, ion exchanging layered compounds, diatomaceous earth, silicates and zeolites, and (c) an organoaluminum compound. Component (b) may be subjected to chemical treatment, which, for example, utilizes ion exchangeability to substitute interlaminar exchangeable ions of the clay with other large bulky ions to obtain a layered substance having the interlaminar distance enlarged. Such bulky ions function as pillars, supporting the layered structure, and are therefore called pillars. Guest compounds, which can be intercalated, include cationic inorganic compounds derived from such materials as titanium tetrachloride and zirconium tetrachloride. $SiO_2$ may be present during such intercalation of guest compounds. The preferred clay is montmorillonite. Silica gel is not disclosed as a suitable component (b).

U.S. Pat. No. 5,714,424 discloses a method of forming a polyolefin composite catalyst particle comprising two or more distinct supported catalyst components in a single catalyst particle in order to polymerize olefins to a polyolefin having two or more melt indices. The catalyst types are selected from chrome-silica, Ziegler-Natta and metallocene catalysts. The catalyst components can be sized by co-milling and the particles isolated from a solvent preparation step by spray drying. The inventors describe multiple catalyst components but do not disclose an agglomerated support or such a support including an integrated ion containing layered material having Lewis acidity for activating the catalyst components. In fact, it is stated that the composition of the invention of the reference "does not depend in any manner on the pore structure of the support. The only requirement is that the individual (catalyst) components have different melt index potentials . . . and that have approximately the same activity." (column 3, lines 30–35). The supports used in the examples were prepared using one or more of washed filter cake silica; dried, coarse milled and washed silica hydrogel; and dried, sized and calcined silica/titania cogel.

U.S. Pat. No. 5,753,577 discloses a polymerization catalyst comprising a metallocene compound, a co-catalyst such as proton acids, ionized compounds, Lewis acids and Lewis acidic compounds, as well as clay mineral. The clay can be modified by treatment with acid or alkali to remove impurities from the mineral and possibly to elute part of the metallic cations from the crystalline structure of the clay. Examples of acids which can effect such modification include Brønsted acids such as hydrochloric, sulfuric, nitric and acetic acids. The preferred modification of the clay is accomplished by exchanging metallic ions originally present in the clay with specific organic cations such as aliphatic ammonium cations, oxonium ions, and onium compounds such as aliphatic amine hydrochloride salts. Such polymerization catalysts may optionally be supported by fine particles of $SiO_2$, $Al_2O_3$, $ZrO_2$, $B_2O_3$, $CaO$, $ZnO$, $MgCl_2$, $CaCl_2$, and mixtures thereof. (Col. 3, line 48; Col. 21, line 10 et seq.). The fine particle support may be of any shape preferably having a particle size in the range of 5–200 microns, and pore size ranges of from 20–100 Å. Use of metal oxide support is not described in the examples.

U.S. Pat. No. 5,399,636 discloses a composition comprising a bridged metallocene that is chemically bonded to an inorganic moiety such as clay or silica. The olefin polymerization catalyst system is disclosed as including such standard activators or cocatalysts as organoborates and organoalumoxanes; methylalumoxanes are preferred (column 8, lines 38 to column 9, line 40) and its use is illustrated in the sole polymerization working example (VI). Silica is illustrated in the working examples as a suitable support, but not clay.

EP 849 292 discloses an olefin polymerization catalyst consisting essentially of a metallocene compound, a modified clay compound, and an organoaluminum compound. The modification of the clay is accomplished by reaction with specific amine salts such as a proton acid salt obtained by the reaction of an amine with a proton acid (hydrochloric acid). The specifically disclosed proton acid amine salt is hexylamine hydrochloride. The modification of the clay results in exchange of the ammonium cation component of the proton acid amine salt with the cations originally present in the clay to form the mineral/organic ion complex.

U.S. Pat. No. 5,807,938 discloses an olefin polymerization catalyst obtained by contacting a metallocene compound, an organometallic compound, and a solid catalyst component comprising a carrier and an ionized ionic compound capable of forming a stable anion on reaction with the metallocene compound. Suitable carriers disclosed include inorganic compounds or organic polymeric compounds. The inorganic compounds include inorganic oxides, such as alumina, silica, silica-alumina, silica magnesia; clay minerals; and inorganic halides. The ionized ionic compound contains an anionic component and a cationic component. The cationic component preferably comprises a Lewis Base functional group containing an element of the Group 15 or 16 of the Periodic Table such as ammonium, oxionium, sulfonium, and phosphonium, cations. The cation component may also contain a functional group other than Lewis Base function groups, such as carbonium, tropynium, and a metal cation. The anion component includes those containing a boron, aluminum, phosphorous or antimony atom, such as an organoboron, organoaluminum, organophosphorous, and organoantimony anions. The cationic component is fixed on the surface of the carrier. Only silica or chlorinated silica are employed in the working examples as a carrier. In many examples, the silica surface is modified with a silane.

U.S. Pat. No. 5,830,820 discloses an olefin polymerization catalyst comprising a modified clay mineral, a metallocene compound, and an organoaluminum compound. The clay mineral is modified with a compound capable of introducing a cation into the layer interspaces of the clay mineral. Suitable cations which are inserted into the clay include those having a proton, namely, Brønsted acids such trimethylammonium, as well as carbonium ions, oxonium ions, and sulfonium ions. Representative anions include chlorine ion, bromide ion, and iodide ion.

EP 881 232 is similar to U.S. Pat. No. 5,830,820, except that the average particle size of the clay is disclosed as being less than 10 microns.

EP 849 288 discloses an olefin polymerization catalyst consisting essentially of a metallocene compound, an organoaluminum compound, and a modified clay compound. The clay is modified by contact with a proton acid salt of certain specific amine compounds, such as hexylamine chloride.

JP Kokai Patent HEI 10-338516 discloses a method for producing a metallic oxide intercalated in a clay mineral which comprises swelling and diluting the clay mineral, having a laminar structure, with water to form a sol; adding an organometallic compound to an aqueous solution containing organic acid to form a sol that contains the metallic compound; mixing the swelling clay mineral sol with the metallic compound containing sol and agitating to intercalate the metallic compound between the layers in the swollen clay mineral; and washing, dehydrating, drying and roasting the clay mineral that has the metallic compound intercalated therein. Suitable metallic oxides include those of titanium, zinc, iron, and tin.

U.S. Pat. No. 4,981,825 is directed to a dried solid composition comprising clay particles and inorganic metal oxide particles substantially segregated from the clay particles. More specifically, the metal oxide particles are sol particles which tend to fuse upon sintering. Consequently, by segregating the sol particles with smectite-type clay particles, fusion of the sol particles is reduced under sintering conditions thereby preventing a loss of surface area. The preferred metal oxide is colloidal silica having an average particle size between 40 and 800 angstroms (0.004 and 0.08 microns), preferably 40 and 80 angstroms. The ratio of the metal oxide to clay is between about 1:1 to 20:1, preferably 4:1 to 10:1. The end product is described at Column 3, line 50 et seq. as sol particle-clay composites in which the clay platelets inhibit aggregation of the sol particles. Such products are made up entirely of irregular sol-clay networks in which the clay platelets are placed between the sol particles. The result is a composite with very high surface area, and ability to retain such high surface area at elevated temperatures. This arrangement is also distinguished from intercalation of the clay by the silica. The subject compositions are disclosed in the abstract to be useful for catalytic gaseous reactions and removal of impurities from gas streams. Specific catalysts systems are not disclosed.

U.S. Pat. No. 4,761,391 discloses delaminated clays whose x-ray defraction patterns do not contain a distinct first order reflection. Such clays are made by reacting synthetic or natural swelling clays with a pillaring agent selected from the group consisting of polyoxymetal cations, mixtures of polyoxymetal cations, colloidal particles comprising alumina, silica, titania, chromia, tin oxide, antimony oxide or mixtures thereof, and cationic metal clusters comprising nickel, molybdenum, cobalt, or tungsten. The resulting reaction product is dried in a gaseous medium, preferable by spray drying. The resulting acidic delaminated clays may be used as the active component of cracking and hydroprocessing catalysts. The ratio of clay to pillaring agent is disclosed to be between about 0.1 and about 10. To obtain the delaminated clay, a suspension of swelling clay, having the proper morphology, e.g., colloidal particle size, is mixed with a solution or a suspension of the pillaring agent at the aforedescribed ratios. As the reactants are mixed, the platelets of clay rapidly sorb the pillaring agent producing a flocculated mass comprised of randomly oriented pillared platelet aggregates. The flocculated reaction product or gel is then separated from any remaining liquid by techniques such as centrifugation filtration and the like. The gel is then washed in warm water to remove excess reactants and then preferably spray dried. The pillaring agent upon heating is converted to metal oxide clusters which prop apart the platelets of the clay and impart the acidity which is responsible for the catalytic activity of the resultant delaminated clay. The x-ray detraction pattern of such materials contains no distinct first order of reflection which is indicative of platelets randomly oriented in the sense that, in addition to face-to-face linkages of platelets, there are also face-to-edge and edge-to-edge linkages. The utilities described at Column 8, Lines 55 et seq. include use as components of catalyst, particularly hydrocarbon conversion catalysts, and most preferably as components of cracking and hydrocracking catalysts. This stems from the fact that the because the clay contains macropores as well as micropores, large molecules that normally cannot enter the pores of zeolites will have access to the acid sites in the delaminated clays making such materials more efficient in cracking of high molecular weight hydrocarbon constituents. (See also U.S. Pat. No. 5,360,775.)

U.S. Pat. No. 4,375,406 discloses compositions containing fibrous clays and precalcined oxides prepared by forming a fluid suspension of the clay with the precalcined oxide particles, agitating the suspension to form a co-dispersion, and shaping and drying the co-dispersion. Suitable fibrous clays include aluminosilicates, magnesium silicates, and aluminomagnesium silicates. Examples of suitable fibrous clays are attapulgite, playgorskite, sepiolite, haloysite, endellite, chrysotile asbestos, and imogolite. Suitable oxides include silica. The ratio of fibrous clay to precalcined oxide is disclosed to vary from 20:1 to 1:5 by weight.

Additional patents which disclose intercalated clays are U.S. Pat. Nos. 4,629,712 and 4,637,992. Additional patents which disclose pillared clays include U.S. Pat. Nos. 4,995,964 and 5,250,277.

A paper presented at the MetCon '99 Polymers in Transition Conference in Houston, Tex., on Jun. 9–10, 1999, entitled "Novel Clay Mineral-Supported Metallocene Catalysts for Olefin Polymerization" by Yoshinor Suga, Eiji Isobe, Toru Suzuki, Kiyotoshi Fujioka, Takashi Fujita, Yoshiyuki Ishihama, Takehiro Sagae, Shigeo Go, and Yumito Uehara discloses olefin polymerization catalysts comprising metallocene compounds supported on dehydrated clay minerals optionally in the presence of organoaluminum compounds. At page 5 it is disclosed that catalysts prepared with fine clay mineral particles have had operational difficulties such as fouling which make them unsuitable for slurry and gas phase processes. Thus, a granulation method was developed to give the clay minerals a uniform spherical shape. The method for producing this spherical shape is not disclosed.

PCT International Application No. PCT/US96/17140, corresponding to U.S. Ser. No. 562,922, discloses a support for metallocene olefin polymerizations comprising the reaction product of an inorganic oxide comprising a solid matrix having reactive hydroxyl groups or reactive silane functionalized derivatives of hydroxyl groups on the surface thereof, and an activator compound. The activator compound comprises a cation which is capable of reacting with the metallocene compound to form a catalytically active transition metal complex and a compatible anion containing at least one substituent able to react with the inorganic oxide matrix through residual hydroxyl functionalities or through the reactive silane moiety on the surface thereof. The representative example of a suitable anion activator is tris (pentafluorophenyl)(4-hydroxyphenyl)borate. Suitable inorganic oxides disclosed include silica, alumina, and aluminosilicates.

U.S. Pat. No. 5,880,241 discloses various late transition metal bidentate catalyst compositions. At column 52, lines 18 et seq., it is disclosed that the catalyst can be heterogenized through a variety of means including the use of heterogeneous inorganic materials as non-coordinating counter ions. Suitable inorganic materials disclosed include aluminas, silicas, silica/aluminas, cordierites, clays, and $MgCl_2$ but mixtures are not disclosed. Spray drying the catalyst with its associated non-coordinating anion onto a polymeric support is also contemplated. Examples 433 and 434 employ montmorillonite clay as a support but polymer morphology is not disclosed for these examples.

PCT International Application No. PCT/US97/23556 discloses a process for polymerizing ethylene by contact with Fe or Co tridentate ionic complex formed either through alkylation or abstraction of the metal alkyl by a strong Lewis acid compound, e.g., MAO, or by alkylation with a weak Lewis acid, e.g., triethylaluminum and, subsequent abstraction of the resulting alkyl group on the metal center with a stronger Lewis acid, e.g., $B(C_6F_5)_3$. The Fe or Co tridentate compound may be supported by silica or alumina and activated with a Lewis or Brønsted acid such as an alkyl aluminum compound (pg. 19, line 1 et seq.). Acidic clay (e.g., montmorillonite) may function as the support and replace the Lewis or Brønsted acid. Examples 43–45 use silica supported MAO, and Example 56 employs dehydrated silica as a support for the Co complex. Polymer morphology is not discussed.

PCT International Application No. PCT/US98/00316 discloses a process for polymerizing propylene using catalysts similar to the above discussed PCT-23556 application.

U.S. Ser. No. 09/166,545, filed Oct. 5, 1998, by Keng-Yu Shih, an inventor of the present application, discloses a supported late transition metal bidentate or tridentate catalyst system containing anion and cation components wherein the anion component contains boron, aluminum, gallium, indium, tellurium and mixtures thereof covalently bonded to an inorganic support (e.g. $SiO_2$) through silane derived intermediates such as a silica-tethered anilinium borate.

PCT International Published Application WO 99/40131 discloses homopolymerization or copolymerization of ethylene with an alphaolefin in the presence of a silica/alumina supported catalyst. The polymer is said to contain less than 12 wt. % of polymer having molecular weight less than 5000 g/mole. Such polymers are produced using a particulate modified catalyst in a single polymerization process and preferably in a single polymerization stage. The modified catalyst is a mixture of preferably bivalent chromium oxide catalyst and a metallocene-alumoxane single site catalyst, each chemically bonded to the support. The polymers produced are said to have a molecular weight distribution breadth that is broader than a typical metallocene polymer but narrower than that produced using a chromium based catalyst and having a combination of high melt strength, low melt viscosity and good extrusion processability.

WO 0125149 A2 discloses a composition comprising an acid treated cation exchanging layered substrate material dispersed in silica gel as a support for a metallocene polymerization catalyst. Acidification is accomplished using a Brønsted acid such as sulfuric acid or an acidified amine, e.g., ammonium sulfate in a mixture with alkaline metal silicate such that the latter precipitates as silica hydrogel. The resulting slurry is dried, e.g., spray dried, and contacted with a metallocene catalyst. Preferably the layered silicate material is fully acid exchanged.

WO 0149747A1 discloses a supported catalyst composition comprising an organoaluminum compound, an organometal compound and an oxide matrix support wherein the latter is a mixture of an oxide precursor compound such as a silica source and a substantially decomposed (exfoliated) layered mineral such as a clay. Decomposition of the clay is achieved, for example, by solvent digestion in a strongly acid and base medium at elevated temperature combined with high energy or high shear mixing to product a colloidal suspension. Decomposition converts the material to its residual mineral components and is said to be complete when the layered mineral no longer has its original layered structure.

WO 0142320 discloses a clay or expanded clay useful as a polymerization catalyst support. The support comprises the reaction product of the clay or expanded clay with an organometallic, or organometalloid, compound in order to reduce, cap or remove residual hydroxyl or other polar functionality of the clay and replace such groups with the organometallic compound. An organometallic or organometalloid derivative is bound to the support through the support oxygen or other polar functionality. Prior to reaction with the organometallic compound, the clay can be ion exchanged to replace at least a portion of alkali or alkali earth metal cations, e.g. sodium or magnesium, originally present in the clay. The chemically modified clay may be calcined either before or after treatment with the organometallic compound; prior treatment is preferred. The organometallic or organometalloid compound contains Mg, Zn or boron, preferably Zn, and the organic group preferably is a $C_1$–$C_{10}$alkyl.

U.S. Ser. No. 09/431,803 filed on Nov. 1, 1999 by Keng-Yu Shih discloses the use of silica agglomerates as a support for transition metal catalyst systems employing specifically controlled (e.g., very low) amounts of non-abstracting aluminum alkyl activators.

U.S. Ser. No. 09/431,771 filed on Nov. 1, 1999 by Keng-Yu Shih et al. discloses a coordination catalyst system comprising a bidentate or tridentate pre-catalyst transition metal compound, at least one support-activator agglomerate, e.g., spray dried silica/clay agglomerate, and optionally an organometallic compound and methods.

U.S. Ser. No. 09/432,008 filed on Nov. 1, 1999 by Keng-Yu Shih et al. discloses a coordination catalyst system comprising a metallocene or constrained geometry pre-catalyst transition metal compound, at least one support-activator agglomerate, e.g., spray dried silica/clay agglomerate, and optionally an organometallic compound and methods for their preparation.

U.S. application Ser. No. 60/287,601, filed Apr. 30, 2001 discloses a catalyst composition composed of a support-activator agglomerate comprising i) at least one inorganic oxide component, and ii) at least one ion-containing layered component, and the support-activator agglomerate has chromium atoms covalently bonded to oxygen atoms of the inorganic oxide.

U.S. application Ser. No. 60/287,607, filed Apr. 30, 2001 discloses a process for forming a catalyst composition comprising substantially simultaneously contacting at least one bidentate ligand compound or at least one tridentate ligand compound or mixtures thereof with a transition metal compound and with a support-activator agglomerate comprising i) at least one inorganic oxide component, and ii) at least one ion-containing layered component. The reference further is directed to the resultant catalyst composition for which the support-activator agglomerate functions as the activator for the catalyst system.

U.S. application Ser. No. 60/287,614, filed Apr. 30, 2001 discloses a catalyst composition composed of a support-activator agglomerate comprising i) at least one inorganic oxide component, and ii) at least one ion-containing layered component and the agglomerate has chromium atoms covalently bonded to oxygen atoms of the inorganic oxide. The agglomerate provides a support-activator for at least one coordination catalyst comprising a bidentate or tridentate pre-catalyst transition metal compound.

U.S. application Ser. No. 60/287,600, filed Apr. 30, 2001 discloses a process for forming a catalyst composition comprising substantially simultaneously contacting at least one bidentate ligand compound or at least one tridentate ligand compound or mixtures thereof with a transition metal compound and with a support-activator agglomerate comprising i) at least one inorganic oxide component, and ii) at least one ion-containing layered component and the agglomerate has chromium atoms covalently bonded to oxygen atoms of the inorganic oxide. The reference is further directed to the resultant catalyst composition for which the support-activator agglomerate functions as the activator for the catalyst system.

SUMMARY OF THE INVENTION

The present invention relates to the discovery that certain agglomerate composite particles of an inorganic oxide (e.g., silica) and an ion exchanging layered compound (e.g., clay) are believed to possess enhanced dispersion and accessibility of their Lewis acidity which renders them extremely proficient support-activators for metallocene, constrained geometry and bi- and tridentate transition metal compound pre-catalysts, particularly when such pre-catalyst compounds are used alone or in combinations based on (A) at least one metallocene or constrained geometry transition metal compound and, optionally (B) at least one bi- or tridentate transition metal compound. In the present invention, each of the pre-catalysts is formed in situ from the corresponding ligand-containing or ligand-forming and transition metal-containing reactants, thereby facilitating direct use of the catalyst system without the need to separately prepare such pre-catalysts or, if desired, without the need to separate the activated, supported pre-catalysts once prepared. Furthermore, it is believed that the agglomerate particles incorporate the ionizable clay particles in such a way that their known Lewis acidity is more uniformly dispersed throughout the particle while simultaneously being made more accessible for interaction with the pre-catalyst compounds. It is believed that this permits the support-activator agglomerate effectively to activate, e.g., ionize, the pre-catalysts when in a pre-activated (e.g., ionizable) state as well as to support the active catalyst during polymerization. This can eliminate the need to use additional ionizing agents such as borane/borate, and MAO activators which are expensive, and introduce added complexity to the system. In contrast, the support-activator agglomerate is inexpensive, environmentally friendly, and easy to manufacture. Furthermore, polymers produced by the use of such transition metal pre-catalysts can exhibit a broad molecular weight distribution.

A further aspect of the discovery of the present invention is that the support-activator agglomerate apparently immobilizes the in situ formed pre-catalyst in a manner typically associated with physical adsorption and/or absorption, preferably by chemadsorption and/or chemabsorption from a slurry of the same without any special impregnation steps, which slurry can actually be used directly for the slurry polymerization of unsaturated monomers, e.g., olefins. The resulting polymer morphology is indicative of a heterogeneous polymerization which is consistent with the observation that the support-activator agglomerate is readily impregnated by the pre-catalyst such that it is believed to react with the same. The catalyst system can be employed as a slurry or dry powder.

Accordingly, in one aspect of the invention there is provided a coordination catalyst system formed by the process comprising substantially simultaneously providing:

(I) particles of a support-activator agglomerate formed by agglomerating:
(A) at least one inorganic oxide component selected from the group consisting of $SiO_2$, $Al_2O_3$, MgO, $AlPO_4$, $TiO_2$, $ZrO_2$, and $Cr_2O_3$ with
(B) at least one ion-containing layered material having interspaces between the layers and sufficient Lewis acidity, when present within the support-activator agglomerate, to activate the transition metal of the pre-catalyst of (II) when said pre-catalyst is in contact with the support-activator agglomerate, said layered material, having a cationic component and an anionic component, wherein said cationic component is present within the interspace of said layered material, said layered material being intimately mixed with said inorganic oxide component within said agglomerate particle in an amount sufficient to provide a coordination catalyst system having the ability to polymerize at least one unsaturated monomer;
(II) pre-catalyst reactants comprising at least one Group (1) material and optionally at least one Group (2) material, wherein said Group (1) material comprises
(i) at least one metallocene or constrained geometry transition metal reactant capable of reacting with
(ii) at least one metallocene or constrained geometry Image Page 3 ligand-containing reactant to form a Group (1) material, said Group (1) material capable of (i) being supported upon contact with the support-activator agglomerate of (I), or (ii) being converted, upon contact with an organometallic compound, to an intermediate capable of being activated upon contact with the support-activator agglomerate, wherein said transition metal is at least one element selected from Groups 3, 4 or the Lanthanide metals of the Periodic Table of Elements; and wherein said Group (2) material comprises (i) at least one non-metallocene, non-constrained geometry, bidentate transition metal reactant or tridentate transition metal reactant capable of reacting with (ii) at least one bidentate or tridentate ligand-containing reactant to form a Group (2) material, said Group (2) material capable of (i) being supported upon contact with said support-activator agglomerate (I) or (ii) being converted, upon contact with an organometallic compound, to an intermediate capable of being activated upon contact with said support-activator agglomerate (I), wherein said transition metal is at least one member selected from Groups 3 to 10 of said Periodic Table, said pre-catalyst reactants of Group (1) and Group (2), upon reaction, capable of being converted to a pre-catalyst;
(III) contacting, in the presence of at least one liquid hydrocarbon, said at least one pre-catalyst reactant Group (1) and, optionally Group (2) materials in a manner sufficient to form activated pre-catalyst and, together with said support-activator agglomerate (I), to provide a ratio of micromoles of total ligand-containing compound to grams of support-activator agglomerate of from about 5:1 to about 500:1.

In another aspect of the present invention, there is provided a process for preparing a catalyst system capable of polymerizing at least one unsaturated monomer comprising substantially simultaneously providing:
(I) particles of a support-activator agglomerate formed by agglomerating:
(A) at least one inorganic oxide component selected from the group consisting of $SiO_2$, $Al_2O_3$, MgO, $AlPO_4$, $TiO_2$, $ZrO_2$, and $Cr_2O3$ with
(B) at least one ion containing layered material having interspaces between the layers and sufficient Lewis acidity, when present within said support-activator agglomerate, to activate the pre-catalyst compound of (II) when said pre-catalyst is in contact with said support-activator agglomerate, said layered material having a cationic component and an anionic component, wherein said cationic component is present within the interspace of the layered material, said layered material being intimately mixed with said inorganic oxide component within the agglomerate particle in amounts sufficient to provide a coordination catalyst system having the ability to polymerize said at least one unsaturated monomer;
(II) providing as pre-catalyst reactants, at least one Group (1) material and optionally at least one Group (2) material wherein said Group (1) material is (i) at least one metallocene or constrained geometry transition metal reactant capable of reacting with (ii) at least one metallocene or constrained geometry ligand-containing reactant to form a Group (1) material, said Group (1) material capable of (i) being supported upon contact with said support-activator agglomerate, or (ii) being converted, upon contact with an organometallic compound, to an intermediate capable of being activated upon contact with said support-activator agglomerate, wherein said transition metal is at least one member selected from Groups 3, 4 or Lanthanide metals, of the Periodic Table of Elements; and wherein said Group (2) material is (i) at least one non-metallocene, non-constrained geometry, bidentate transition metal reactant or tridentate transition metal reactant capable of reacting with (ii) at least one bidentate ligand-containing reactant to form a Group (2) material, said Group (2) material capable of (i) being supported upon contact with said support-activator agglomerate or (ii) being converted, upon contact with an organometallic compound, to an intermediate capable of being activated upon contact with said support-activator agglomerate, wherein said transition metal is at least one member selected from Groups 3 to 10 of the Periodic table;
(III) contacting, in the presence of at least one liquid hydrocarbon, said pre-catalyst reactant Group (1) and, optionally Group (2) materials, in a manner sufficient to form a pre-catalyst and, together with said support-activator agglomerate to provide in said liquid hydrocarbon, a ratio of micromoles of total ligand-containing compound to grams of support-activator agglomerate of from about 5:1 to about 500:1, and to cause at least one of absorption and adsorption of said pre-catalyst by said support-activator agglomerate. de

DETAILED DESCRIPTION

The present invention is directed to a process of forming a heterogeneous catalyst composition that does not require the separate preparation and isolation of transition metal complexes, such as those based on metallocene, constrained geometry, bidentate and/or tridentate transition metal complex chemistry, and to the catalyst composition produced by the present process. The catalyst composition is capable of polymerizing olefins in high activity without the need for a traditional cocatalyst (or activator), such as MAO or perfluorinated borane reagents. The present invention discloses methods for efficiently preparing supported polymerization catalysts comprising providing, and contacting in a diluent, particles of a support-activator agglomerate and reactants suitable for forming a pre-catalyst. Generally, the support-activator agglomerate is formed by agglomerating: (A) at least one inorganic oxide component, e.g., $SiO_2$, with (B) at least one ion containing layered material having interspaces between the layers, a cationic component within the interspaces and an anionic component, and sufficient Lewis acidity to activate the transition metal of a pre-catalyst. As pre-catalyst reactants, at least one Group (1) material and optionally at least one Group (2) material, wherein the Group (1) material is (i) at least one metallocene or constrained geometry transition metal reactant capable of reacting with (ii) at least one metallocene or constrained geometry ligand-containing reactant to form a Group (1) material. The Group (1) material is capable of (i) being supported upon contact with the support-activator agglomerate, or (ii) being converted, upon contact with an organometallic compound, to an intermediate capable of being activated upon contact with the support-activator agglomerate. As also will be described in greater detail hereinafter, the Group (2) material is (i) at least one non-metallocene, non-constrained geometry, bidentate transition metal reactant or tridentate transition metal reactant capable of reacting with (ii) at least one bidentate or tridentate ligand-containing reactant to form a Group (2) material. Similarly, the Group (2) material is capable of (i) being supported upon contact with the support-activator agglomerate or (ii) being converted, upon contact with an organometallic compound, to an intermediate capable of being activated upon contact with the support-activator agglomerate. Transition metals useful with the Group (1) and Group (2) materials are not necessarily the same, as will be described in greater detail. The reactants of the Group (1) and Group (2) materials, upon reaction, are converted to compounds referred to herein as pre-catalysts. After reaction of their respective reactants or constituents, the Group (1) material comprises at least one metallocene or constrained geometry transition metal, ligand-containing compound, or mixtures thereof; and the Group (2) material comprises at least one bidentate or tridentate transition metal, ligand-containing compound, or mixtures thereof. For purposes of the present invention, an activated transition metal compound is one: (a) in which the central transition metal atom, represented by Z in the various following formulas, is changed, such as by transforming into a state of full or partial positive charge, that is, the transition metal compound becomes a cation, or cation-like, in its association with a stable anion or anion-like moiety; and (b) that is capable of catalyzing the polymerization of unsaturated monomers, e.g., one or more olefins, under polymerization conditions.

While transition metal reactants and ligand-containing reactants useful for preparing the catalysts of the present invention will be described, for convenience, examples and preferred metallocene, constrained geometry, bidentate and tridentate ligand-containing pre-catalysts will generally be identified by referring to the reacted or formed pre-catalyst compounds rather than the reactants that are used to prepare such pre-catalysts. However, it is to be understood that for purposes of the present invention, reference to a pre-catalyst includes a reference to the reactants used to make such pre-catalyst, since such reactants are known to those skilled in the art.

The present invention includes alternative methods for preparing the active, supported coordination catalyst. In a first embodiment, transition metal-containing compounds or reactants and ligand compounds or reactants, each suitable for forming metallocene and/or constrained geometry pre-catalysts (i.e., Group (1) materials) are contacted in a reactor in the presence of previously formed particles of a support-activator agglomerate. Optionally, the above transition metal and ligand-containing reactants are reacted first to form a pre-catalyst and then: (i) reacted or contacted with an organometallic compound to form an alkylated pre-catalyst intermediate, and thereafter the intermediate is contacted with the support-activator agglomerate; or (ii) used as a polymerization catalyst in the presence of the organometallic compound.

In a second embodiment of the present invention, each of the supported, activated catalysts prepared by the methods described in the first embodiment and the above alternative process are blended in any desired ratio to form a mixture of supported catalyst particles; referred to herein for convenience as a "two-particle" catalyst system.

In a third embodiment, each of the single particle, activated catalysts prepared by the methods described in the first embodiment and the above alternative process is prepared substantially sequentially, so as to form a mixed catalyst type, single particle supported catalyst.

In a process described in U.S. provisional application Ser. No. 60/287,607, filed Apr. 30, 2001, non-metallocene, non-constrained geometry, transition metal and ligand compounds or reactants, each suitable for forming bidentate and/or tridentate pre-catalysts (i.e., Group (2) materials) are contacted in a reactor in the presence of previously formed particles of a support-activator agglomerate. Optionally, the latter transition metal and ligand reactants are: (i) reacted or contacted with an organometallic compound to form an alkylated pre-catalyst intermediate, and thereafter the intermediate contacted with the support-activator agglomerate; or (ii) used as a polymerization catalyst in the presence of the organometallic compound.

The transition metal pre-catalyst identified as Group (1) material can be at least one metallocene compound, at least one constrained geometry transition metal compound or mixtures thereof capable of (A) being activated upon contact with the support-activator agglomerate or (B) being converted upon contact with an organometallic compound, to form an alkylated pre-catalyst intermediate which is capable of being activated upon contact with the support-activator agglomerate.

The pre-catalyst compounds can be generically represented by the formula:

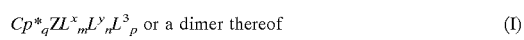  (I)

wherein:

Cp* represents an anionic, delocalized, π-bonded cyclopentadienyl group, or substituted cyclopentadienyl group, as well as a substituted or unsubstituted derivative of a cyclopentadienyl group, that is bound to Z, containing up to 50 non-hydrogen atoms, optionally two Cp* groups may be joined together by a moiety having up to 30 non-hydrogen atoms in its structure thereby forming a bridged structure, and further optionally one Cp* may be bound to $L^x$;

Z is a metal of Group 3 (Sc, Y, La, Ac), 4 (Ti, Zr, Hf), or the Lanthamide metals (Ce, Pr, Nd, Pm, Sm, Eu, Gd, Tb, Dy, Ho, Er Tm Yb, Lu), preferably Group 4 (Ti, Zr, Hf), of the Periodic Table of the Elements in the +2, +3 or +4 formal oxidation state, counter balancing the anionic Cp* and L group(s);

$L^x$ is an optional, divalent substituent of up to 50 non-hydrogen atoms that, when present, together with Cp* forms a metallocycle with Z;

$L^y$ each occurrence independently represents an optional neutral Lewis base having up to 20 non-hydrogen atoms;

$L^3$ each occurrence independently represents a monovalent, anionic moiety having up to 50 non-hydrogen atoms, typically a hydrocarbon-based radical or group, optionally, two $L^3$ groups together may constitute a divalent anionic moiety having both valences bound, preferably covalently or datively bound, to Z, or a neutral, conjugated or non-conjugated diene that is π-bonded to Z (whereupon Z is in the +2 oxidation state), or further optionally one or more $L^3$ and one or more $L^y$ groups may be bonded together thereby constituting a moiety that is both covalently bound to Z and coordinated thereto by means of Lewis base functionality;

q is 1 or 2;
m is an integer of 0 or 1;
n is an integer of 0 to 3;
p is an integer from 0 to 3 (preferably from 1 to 3); and
the sum of q+m+p is equal to the formal oxidation state of Z; and provided that where any one of $L^x$, $L^y$ and $L^3$ groups is hydrocarbyl containing, such L group is not Cp*.

The following table illustrates ligand-containing compounds or reactants and transition metal reactants useful in the present invention for preparing the pre-catalyst of formula (I), as well as the corresponding "pre-activated" or alkylated pre-catalyst.

| Ligand-Forming Reactant | Transition Metal Reactant | Pre-catalyst | "Pre-activated" Pre-Catalyst |
|---|---|---|---|
| 2 M(C$_5$H$_5$) | ZX$_4$ | (C$_5$H$_5$)$_2$ZX$_2$ | (C$_5$H$_5$)$_2$ZR$_2$ |
| M(C$_5$H$_5$) | ZX$_4$ | (C$_5$H$_5$)ZX$_3$ | (C$_5$H$_5$)ZR$_3$ |
| M(C$_5$Me$_5$) | ZX$_4$ | (C$_5$Me$_5$)ZX$_3$ | (C$_5$Me$_5$)ZR$_3$ |
| M(1,3-Me$_2$C$_5$H$_3$) | ZX$_4$ | (1,3-Me$_2$C$_5$H$_3$)ZX$_3$ | (1,3-Me$_2$C$_5$H$_3$)ZR$_3$ |
| M(C$_5$H$_5$) | (C$_5$Me$_5$)ZX$_3$ | (C$_5$H$_5$)(C$_5$Me$_5$)ZX$_2$ | (C$_5$H$_5$)(C$_5$Me$_5$)ZR$_2$ |
| 2 M(C$_5$Me$_5$) | ZX$_4$; | (C$_5$Me$_5$)$_2$ZX$_2$ | (C$_5$Me$_5$)$_2$ZR$_2$ |
| Li[C$_5$H$_4$—SiMe$_2$-p-C$_6$H$_4$-X] | (C$_5$Me$_5$)ZX$_3$ | [C$_5$H$_4$—SiMe$_2$-p-C$_6$H$_4$-X](C$_5$Me$_5$)ZX$_2$ | [C$_5$H$_4$—SiMe$_2$-p-C$_6$H$_4$-X](C$_5$Me$_5$)ZR$_2$ |
| Li[C$_5$H$_4$—SiMe$_2$-p-C$_6$H$_4$-X] | (C$_5$Me$_5$)ZX$_3$ | [C$_5$H$_4$—SiMe$_2$-p-C$_6$H$_4$-X](C$_5$Me$_5$)ZX$_2$ | [C$_5$H$_4$—SiMe$_2$-p-C$_6$H$_4$-X] (C$_5$Me$_5$)Z(diene) |
| M(C$_5$Me$_5$) | (C$_5$H$_5$)ZX$_3$ | (C$_5$H$_5$)(C$_5$Me$_5$)ZX$_2$ | (C$_5$Me$_5$)(C$_5$H$_5$) ZR$_2$ |
| M(n-BuC$_5$Me$_4$) | (C$_5$H$_5$)ZX$_3$ | (n-BuC$_5$Me$_4$)(C$_5$H$_5$)ZX$_2$ | (n-BuC$_5$Me$_4$)(C$_5$H$_5$)ZR$_2$ |
| M(n-BuC$_5$Me$_4$) | (C$_5$H$_5$)ZX$_3$ | (n-BuC$_5$Me$_4$)(C$_5$H$_5$)ZX$_2$ | (n-BuC$_5$Me$_4$)(C$_5$H$_5$)-Z(diene) |
| M(1,3-Me$_2$C$_5$H$_3$) | (C$_5$H$_5$)ZX$_3$ | (1,3-Me$_2$C$_5$H$_3$)(C$_5$H$_5$)ZX$_2$ | (1,3-Me$_2$C$_5$H$_3$)(C$_5$H$_5$)ZR$_2$ |
| M(1,3-Me$_2$C$_5$H$_3$) | (C$_5$H$_5$)ZX$_3$ | (1,3-Me$_2$C$_5$H$_3$)(C$_5$H$_5$)ZX$_2$ | (1,3-Me$_2$C$_5$H$_3$)(C$_5$H$_5$)Z(diene) |
| 2 M(n-BuC$_5$H$_4$) | ZX$_4$ | (n-BuC$_5$H$_4$)$_2$ZX$_2$ | (n-BuC$_5$H$_4$)$_2$ZR$_2$ |
| 2 M(n-BuC$_5$H$_4$) | ZX$_4$ | (n-BuC$_5$H$_4$)$_2$ZX$_2$ | (n-BuC$_5$H$_4$)$_2$Z(diene) |
| 2 M(1,3-Me$_2$C$_5$H$_3$) | ZX$_4$ | (1,3-Me$_2$C$_5$H$_3$)$_2$ZX$_2$ | (1,3-Me$_2$C$_5$H$_3$)$_2$ZR$_2$ |
| 2 M(1,3-Me$_2$C$_5$H$_3$) | ZX$_4$ | (1,3-Me$_2$C$_5$H$_3$)$_2$ZX$_2$ | (1,3-Me$_2$C$_5$H$_3$)$_2$Z(diene) |
| 2 M(1,2,4-Me$_3$C$_5$H$_2$) | ZX$_4$ | (1,2,4-Me$_3$C$_5$H$_2$)$_2$ZX$_2$; | (1,2,4-Me$_3$C$_5$H$_2$)$_2$ZR$_2$ |
| 2 M[1-R'-indenyl] | ZX$_4$ | [1-R'-indenyl]$_2$ZX$_2$; | [1-R'-indenyl]$_2$ZX$_2$; |
| 2 M[2-R'-indenyl] | ZX$_4$ | [2-R'-indenyl]$_2$ZX$_2$; | [2-R'-indenyl]$_2$ZX$_2$; |
| 2 M(1,2,4-Me$_3$C$_5$H$_2$) | ZX$_4$ | [1,2,4-Me$_3$C$_5$H$_2$]$_2$ZX$_2$ | [1,2,4-Me$_3$C$_5$H$_2$]$_2$ZR$_2$ |
| Li$_2$[4,7-dimethylindenyl] | ZX$_4$ | [4,7-dimethylindenyl]ZX$_2$ | [4,7-dimethylindenyl]ZR$_2$ |
| Li$_2$[5,6-dimethylindenyl] | ZX$_4$ | [5,6-dimethylindenyl]ZX$_2$ | [5,6-dimethylindenyl]ZR$_2$ |
| 2 M[2,4-dimethyl-1,3-pentadienyl] | ZX$_4$ | [2,4-dimethyl-1,3-pentadienyl]ZX$_2$ | [2,4-dimethyl-1,3-pentadienyl]ZR$_2$ |
| 2 Li[2-N,N-dimethyla-minoindenyl] | ZX$_4$ | [2-N,N-dimethylamindoi-ndenyl]ZX$_2$ | [2-N,N-dimethylaminoinden-yl]ZX$_2$ |
| Li[dimethyl-silanediyl-bis(2-N,N-dimethylamin-oindenyl)] | ZX$_4$ | [dimethylsilane-diyl-bis(2-N,N-dimethylaminoin-denyl)]-ZX$_2$ | [dimethylsilanediyl-bis(2-N,N-dimethylaminoinden-yl)]ZR$_2$ |

Z = Ti, Zr, or Hf;
M = Li or Na;
R = alkyl (C$_1$–C$_{20}$) group.
R = H, Me, Et, i-Pr, i-Bu, SiMe$_3$, Bz, Ph, 1-Naph
X = Cl, Br, or I;
diene = 1,3-butadiene and its isomers, 1,3-pentadiene, 2,4-pentadiene, 2,4-hexadiene and the like.

Examples of suitable anionic, delocalized π-bonded cyclopentadienyl derivative groups constituting Cp* include indenyl, fluorenyl, tetrahydroindenyl, tetrahydrofluorenyl, octahydrofluorenyl, cyclopentadienyl, cyclohexadienyl, dihydroanthracenyl, hexahydroanthracenyl, and decahydroanthracenyl groups, as well as $C_{1-10}$ hydrocarbyl-substituted derivatives thereof.

Preferred Cp* groups are cyclopentadienyl, pentamethylcyclopentadienyl, tetramethylcyclopentadienyl, 1,3-dimethylcyclopentadienyl, n-butylcyclopentadienyl, indenyl, 2,3-dimethylindenyl, fluorenyl, 2-methylindenyl and 2-methyl-4-phenylindenyl. Each carbon in the Cp* ring may independently be substituted with, a radical, selected from halogen, hydrocarbyl, halohydrocarbyl and hydrocarbyl substituted metalloid radicals wherein the metalloid is selected from Group 14 (C, Si, Ge, Sn, Pb) of the Periodic Table of the Elements. Included within the term 'hydrocarbyl' are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system or a hydrogenated fused ring system. Suitable hydrocarbyl-substituted organometalloid radicals include mono-, di- and trisubstituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. The recitation 'metalloid', as used herein, includes nonmetals such as boron, phosphorus and the like which exhibit semi-metallic characteristics.

Representative examples of suitable Ly groups include diethylether, tetrahydrofuran, dimethylaniline, aniline, trimethylphosphine, and n-butylamine. Ly can also represent a second transition metal compound of the same type as Formulas I, III or IV such that two metal centers, e.g., Z and Z', are bridged by one or two $L^3$ groups. Such dual metal center bridged structures are described in PCT/US91/4390.

Preferred pre-catalysts represented by Formula I include those containing either one or two Cp* groups. The latter pre-catalysts include those containing a bridging group linking the two Cp* groups. Preferred bridging groups are those corresponding to the Formula:

$$(E(R^1)_2)_x \tag{II}$$

wherein E is silicon or carbon, $R^1$ independently each occurrence is hydrogen or a group selected from silyl, hydrocarbyl, or hydrocarbyloxy, said $R^1$ having up to 30 carbon or silicon atoms, and x is 1 to 8. Preferably, $R^1$ independently each occurrence is methyl, benzyl, tert-butyl or phenyl.

Examples of the foregoing bis(Cp*) containing pre-catalysts are compounds corresponding to the formula:

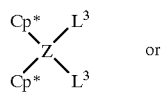

(III)

or

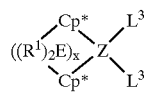

(IV)

wherein:

Cp* is as described previously;

Z is titanium, zirconium or hafnium, preferably zirconium or hafnium, in the +2 or +4 formal oxidation state;

The optional substituents on the cyclopentadienenyl ring in each occurrence independently can preferably be selected from the group of hydrogen, hydrocarbyl, silyl, germyl, cyano, halo and combinations thereof, said substituents having up to 20 non-hydrogen atoms, or adjacent substituent groups together can form a divalent derivative (i.e., a hydrocarbadiyl, siladiyl or germadiyl group) thereby forming a fused ring system; and $L^3$ independently each occurrence is an anionic ligand group of up to 50 non-hydrogen atoms, or two $L^3$ groups together can constitute a divalent anionic ligand group of up to 50 non-hydrogen atoms or a conjugated diene having from 4 to 30 non-hydrogen atoms forming a π complex with Z, whereupon Z is in the +2 formal oxidation state, and $R^1$, E and x are as previously defined. Thus, each $L^3$ may be independently, each occurrence hydride, $C_1$–$C_{50}$ hydrocarbon-based radicals including hydrocarbyl radicals, substituted hydrocarbyl radicals wherein one or more hydrogen atoms is replaced by an electron-withdrawing group, such as a halogen atom or alkoxide radical, or $C_1$–$C_{50}$ hydrocarbyl-substituted metalloid radicals, wherein the metalloid is selected from the Group 4 of the Periodic Table of Elements, provided that where any L3 is hydrocarbon-based, such $L^3$ is different from Cp*. In addition any two $L^3$ groups together, may constitute an alkylidene olefin, acetylene or a cyclometallated hydrocarbyl group.

The transition metal pre-catalyst identified above as Group (2) material can be at least one bidentate transition metal compound, at least one tridentate transition metal compound or mixtures thereof capable of (A) being activated upon contact with the support-activator agglomerate or (B) being converted upon contact with an organometallic compound, to an intermediate which is capable of being activated upon contact with the support-activator agglomerate. As further described in U.S. provisional application Ser. No. 60/287,607, filed Apr. 20, 2001, there is disclosed a process for forming a catalyst composition comprising substantially simultaneously contacting at least one bidentate ligand reactant compound or at least one tridentate ligand reactant compound or mixtures thereof with a transition metal reactant compound and with a support-activator agglomerate comprising i) at least one inorganic oxide component, and ii) at least one ion-containing layered component, all of which are further described herein.

The bidentate ligand-containing compound can be generally represented by the formula:

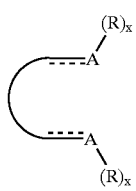

(V)

and the or tridentate ligand-containing compound by the formula:

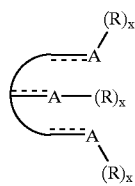

(VI)

wherein in each of formulas V and VI above: each A independently represents oxygen, sulfur, phosphorous or nitrogen, and preferably represents oxygen or nitrogen or a combination thereof, and most preferably each A in (V) and at least two A's of (VI) represent nitrogen;

each R independently represents hydrogen, an unsubstituted or substituted $C_1$–$C_{20}$, preferably $C_3$–$C_{20}$ hydrocarbyl, such as an alkyl, aryl, alkaryl or aralkyl group;

each x independently represents an integer of 0, 1 or 2 provided that when A is either a nitrogen or phosphorous atom x is 1 where A is bonded by a double bond (when ═ represents a double bond) and x is 2 when A is bonded by a single bond (when — represents a single bond) and provided that when A is either an oxygen or sulfur x is 0 when A is bonded by a double bond; and x is 1 when A is bonded by a single bond; and the lines joining each A to each other A represent a hydrocarbon based radical, (typically a $C_2$ to $C_{90}$ (e.g., $C_2$ to $C_{20}$) preferably $C_3$ to $C_{30}$ (e.g., $C_3$ to $C_{12}$) hydrocarbon based radical, such as a hydrocarbylene radical providing a ring or fused ring hydrocarbylene structure or substituted hydrocarbylene structure. Portions of the structure may be comprised of carbon-carbon double bonds, carbon-carbon single bonds and, with respect to covalent bonds between a carbon and an A atom, each may independently be a carbon-A atom double bonds (wherein ═ represents a double bond) and carbon-A atom single bonds (wherein — represents a single bond).

Typically, for the ligands used in the present invention, the carbons includable in the lines connecting each of the (A) groups collectively can be joined by a 4 to 7, preferably 5 to 7 member ring structures.

Preferred ligands known to provide bidentate complexes may, for example, be represented as compounds of the following formula, (VII):

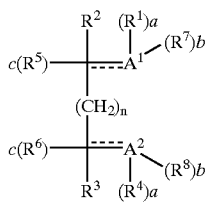

(VII)

wherein a, b and c each independently represents 1 or 0 to indicate whether its associated R group is present (1) or not (0);

$R^1$ and $R^4$ are each independently selected from an unsubstituted or substituted $C_1$–$C_{20}$, preferably $C_3$–$C_{20}$ hydrocarbyl, such as alkyl, aryl, alkaryl or aralkyl group, as for example, i-propyl; t-butyl; 2,4,6-trimethylphenyl; 2-methylphenyl; 2,6-diisopropylphenyl; their fluorinated derivatives and the like; or with adjacent groups, together, may represent a $C_3$–$C_{20}$ hydrocarbylene group;

$R^2$, $R^3$, $R^5$, $R^6$, $R^7$, and $R^8$ are each independently selected from hydrogen, an unsubstituted or substituted $C_{1-C20}$ hydrocarbyl group such as an alkyl, aryl, alkaryl or aralkyl group, as for example, methyl, ethyl, i-propyl, butyl (all isomers), phenyl, tolyl, 2,6-diisopropylphenyl and the like; or any of the R groups and adjacent carbon atoms, such as $R^2$ and $R^3$, taken together can provide an unsubstituted or substituted $C_3$–$C_{20}$ ring forming hydrocarbylene group, such as hexylene, 1,8-naphthylene and the like;

each A independently represents oxygen, nitrogen, sulfur or phosphorous and preferably represents oxygen or nitrogen and most preferably represents nitrogen. The bonds depicted by a dotted line signify the possibility that the atoms bridged by said dotted line may be bridged by a single or double bond.

It will be understood that the particular identity of a, b and c, in the above formula will be dependent on (i) the identity of heteroatom A and (ii) whether the bond between heteroatom A and its adjacent ring carbon is single or double. More specifically, when $A^1$ in Formula VII is nitrogen, it will always have at least 3 available vacancies for bonding. If the bond between such N and its adjacent ring carbon is a double covalent bond, the a for $R^1$ and the c for $R^5$ will be zero, and only one further vacancy will be available in the N for a covalent bond with $R^7$ (thus b would be 1), or if the bonds between the N and the adjacent ring carbon is a single covalent bond, then a of $R^1$, the b of $R^7$ and the c of $R^5$ will be 1. The above rules are modified when $A^1$ in the above formula has a valence of 2, such as oxygen because oxygen has only 2 available vacancies rather than the 3 vacancies for N. Thus, when $A^1$ is oxygen and is double covalently bonded to the adjacent ring carbon, the a of $R^1$, the b of $R^7$ and the c of $R^5$ will each be 0. If such double bond is replaced by a single bond, then a of $R^1$ and the c of $R^5$ will be 1. The vacancy rules when $A^1$ is sulfur are the same as for $A^1$ being oxygen. Phosphorous typically has 3 available vacancies for 3 single covalent bonds or 1 double covalent bond and 1 single covalent bond and will have the same rules as described above for nitrogen. Similar considerations to those described above for $A^1$ apply in respect to $A^2$ of the above formula and in respect to all A groups and a, b, c, of the formula for tridentate ligands discussed hereinafter.

Preferred ligands known to provide tridentate complexes may, for example, be represented as compounds of the following formula, (VIII):

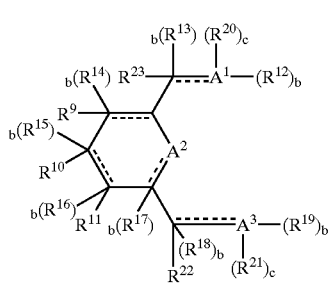

(VIII)

wherein:

$R^{20}$ and $R^{21}$ are each independently selected from hydrogen, or an unsubstituted or substituted aryl group wherein said substitution is an alkyl or a functional hetero group which is inert with respect to the contemplated polymerization;

$R^{22}$ and $R^{23}$ are each independently selected from hydrogen, an unsubstituted or substituted $C_1$–$C_{20}$ (preferably $C_1$–$C_6$) hydrocarbyl as, for example, alkyl (methyl, ethyl, propyl, pentyl and the like); aryl (phenyl, tolyl and the like) or a functional group which is inert with respect to the polymerization (e.g., nitro, halo and the like);

$R^9$ and $R^{10}$ are each independently selected from hydrogen, or an unsubstituted or substituted aryl group wherein said substitution is an alkyl or a functional hetero group which is inert with respect to the contemplated polymerization;

$R^{11}$ and $R^{12}$ are each independently selected from hydrogen, an unsubstituted or substituted $C_1$–$C_{20}$ (preferably $C_1$–$C_6$) hydrocarbyl as, for example, alkyl (methyl, ethyl, propyl, pentyl and the like); aryl (phenyl, tolyl and the like) or a functional group which is inert with respect to the polymerization (e.g., nitro, halo and the like);

$R^{13}$ to $R^{23}$ are each independently selected from hydrogen, an unsubstituted or substituted $C_1$–$C_{20}$ hydrocarbyl or an inert functional group, all as described above for $R^7$;

b and c are each independently 0 or 1 and represent whether their associated R group is present or not; and each $A^1$, $A^2$ and $A^3$ is independently selected as defined in connection with A of the bidentate formula above.

Preferred compounds of the tridentate ligand are those wherein each $R^{19}$,  $R^{10}$ and $R^{15}$ are hydrogen; b is 0, c is 1, and $R^{11}$ and $R^{12}$ are each independently selected from halogen, hydrogen or a $C_1$–$C_6$ alkyl, preferably each is independently selected from methyl or hydrogen; and wherein $R^5$ and $R^6$ of I(b) are each an aryl or substituted aryl group, preferably wherein the aryl contains substitution in the 2 position, the 2,6 positions or the 2,4,6 positions which is selected from a $C_1$–$C_6$ (most preferably $C_1$–$C_3$) alkyl and the remaining positions are each independently selected from hydrogen (most preferred), halogen or a $C_1$–$C_6$ (preferably $C_1$–$C_3$) alkyl.

The transition metal compound that can suitably be used as the reactant in combination with the bidentate or tridentate ligand to form a Group (2) material pre-catalyst of the process defined hereinabove can be represented by the general formula:

$$M^xL_2L'_a \quad (IX)$$

wherein a is an integer of 0, 1 or 2 to provide a neutral compound. Thus, the sum of "a" plus 2 is equal to the oxidation state (x) of the metal M; and M represents at least one metal of Group 3 to 10 transition metals of the Periodic Table; preferably transition metals selected from the group consisting of Fe, Co, Ni, Ru, Rh, Pd, Os, Ir, Pt in the +2 (a=0) or +3 (a=1) oxidation state and Ti, V, Cr, Mn, Zr, and Hf in the +2 (a=0), +3 (a=1) or +4 (a=2) oxidation states; more preferably a Group 8 to 10 late transition metal selected from the group consisting of iron, cobalt, nickel and palladium; and most preferably iron or cobalt; and each L and, where applicable, L' independently represents a group selected from hydrogen, halo (e.g. Cl, Br and the like), and hydrocarbon based radical or group, such as methyl, ethyl, propyl (each isomer), butyl (each isomer)dimethyl amine, 1,3-butadiene-1,4-diyl, 1,4-pentadiene-1,5-diyl, C4 or $C_5$ alkylene and the like, associated through a covalent bond to M, or the two L groups together represent a hydrocarbon based radical, preferably a $C_3$ to $C_{24}$ hydrocarbylene group, associated through a covalent or dative bond to M, and which, together with M, constitute a ring or fused ring structure, typically a 3 to 7, preferably 4 to 7 member heterocyclic ring structure.

In certain instances, the reactant of formula (IX) in addition to the L and L' groups, can form of a weak dative bond chelate with water or a heteroatom containing organic compound such as, for example, dimethoxyethane, tetrahydrofuran, cyclooctadiene.

From a practical standpoint, it is preferred that L be halogen, e.g., Cl, Br or I in the transition metal reactant (IX) above. However, because L in this instance is highly electron withdrawing, it has been conventionally believed that it makes any formed pre-catalyst to be more difficult to induce activation thereof. Thus, it has been believed that the catalyst system may be activated by replacement of the halogens constituting L with groups that are less electron withdrawing, such as hydrocarbyl groups, e.g., alkyl groups.

One preferred embodiment comprises using transition metal reactant (IX) wherein at least one, and more preferably all L groups, is a halogen atom. When at least one L of the transition metal reactant (IX) is halogen, the ligand compound and the transition metal compound can be mixed in a diluent, preferably an inert diluent, prior to, simultaneously with, or after contact (of either one) with the support-activator agglomerate. In this embodiment, the ligand and present support-agglomerate described herein below may be first contacted followed by introduction of the transition metal compound. Alternately, the transition metal compound and the support-activator agglomerate may be first contacted followed by introduction of the ligand compound I or its precursor reactants. Still further, the ligand, the transition metal compound and the support-activator agglomerate are admixed substantially simultaneously prior to polymerization. Therefore, according to the present invention the catalyst composition comprising reactants (1), (2) and the support-activator agglomerate can be formed in one reaction medium without the need to isolate the pre-catalyst and to use the composition without the need for an activation cocatalyst.

The bidentate pre-catalyst compounds produced by use of the above described ligand-containing reactants, in combination with suitable transition metal reactants, can be generically represented by the formula:

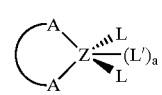

(X)

and correspondingly, the tridentate pre-catalyst compounds can be generically represented by the formula:

(XI)

wherein in each of formulas X and XI above: each A independently represents at least one of oxygen, sulfur, phosphorous or nitrogen, and, as would be readily understood from the formulas shown in XV and —XVI hereinafter, each A is either unsubstituted or substituted with a hydrocarbon-based radical or group, and preferably represents oxygen or nitrogen or a combination thereof, and most preferably each A in X and at least two A's of XI represent nitrogen;

"a" is an integer of 0, 1 or 2 which represents the number of (L') groups bound to Z, the value of "a" being dependent on the oxidation state of Z and whether a particular A–Z bond is dative or covalent, and if covalent whether it is a single or double bond;

Z represents at least one of Group 3 to 10 transition metals of the Periodic Table, preferably transition metals selected from Fe, Co, Ni, Ru, Rh, Pd, Os, Ir, Pt in the +2 (a=0) or +3 (a=1) oxidation state or Ti, V, Cr, Mn, Zr, Hf in the +2 (a=0), +3 (a=1) or +4 (a=2) oxidation states, more preferably a Group 4 to 7 late transition metal selected from iron, cobalt, nickel or palladium and most preferably iron or cobalt; and each L and L' (when present) independently represents a ligand selected from the group of hydrogen, halo, and hydrocarbon-based radical or group associated through a covalent or dative bond to Z, or both L groups together represent a hydrocarbon-based radical, preferably a $C_3$ to C24 hydrocarbylene group, associated through a covalent or dative bond to Z, and which, together with Z, constitute a ring or fused ring structure, typically a 3 to 7, preferably 4 to 7 member heterocyclic ring structure when the line joining A to Z represents a covalent bond.

As used herein, the term "hydrocarbon-based radical or group" denotes a radical or group having a carbon atom directly attached to the remainder of the molecule and having a predominantly hydrocarbon character within the context of this invention. Moreover, in this context the terms "group" and "radical" are used interchangeably. Such radicals include the following:

Hydrocarbon radicals; that is, aliphatic radicals, aromatic- and alicyclic-substituted radicals, and the like, of the type known to those skilled in art.

Substituted hydrocarbon radicals; that is, radicals containing pendant non-hydrocarbon substituents, that in the context of this invention, do not alter the predominantly hydrocarbon character of the radical or constitute a poison for the pre-catalyst. Those skilled in the art will be aware of suitable substituents; examples are halo, nitro, hydroxy, alkoxy, carbalkoxy, and alkythic.

Hetero radicals; that is, radicals which, while predominantly hydrocarbon in character within the context of this invention, contain atoms other than carbon present as a member of the linear structure of a chain or ring otherwise composed of carbon atoms. Suitable hetero-atoms will be apparent to those skilled in the art and include, for example, nitrogen, oxygen, phosphorus and sulfur. In metallocene and constrained geometry catalysts such hydrocarbon-based radicals may be bonded to Z through the heteroatom.

In general, no more than three substituents or heteroatoms, and preferably no more than one, will be present for each 10 carbon atoms in the hydrocarbon-based radical.

More specifically for metallocene and constrained geometry catalysts, the hydrocarbon-based radical or group of $L^3$ for the Group (1) compounds and L and L' for the Group (2) compounds can be substituted or unsubstituted, cyclic or non-cyclic, linear or branched, aliphatic, aromatic, or mixed aliphatic and aromatic including hydrocarbylene, hydrocarbyloxy, hydrocarbylsilyl, hydrocarbylamino, and hydrocarbylsiloxy radicals having up to 50 non-hydrogen atoms. The preferred $L^3$ groups are independently selected from halo, hydrocarbyl, and substituted hydrocarbyl radicals. The hydrocarbon-based radical may typically contain from 1 to about 50 carbon atoms, preferably from 1 to about 12 carbon atoms and the substituent group is preferably a halogen atom.

Exemplary hydrocarbyl radicals for $L^3$ are methyl, ethyl, propyl, butyl, amyl, isoamyl, hexyl, isobutyl, heptyl, octyl, nonyl, decyl, cetyl, 2-ethylhexyl, phenyl and the like, with methyl being preferred. Exemplary substituted hydrocarbyl radicals for $L^3$ include trifluoromethyl, pentafluorphenyl, trimethylsilylmethyl, and trimethoxysilylmethyl and the like. Exemplary hydrocarbyl substituted metalloid radicals for $L^3$ include trimethylsilyl, trimethylgermyl, triphenylsilyl, and the like. Exemplary alkyldiene radicals for two $L^3$ groups together include methylidene, ethylidene and propylidene.

The foregoing metal complexes are especially suited for the preparation of polymers having stereoregular molecular structure. In such capacity it is preferred that the complex possess Cs symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of, syndiotactic olefin polymers in Ewen, et al., J. Am. Chem. Soc. 110, 6255–6256 (1980). Examples of chiral structures include bis-indenyl complexes. Similar systems based on Ti(IV) or Zr(IV) were disclosed for preparation of isotactic olefin polymers in Wild et al., J. Organomet. Chem, 232, 233–47 (1982).

Exemplary bridged ligands containing two π-bonded groups are: (dimethylsilyl-bis-cyclopentadienyl), (dimethylsilyl-bismethylcyclopentadienyl), (dimethylsilyl-bis-ethylcyclopentadienyl, (dimethylsilyl-bis-t-butylcyclopentadienyl), (dimethylsilyl-bistetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilylcyclopentadienyl-fluorenyl), (1,1,2,2-tetramethyl-1,2-disilyl-biscyclopentadienyl), (1,2-bis(cyclopentadienyl))ethane, and (isopropylidene-cyclopentadienyl-fluorenyl).

Preferred $L^3$ groups are selected from hydride, hydrocarbyl, silyl, germyl, halohydrocarbyl, halosilyl, silylhydrocarbyl and aminohydrocarbyl groups, or two $L^3$ groups together can constitute a divalent derivative of a conjugated diene or a neutral, π-bonded, conjugated diene. Most preferred $L^3$ groups are $C_{1-20}$ hydrocarbyl groups.

Examples of preferred pre-catalyst compounds of Formula III and IV include compounds wherein the Cp* group is selected from cyclopentadienyl, indenyl, tetrahydroindenyl, fluorenyl, and octahydrofluorenyl; the substituents on the foregoing Cp* groups each occurrence is hydrogen, methyl, ethyl, propyl, butyl, pentyl, hexyl (including isomers), norbornyl, benzyl, phenyl, etc.; and $L^3$ is selected from methyl, neopentyl, trimethylsilyl, norbornyl, benzyl, methylbenzyl, and phenyl; q is 2, and m and n are zero.

A further class of metal complexes utilized in the present invention correspond to the formula:

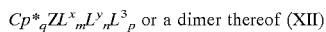

$Cp*_q ZL^x_m L^y_n L^3_p$ or a dimer thereof (XII)

wherein:

Cp* is as defined previously;

Z is a metal of Group 4 of the Periodic Table of the Elements in the +2, +3 or +4 formal oxidation state;

$L^x$ is a divalent substituent of up to 50 non-hydrogen atoms that together with Cp* forms a metallocycle with Z;

$L^y$ is an optional neutral Lewis base ligand having up to 20 non-hydrogen atoms;

$L^3$ each occurrence is a monovalent, anionic moiety having up to 20 non-hydrogen atoms, optionally two $L^3$ groups together may form a divalent anionic moiety having both valences bound to Z or a neutral $C_{5-30}$ conjugated diene, and further optionally $L^y$ and $L^3$ may be bonded together thereby forming a moiety that is both covalently bound to Z and coordinated thereto by means of Lewis base functionality;

q is 1 or 2;
m is 1;
n is a number from 0 to 3;
p is a number from 1 to 2; and the sum of q+m+p is equal to the formal oxidation state of Z.

Preferred divalent $L^x$ substituents include groups containing up to 30 non-hydrogen atoms comprising at least one atom that is oxygen, sulfur, boron or a member of Group 14 of the Periodic Table of the Elements directly attached to the Cp* group, and a different atom, selected from the group consisting of nitrogen, phosphorus, oxygen or sulfur that is covalently bonded to Z.

As indicated above, an alternative class of pre-catalysts are constrained geometry catalysts. By use of the term "constrained geometry" herein is meant that the metal atom is forced to greater exposure of the active metal site because of one or more substituents on the Cp* group forming a portion of a ring structure wherein the metal is both bonded to an adjacent covalent moiety and is held in association with the Cp* group through $\eta^5$ bonding interaction. It is understood that each respective bond between the metal atom and the constituent atoms of the Cp* group need not be equivalent. That is, the metal may be symetrically or unsymetrically π-bound to the Cp* group. The geometry of the active metal site is typically such that the centroid of the Cp* group may be defined as the average of the respective X, Y, and Z coordinates of the atomic centers forming the Cp* group. The angle, θ, formed at the metal center between the centroid of the Cp* group and each other ligand of the metal complex may be easily calculated by standard techniques of single crystal X-ray diffraction. Each of these angles may increase or decrease depending on the molecular structure of the constrained geometry metal complex. Those complexes, wherein one or more of the angles, θ, is less than in a similar, comparative complex differing only in the fact that the constrain-inducing substituent is replaced by hydrogen, have a constrained geometry. Preferably one or more of the above angles, θ, decrease by at least 5%, more preferably 7.5% compared to the comparative complex. Preferably, the average value of all bond angles, θ, is also less than in the comparative complex. Monocyclopentadienyl metal coordination complexes of Group 4 or lanthamide metals according to the present invention have constrained geometry such that typically the smallest angle, θ, is less than 115 degree(s), more preferably less than 110 degree(s), most preferably less than 105 degree(s).

Typical, constrained geometry pre-catalysts can be represented by the Formula:

(XIII)

wherein:

Z, Cp★, and $L^3$ are as defined previously;

G is a divalent moiety comprising oxygen, boron, or a member of Group 14 of the Periodic Table of Elements, such as, $Si(R^a)_2$, $C(R^a)_2$, $Si(R^a)_2$—$Si(R^a)_2$, $C(R^a)_2$—$C(R^a)_2$, $Si(R^a)_2$—$C(R^a)_2$, C $R^a$=$CR^a$, and $Ge(R^a)_2$;

Y is a linking group comprising nitrogen, phosphorus, oxygen or sulfur, such as —O—, —S—, —$NR^a$—, $PR^a$— or optionally G and Y together can constitute a fused ring structure, the combination of G and Y constituting an $L^x$ group of Formula I; and $R^a$ is as described previously.

Suitable non-limiting examples of reactants, pre-catalysts and pre-activated or alkylated pre-catalysts corresponding to Formula XIII above are as follows:

| Ligand Forming Reactant | Transition Metal Reactant | Pre-catalyst | "Pre-activated" Pre-Catalyst |
|---|---|---|---|
| $Li_2[Me_2Si$-bis-(4-(3',5'-$^tBu_2Ph$)-2-Me-indenyl)] | $ZX_4$ | [$Me_2Si$-bis-(4-(3',5'-$^tBu_2Ph$)-2-Me-indenyl)]$ZX_2$ | [$Me_2Si$-bis-(4-(3',5'-$^tBu_2Ph$)-2-Me-indenyl)]$ZR_2$ |
| $Li_2[Me_2Si$-bis-(4-(3',5'-$Me_2Ph$)-2-Me-indenyl)] | $ZX_4$ | [$Me_2Si$-bis-(4-(3',5'-$Me_2Ph$)-2-Me-indenyl)]$ZX_2$ | [$Me_2Si$-bis-(4-(3',5'-$Me_2Ph$)-2-Me-indenyl)]$ZR_2$ |
| $Li_2[Me_2Si$-bis-(4-(3',5'-$(CF_3)_2Ph$)-2-Me-indenyl)] | $ZX_4$ | [$Me_2Si$-bis-(4-(3',5'-$(CF_3)_2Ph$)-2-Me-indenyl)]$ZX_2$ | [$Me_2Si$-bis-(4-(3',5'-$(CF_3)_2Ph$)-2-Me-indenyl)]$ZR_2$ |
| $Li_2[Me_2Si$-2-Me-4-Ph-indenyl] | $ZX_4$, | [$Me_2Si$-2-Me-4-Ph-indenyl)]$ZX_2$ | [$Me_2Si$-2-Me-4-Ph-indenyl)]$ZX_2$ |
| $Li_2[Me_2Si$-2-Me-4-Ph-indenyl] | $ZX_4$, | [$Me_2Si$-2-Me-4-Ph-indenyl)]$ZX_2$ | [$Me_2Si$-2-Me-4-Ph-indenyl)]Z(diene) |
| $Li_2[9$-silafluorene-bis(4-(3',5'-$^tBu_2Ph$)-2-Me-indenyl] | $ZX_4$ | [9-silafluorene-bis(4-(3',5'-$^tBu_2Ph$)-2-Me-indenyl]$ZX_2$ | [9-silafluorene-bis(4-(3',5'-$^tBu_2Ph$)-2-Me-indenyl]$ZR_2$ |
| $Li_2[9$-silafluorene-bis(4-(3',5'-$Me_2Ph$)-2-$^iPr$-indenyl] | $ZX_4$ | [9-silafluorene-bis(4-(3',5'-$Me_2Ph$)-2-$^iPr$-indenyl]$ZX_2$ | [9-silafluorene-bis(4-(3',5'-$Me_2Ph$)-2-$^iPr$-indenyl]$ZR_2$ |

-continued

| Ligand Forming Reactant | Transition Metal Reactant | Pre-catalyst | "Pre-activated" Pre-Catalyst |
|---|---|---|---|
| $Li_2$[1-(9-fluorenyl)-1-cyclopentadienyl)-1-(but-3-enyl)-1-(methyl)-methane] | $ZX_4$ | [1-(9-fluorenyl)-1-cyclopentadienyl)-1-(but-3-enyl)-1-(methyl)-methane]$ZX_4$ | [1-(9-fluorenyl)-1-cyclopentadienyl)-1-(but-3-enyl)-1-(methyl)-methane]$ZR_2$ |
| $Li_2$[1-(9-fluorenyl)-1-(cyclopentadienyl)-1-Me-1-Bu-methane] | $ZX_4$ | [1-(9-fluorenyl)-1-(cyclopentadienyl)-1-Me-1-Bu-methane]$ZX_2$ | [1-(9-fluorenyl)-1-(cyclopentadienyl)-1-Me-1-Bu-methane]$ZR_2$ |
| $Li_2$[methylene bis{1,1'-(2-Me-4-Ph-4-hydroazulene)}] | $ZX_4$ | [methylene bis{1,1'-(2-Me-4-Ph-4-hydroazulene)}]$ZX_2$ | [methylene bis{1,1'-(2-Me-4-Ph-4-hydroazulene)}]$ZR_2$ |
| $Li_2$[methylene bis{1,1'-(4-hydroazulenyl)}] | $ZX_4$ | [methylene bis{1,1'-(4-hydroazulenyl)}]$ZX_2$ | [methylene bis{1,1'-(4-hydroazulenyl)}]$ZR_2$ |
| $Li_2$[ethylene-bis-indenyl] | $ZX_4$ | rac-[ethylene-bis-indenyl]$ZX_2$ | rac-[ethylene-bis-indenyl]$ZX_2$ |
| 1,2-bis-(3-indenyl)ethane | $Z(NR'_2)_4$ | rac-[ethylene-bis-indenyl]$Z(NR)_2$ | rac-[ethylene-bis-indenyl]$ZR_2$ |
| $Li_2$[$Me_2$Si-bis-indenyl] | $ZX_4$ | rac-[$Me_2$Si-bis-(1-indenyl)]$ZX_2$ | rac-[$Me_2$Si-bis-(1-indenyl)]$ZR_2$ |
| $Li_2$[$Me_2$Si-bis-indenyl] | $ZX_4$ | rac-[$Me_2$Si-bis-(1-indenyl)]$ZX_2$ | rac-[$Me_2$Si-bis-(1-indenyl)]$Z$(diene) |
| $Li_2$[$Me_2$Si-bis-(2-methyl-indenyl] | $ZX_4$ | rac-[$Me_2$Si-bis-(2-methyl-indenyl)]$ZX_2$ | rac-[$Me_2$Si-bis-(2-methyl-indenyl)]$ZR_2$ |
| $Li_2$[$Me_2$Si-bis-(2-methyl-4-phenyl-indenyl] | $ZX_4$ | rac-[$Me_2$Si-bis-(2-methyl-4-phenyl-indenyl)]$ZX_2$ | rac-[$Me_2$Si-bis-(2-methyl-4-phenyl-indenyl)]$ZR_2$ |
| $Me_2$Si-bis-(3-indenyl) | $Z(NR'_2)_4$ | rac-[$Me_2$Si-bis-(1-indenyl)]$Z(NR)_2$ | rac-[$Me_2$Si-bis-(1-indenyl)]$ZR_2$ |
| $Li_2$[ethylene-bis-{4-(5,6-$Me_2$)indenyl}] | $ZX_4$ | [ethylene-bis-{4-(5,6-$Me_2$)indenyl}]$ZX_2$ | [ethylene-bis-{4-(5,6-$Me_2$)indenyl}]$ZR_2$ |
| $Li_2$[isopropylidene(cyclopentadienyl fluorenyl)] | $ZX_4$ | [isopropylidene(cyclopentadienyl fluorenyl)]$ZX_2$ | [isopropylidene(cyclopentadienyl fluorenyl)]$ZR_2$ |
| $Li_2$[$Ph_2$-methylidene-cyclopentadienyl-fluorenyl] | $ZX_4$ | [$Ph_2$-methylidene-cyclopentadienyl-fluorenyl]-$ZX_2$ | [$Ph_2$-methylidene-cyclopentadienyl-fluorenyl]-$ZR_2$ |
| $Li_2$[ethylene-bis-{4-(5,6-$Me_2$)indenyl}] | $ZX_4$ | [ethylene-bis-{4-(5,6-$Me_2$)indenyl}]$ZX_2$ | [ethylene-bis-{4-(5,6-$Me_2$)indenyl}]$Z$(diene) |
| $Li_2$[ethylene-bis-{4-(4,7-$Me_2$)indenyl}] | $ZX_4$ | [ethylene-bis-{4-(4,7-$Me_2$)indenyl}]$ZX_2$ | [ethylene-bis-{4-(4,7-$Me_2$)indenyl}]$ZR_2$ |
| $Li_2$[ethylene-bis-{4-(5,6-dimethoxy)indenyl}] | $ZX_4$ | [ethylene-bis-{4-(5,6-dimethoxy)indenyl}]$ZX_2$ | [ethylene-bis-{4-(5,6-dimethoxy)indenyl}]$ZR_2$ |
| $Li_2$[2-t-Bu-3-cyclopentadienyl)-2-(fluorenyl)-propane] | $ZX_4$ | [2-t-Bu-3-cyclopentadienyl)-2-(fluorenyl)propane]$ZX_2$ | [2-t-Bu-3-cyclopentadienyl)-2-(fluorenyl)propane]$ZR_2$ |

Z = Ti, Zr or Hf;
R = alkyl ($C_1$–$C_{20}$) group.
R' = Me, Et, i-Pr, t-Bu, n-Bu and the like;
diene = 1,3-butadiene and its isomers, 1,3-pentadiene, 2,4-pentadiene, 2,4-hexadiene and the like.

A further subset of constrained geometry pre-catalysts are amidosilane or amidoalkanediyl-compounds corresponding to the formula:

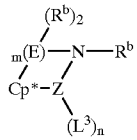

(XIV)

wherein:
Z is as previously described;
$R^b$ each occurrence is independently selected from the group of hydrogen, silyl, alkyl, aryl and combinations thereof having up to 10 carbon or silicon atoms;
E is silicon or carbon; and
$L^3$ independently each occurrence is hydride, alkyl, or aryl of up to 10 carbons;
m is an integer of 1 or 2; and
n is an integer of 1 or 2 depending on the valence of Z.

Examples of preferred metal coordination compounds of Formula XIV include compounds wherein the $R^b$ on the amido group is methyl, ethyl, propyl, butyl, pentyl, hexyl, (including isomers), norbornyl, benzyl, phenyl, etc.; the Cp* group is cyclopentadienyl, indenyl, tetrahydroindenyl, fluorenyl, and octahydrofluorenyl; the substituents on the foregoing cyclopentadienyl groups each occurrence is hydrogen, methyl, ethyl, propyl, butyl, pentyl, hexyl, (including isomers), norbornyl, benzyl, phenyl, etc.; and $L^3$ is methyl, neopentyl, trimethylsilyl, norbornyl, benzyl, methylbenzyl, phenyl, etc.

Suitable non-limiting examples of reactants, pre-catalysts and pre-activated or alkylated pre-catalysts corresponding to Formula XIV above are as follows:

| Ligand Forming Reactant | Transition Metal Reactant | Pre-catalyst | "Pre-activated" Pre-Catalyst |
|---|---|---|---|
| $Li_2[Me_2Si(C_5Me_4)(N\text{-}t\text{-}Bu)]$ | $ZX_4$ | $[Me_2Si(C_5Me_4)(N\text{-}t\text{-}Bu)]ZX_2$ | $[Me_2Si(C_5Me_4)(N\text{-}t\text{-}Bu)]ZR_2$ |
| $Li_2[Me_2Si(C_5Me_4)(N\text{-}t\text{-}Bu)]$ | $ZX_4$ | $[Me_2Si(C_5Me_4)(N\text{-}t\text{-}Bu)]ZX_2$ | $[Me_2Si(C_5Me_4)(N\text{-}t\text{-}Bu)]Z(diene)$ |
| $Li_2[Me_2Si(C_5Me_4)(N\text{—}Ph)]$ | $ZX_4$ | $[Me_2Si(C_5Me_4)(N\text{—}Ph)]ZX_2$ | $[Me_2Si(C_5Me_4)(N\text{—}Ph)]ZR_2$ |
| $Li_2[Me_2Si(C_5Me_4)(N\text{—}Ph)]$ | $ZX_4$ | $[Me_2Si(C_5Me_4)(N\text{—}Ph)]ZX_2$ | $[Me_2Si(C_5Me_4)(N\text{—}Ph)]Z(diene)$ |
| $Li_2[MePhSi(C_5Me_4)(N\text{-}t\text{-}Bu)]$ | $ZX_4,$ | $[MePhSi(C_5Me_4)(N\text{-}t\text{-}Bu)]ZX_2$ | $[MePhSi(C_5Me_4)(N\text{-}t\text{-}Bu)]ZR_2$ |
| $Li_2[MePhSi(C_5Me_4)(N\text{-}t\text{-}Bu)]$ | $ZX_4,$ | $[MePhSi(C_5Me_4)(N\text{-}t\text{-}Bu)]ZX_2$ | $[MePhSi(C_5Me_4)(N\text{-}t\text{-}Bu)]Z(diene)$ |
| $Li_2[MePhSi(C_5Me_4)(N\text{—}Ph)]$ | $ZX_4$ | $[MePhSi(C_5Me_4)(N\text{—}Ph)]ZX_2$ | $[MePhSi(C_5Me_4)(N\text{—}Ph)]ZR_2$ |
| $Li_2[MePhSi(C_5Me_4)(N\text{—}Ph)]$ | $ZX_4$ | $[MePhSi(C_5Me_4)(N\text{—}Ph)]ZX_2$ | $[MePhSi(C_5Me_4)(N\text{—}Ph)]Z(Diene)$ |
| $Li_2[Me_2Si(C_5H_4)(N\text{-}t\text{-}Bu)]$ | $ZX_4$ | $[Me_2Si(C_5H_4)(N\text{-}t\text{-}Bu)]ZX_2$ | $[Me_2Si(C_5H_4)(N\text{-}t\text{-}Bu)]ZR_2$ |
| $Li_2[Me_2Si(C_5H_4)(N\text{-}t\text{-}Bu)]$ | $ZX_4$ | $[Me_2Si(C_5H_4)(N\text{-}t\text{-}Bu)]ZX_2$ | $[Me_2Si(C_5H_4)(N\text{-}t\text{-}Bu)]Z(diene)$ |
| $Li_2[Me_2Si(C_5H_4)(N\text{—}Ph)]$ | $ZX_4$ | $[Me_2Si(C_5H_4)(N\text{—}Ph)]ZX_2$ | $[Me_2Si(C_5H_4)(N\text{—}Ph)]ZR_2$ |
| $Li_2[Me_2Si(C_5H_4)(N\text{—}Ph)]$ | $ZX_4$ | $[Me_2Si(C_5H_4)(N\text{—}Ph)]ZX_2$ | $[Me_2Si(C_5H_4)(N\text{—}Ph)]Z(diene)$ |
| $Li_2[Et_2Si\text{—}MeC_5H_4(N\text{-}t\text{-}Bu)]$ | $ZX_4$ | $[Et_2Si\text{—}MeC_5H_4(N\text{-}t\text{-}Bu)]ZX_2$ | $[Et_2Si\text{—}MeC_5H_4(N\text{-}t\text{-}Bu)]ZR_2$ |
| $Li_2[Et_2Si\text{—}MeC_5H_4(N\text{-}t\text{-}Bu)]$ | $ZX_4$ | $[Et_2Si\text{—}MeC_5H_4(N\text{-}t\text{-}Bu)]ZX_2$ | $[Et_2Si\text{—}MeC_5H_4(N\text{-}t\text{-}Bu)]Z(diene)$ |
| $Li_2[Et_2Si\text{—}MeC_5H_4(N\text{—}Ph)]$ | $ZX_4$ | $[Et_2Si\text{—}MeC_5H_4(N\text{—}Ph)]ZX_2$ | $[Et_2Si\text{—}MeC_5H_4(N\text{—}Ph)]ZR_2$ |
| $Li_2[Et_2Si\text{—}MeC_5H_4(N\text{—}Ph)]$ | $ZX_4$ | $[Et_2Si\text{—}MeC_5H_4(N\text{—}Ph)]ZX_2$ | $[Et_2Si\text{—}MeC_5H_4(N\text{—}Ph)]Z(diene)$ |
| $Li_2[^nBu_2Si\text{—}MeC_5H_4(N\text{-}t\text{-}Bu)]$ | $ZX_4$ | $[^nBu_2Si\text{—}MeC_5H_4(N\text{-}t\text{-}Bu)]ZX_2$ | $[^nBu_2Si\text{—}MeC_5H_4(N\text{-}t\text{-}Bu)]ZR_2$ |
| $Li_2[^nBu_2Si\text{—}MeC_5H_4(N\text{-}t\text{-}Bu)]$ | $ZX_4$ | $[^nBu_2Si\text{—}MeC_5H_4(N\text{-}t\text{-}Bu)]ZX_2$ | $[^nBu_2Si\text{—}MeC_5H_4(N\text{-}t\text{-}Bu)]Z(diene)$ |
| $Li_2[^nBu_2Si\text{—}MeC_5H_4(N\text{—}Ph)]$ | $ZX_4$ | $[^nBu_2Si\text{—}MeC_5H_4(N\text{—}Ph)]ZX_2$ | $[^nBu_2Si\text{—}MeC_5H_4(N\text{—}Ph)]ZR_2$ |
| $Li_2[^nBu_2Si\text{—}MeC_5H_4(N\text{—}Ph)]$ | $ZX_4$ | $[^nBu_2Si\text{—}MeC_5H_4(N\text{—}Ph)]ZX_2$ | $[^nBu_2Si\text{—}MeC_5H_4(N\text{—}Ph)]Z(diene)$ |
| $Li_2[Me_2Si(N\text{-}t\text{-}Bu)(1\text{-methyl-indenyl}]$ | $TiCl_3(THF)_3/PbCl_2$ | $[Me_2Si(N\text{-}t\text{-}Bu)(1\text{-methyl-indenyl}]TiCl_2$ | $[Me_2Si(N\text{-}t\text{-}Bu)(1\text{-methyl-indenyl}]TiR_2$ |
| $Li_2[Me_2Si(N\text{-}t\text{-}Bu)(1\text{-methyl-indenyl}]$ | $TiCl_3(THF)_3/PbCl_2$ | $[Me_2Si(N\text{-}t\text{-}Bu)(1\text{-methyl-indenyl}]TiCl_2$ | $[Me_2Si(N\text{-}t\text{-}Bu)(1\text{-methyl-indenyl}]Ti(diene)$ |

Z = Ti, Zr or Hf;
R = alkyl ($C_1$–$C_{20}$) group.
diene = 1,3-butadiene and its isomers, 1,3-pentadiene, 2,4-pentadiene, 2,4-hexadiene and the like.

Illustrative pre-catalysts that may be employed in the practice of the present invention include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
pentamethylcyclopentadienyltitaniumdimethylchloride,
($\eta^5$-2,4-dimethyl-1,3-pentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-$\eta$-1,4,5,6,7,8-hexahydronaphthalenyl)titaniumtrimethyl,
(1,1,2,3-tetramethyl-2,3,4,9,10-$\eta$-1,4,5,6,7,8-hexahydronaphthalenyl)titaniumtrimethyl,
(tert-butylamido) (tetramethyl-$\eta^5$-cyclopentadienyl) dimethylsilanetitanium dichloride,
(tert-butylamido) (tetramethyl-$\eta^5$-cyclopentadienyl) dimethylsilanetitaniumdimethyl,
(tert-butylamido) (tetramethyl-$\eta^5$-cyclopentadienyl)-1,2-ethanediyltitanium dimethyl,
(tert-butylamido) (tetramethyl-$\eta^5$-indenyl) dimethylsilanetitanium dimethyl,
(tert-butylamido) (tetramethyl-$\eta^5$-cyclopentadienyl) dimethylsilane titanium (III) 2-(dimethylamino)benzyl;
(tert-butylamido) (tetramethyl-$\eta^5$-cyclopentadienyl) dimethylsilanetitanium (III) allyl,
(tert-butylamido) (tetramethyl-$\eta^5$-cyclopentadienyl) dimethylsilanetitanium (II) 1,4-diphenyl-1,3-butadiene,
(tert-butylamido) (2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl) dimethylsilanetitanium (II) 1,4diphenyl-1,3-butadiene,
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methyl-4-phenylindenyl) dimethylsilanetitanium (II)1,4-diphenyl-1,3-butadiene,
(tert-butylamido) (tetramethyl-$\eta^5$-cyclopentadienyl) dimethyl-silanetitanium (IV) 1,3-butadiene,
(tert-butylamido) (tetramethyl-$\eta^5$-cyclopentadienyl) dimethyl-silanetitanium (II) 1,4-dibenzyl-1,3-butadiene,
(tert-butylamido) (tetramethyl-$\eta^5$-cyclopentadienyl) dimethyl-silanetitanium (II) 2,4-hexadiene,
(tert-butylamido) (tetramethyl-$\eta^5$-cyclopentadienyl) dimethyl-silanetitanium (II) 3-methyl-1,3-pentadiene,
(tert-butylamido)(2,4-dimethyl-1,3-pentadien-2-yl) dimethyl-silanetitaniumdimethyl,
(tert-butylamido)(1,1-dimethyl-2,3,4,9,10-$\eta$-1,4,5,6,7,8-hexahydronaphthalen-4-yl) dimethylsilanetitaniumdimethyl, and
(tert-butylamido)(1,1,2,3-tetramethyl-2,3,4,9,10-$\Pi$-1,4,5,6,7,8-hexahydronaphthalen-4-yl) dimethylsilanetitanium-dimethyl.

Bis(Cp*) containing complexes including bridged complexes suitable for use in the present invention include:
biscyclopentadienylzirconiumdimethyl,
biscyclopentadienyltitaniumdiethyl,
cyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
biscyclopentadienyltitaniummethylmethoxide,
biscyclopentadienyltitaniummethylchloride,
bispentamethylcyclopentadienyltitaniumdimethyl,
bisindenyltitaniumdimethyl,
indenylfluorenyltitaniumdiethyl,
bisindenyltitaniummethyl(2-(dimethylamino) benzyl),
bisindenyltitaniummethyltrimethylsilyl,
bistetrahydroindenyltitaniummethyltrimethylsilyl,
bispentamethylcyclopentadienyltitaniumdiisopropyl,
bispentamethylcyclopentadienyltitaniumdibenzyl,
bispentamethylcyclopentadienyltitaniummethylmethoxide,
bispentamethylcyclopentadienyltitaniummethylchloride,
(dimethylsilyl-bis-cyclopentadienyl)zirconiumdimethyl,
(dimethylsilyl-bis-pentamethylcyclopentadienyl)titanium-2,4-pentadienyl,
(dimethylsilyl-bis-t-butylcyclopentadienyl) zirconiumdichloride,
(methylene-bis-pentamethylcyclopentadienyl)titanium(III) 2-(dimethylamino)benzyl,
(dimethylsilyl-bis-indenyl) zirconiumdichloride,
(dimethylsilyl-bis-2-methylindenyl) zirconiumdimethyl,
(dimethylsilyl-bis-2-methyl-4-phenylindenyl) zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene,
(dimethylsilyl-bis-tetrahydroindenyl)zirconium(II) 1,4-diphenyl-1,3-butadiene,
(dimethylsilyl-bis-fluorenyl) zirconiumdichloride,
(dimethylsilyl-bis-tetrahydrofluorenyl) zirconiumdi (trimethylsilyl),
(isopropylidene) (cyclopentadienyl) (fluorenyl) zirconiumdibenzyl, and
(dimethylsilylpentamethylcyclopentadienylfluorenyl) zirconiumdimethyl.

Specific compounds represented by Formula VII include:
(tert-butylamido) (tetramethyl-$\eta^5$-cyclopentadienyl)-1,2-ethanediylzirconium dimethyl,
(tert-butylamido) (tetramethyl-$\eta^5$-cyclopentadienyl)-1,2-ethanediyltitanium dimethylbenzyl, (methylamido) (tetramethyl-$\eta^5$-cyclopentadienyl)-1,2-ethanediylzirconium dibenzhydryl,
(methylamido) (tetramethyl-$\eta^5$-cyclopentadienyl)-1,2-ethanediyltitanium dineopentyl, (ethylamido) (tetramethyl-$\eta^5$ cyclopentadienyl)-methylenetitanium diphenyl,
(tert-butylamido)dibenzyl(tetramethyl-$\eta^5$-cyclopentadienyl)silanezirconium dibenzyl,
(benzylamido)dimethyl(tetramethyl-$\eta^5$-cyclopentadienyl) silanetitanium di(trimethylsilyl),
(phenylphosphido)dimethyl (tetramethyl-$\eta^5$-cyclopentadienyl)silanezirconium dibenzyl, and the like.

Other pre-catalysts useful in the preparation of catalyst compositions according to this invention, especially compounds containing other Group 4 metals, will, of course, be apparent to those skilled in the art. While methods for preparing the above catalysts are conventional and well known in the art, it is necessary to adapt those methods or reaction schemes such that the reactants used to form the pre-catalyst are added to the reaction mixture of the present invention in order to form, in situ, the desired pre-catalyst(s). Since the pre-catalyst(s) are formed in situ, it is to be understood that impregnation and activation of the pre-catalyst also occurs in situ and, therefore, identification of discrete pre-catalyst species may not be observed.

The above described metallocene and constrained geometry pre-catalyst compounds are well known. Reactants useful for synthesizing such pre-catalyst compounds and the methods of forming the same have been described in various publications, including U.S. Pat. Nos. 5,064,802; 5,321,106; 5,399,636; 5,541,272; 5,624,878; 5,807,938; EP 890,581; PCT/US91/01860; and PCT/US91/04390. The teaching of each of the above cited references are incorporated herein in its entirety by reference.

In formulas I and III to XIV, each $L^3$ group is preferably a halogen atom, an unsubstituted hydrocarbyl or a hydrocarbyloxy group. The most preferred compounds are those having each $L^3$ being halogen. More specifically with regard to the Group (2) bi- or tridentate transition metal compound, the hydrocarbon-based radical or group of L and L' can be substituted or unsubstituted, cyclic or non-cyclic, linear or branched, aliphatic, aromatic, or mixed aliphatic and aromatic including hydrocarbylene, hydrocarbyloxy, hydrocarbylsilyl, hydrocarbylamino, and hydrocarbylsiloxy radicals having up to 50 non-hydrogen atoms. The preferred L and L' groups are independently selected from halo, hydrocarbyl, and substituted hydrocarbyl radicals. The hydrocarbon-based radical may typically contain from 1 to about 24 carbon atoms, preferably from 1 to about 12 carbon atoms and the substituent group is preferably a halogen atom. The lines joining each A to each other A represent a hydrocarbon-based radical, typically a $C_2$ to $C_{90}$ (e.g., $C_2$ to $C_{20}$) preferably $C_3$ to $C_{30}$ (e.g., $C_3$ to $C_{12}$) hydrocarbon-based radical, such as a hydrocarbylene radical providing a ring or fused ring hydrocarbylene structure or substituted hydrocarbylene structure. Portions of the structure may be comprised of carbon-carbon double bonds, carbon-carbon single bonds, carbon-A atom double bonds and carbon-A atom single bonds. Typically, for the bidentate and tridentate transition metal compounds, A, Z and the carbons includable in the lines connecting the (A) groups collectively can be joined to typically make a 4 to 7, preferably 5 to 7 member ring structures. The bonds between each A atom of the pre-catalyst and the transition metal Z and between L and Z can be either dative or covalent. Dative bonds represent a relationship between an electron rich A atom and the metal Z whereby the electron density of the metal is increased by providing electrons to the empty orbitals of the metal and do not induce any change in the oxidation state of the metal Z. Similar considerations apply to the relationship between Z and The above described bidentate and tridentate pre-catalyst compounds are known. Reactants useful for synthesizing such pre-catalyst compounds and the methods of forming the same have been described in various publications, including PCT Pub. Nos. WO 96/23010; WO 99/46302; WO 99/46303; and WO 99/46304; U.S. Pat. Nos. 5,880,241; 5,880,323; 5,866,663; 5,886,224; and 5,891,963; Journal of the American Chemical Society (JACS) 1998, 120, 6037–6046, JACS 1995, 117, 6414–6415 and Supplemental Teachings; JACS 1996, 118, 1518; Macromol. Rapid Commun. 19, 31–34 (1998); Caltech Highlights 1997, 65–66; Chemical Week Apr. 29, 1998, 72; C&EN Apr. 13, 1998 11–12; JACS 1998, 120, 4049–4050; Japanese Patent Application 02-078,663, and Angew. Chem. Int. Ed. 1999, vol 38, pp 428–447, The Search for New-Generation Olefin Polymerization Catalysts: Life Beyond Metallocenes. The teaching of each of the above cited references are incorporated herein in its entirety by reference.

In formulas X and XI, each L and L' group is preferably a halogen atom, an unsubstituted hydrocarbyl or a hydrocarbyloxy group. The most preferred compounds are those having each L being halogen. Preferred bidentate pre-catalyst compounds may, for example be represented as compounds of the formula:

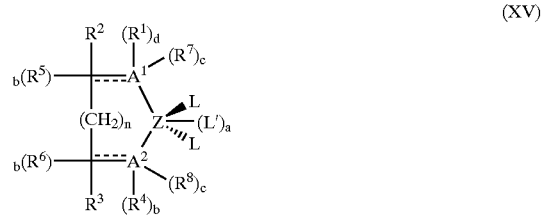

(XV)

wherein n is an integer which can vary from 0 to 3, preferably 0 or 1; a, b, c, and d each independently represents a 1 or 0 to indicate whether its associated R group is present (1) or not (0);

$R^1$ and $R^4$ are each independently selected from an unsubstituted or substituted $C_1$–$C_{20}$, preferably $C_3$–$C_{20}$ hydrocarbyl, such as alkyl, aryl, alkaryl or aralkyl group, as for example, i-propyl; t-butyl; 2,4,6-trimethylphenyl; 2-methylphenyl; 2,6-diisopropylphenyl; their fluorinated derivatives and the like; or with adjacent groups, together, may represent a $C_3$–$C_{20}$ hydrocarbylene group;

$R^2$, $R^3$, $R^5$, $R^6$, $R^7$, and $R^8$ are each independently selected from hydrogen, an unsubstituted or substituted $C_1$–$C_{20}$ hydrocarbyl group such as an alkyl, aryl, alkaryl or aralkyl group, as for example, methyl, ethyl, i-propyl, butyl (all isomers), phenyl, tolyl, 2,6-diisopropylphenyl and the like; or any R groups and adjacent carbon atoms, such as $R^2$ and $R^3$, taken together can provide an unsubstituted or substituted $C_3$–$C_{20}$ ring forming hydrocarbylene group, such as hexylene, 1,8-naphthylene and the like.

Z, A and each L and L' are as defined above in connection with Formula X. It is preferred that Z be selected from nickel or palladium and that each L and L' be independently selected from chlorine, bromine, iodine or a $C_1$–$C_8$ (more preferably $C_1$–$C_4$) alkyl. The bonds depicted by a dotted line signify the possibility that the atoms bridged by said dotted line may be bridged by a single or double bond.

It will be understood that the particular identity of b, c, and d in Formula XV will be dependent on (i) the identity of Z, (ii) the identity of heteroatom A, (iii) whether the bond between heteroatom A and its adjacent ring carbon is single or double, and (iv) whether the bond between heteroatom A and Z is dative or covalent.

More specifically, when $A^1$ in Formula XV is nitrogen it will always have at least 3 available vacancies for bonding. If the bond between such N and its adjacent ring carbon is a double covalent bond, the b for $R^5$ will be zero, and only one further vacancy will be available in the N for either a covalent bond with Z, in which case c and d are zero, or if the bond with Z is dative, the N can covalently bond with its associated $R^1$ or $R^7$ group in which case either d or c is 1. Similarly, if the bonds between the N and the adjacent ring carbon and between N and Z are single covalent, the b of $R^5$ can be 1, and either d or the c of $R^7$ will be 1. Alternatively if the bond between N and Z is dative in this scenario, both d, and the c of $R^7$ can be 1.

The above rules are modified when $A^1$ in Formula XV is oxygen because oxygen has only 2 available vacancies rather than the 3 vacancies for N. Thus, when $A^1$ is oxygen and is double covalently bonded to the adjacent ring carbon, the bond between $A^1$ and Z will be dative and b of $R^5$, c of $R^7$ and d will be 0. If such double bond is replaced by a single bond, the b of $R^5$ can be 1 and either the bond between $A^1$ and Z is single covalent, in which case c of $R^2$ and d are both 0, or if dative, either c of $R^7$ or d can be 1.

The vacancy rules when $A^1$ is sulfur are the same as for $A^1$ being oxygen. Phosphorous typically has 3 available vacancies for 3 single covalent bonds or 1 double covalent bond and 1 single covalent bond. Phosphorous will typically not covalently bond with Z, its association with Z being that of a dative bond.

Similar considerations to those described above for $A^1$ apply in respect to $A^2$ of Formula XV and in respect to all A groups and a, b, c, of Formula XVI discussed hereinafter.

Illustrative of bidentate pre-catalyst compounds which are useful in providing the catalyst composition of the present invention are compounds of XV having the following combination of groups:

TABLE I (XV)

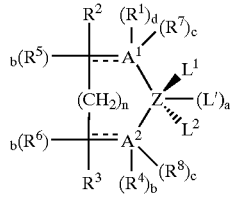

| # | n | $R^1/R^4$ | $R^2/R^3$ | $R^5/R^6$ | $A^1$ | $A^2$ | $L^1$ | $L^2$ | a | b | c | d | Z |
|---|---|-----------|-----------|-----------|-------|-------|-------|-------|---|---|---|---|----|
| 1 | 0 | 2,6-iPr$_2$Ph | Me | N/A | N | N | Me | e | 0 | 0 | 0 | 1 | Pd |
| 2 | 0 | 2,6-iPr$_2$Ph | Me | N/A | N | N | Me | Me | 0 | 0 | 0 | 1 | Pd |
| 3 | 0 | 2,6-iPr$_2$Ph | Me | N/A | N | N | Me | Br | 0 | 0 | 0 | 1 | Pd |
| 4 | 0 | 2,6-iPr$_2$Ph | Me | N/A | N | N | Me | Cl | 0 | 0 | 0 | 1 | Pd |
| 5 | 0 | 2,6-iPr$_2$Ph | Me | N/A | N | N | Br | Br | 0 | 0 | 0 | 1 | Pd |
| 6 | 0 | 2,6-iPr$_2$Ph | Me | N/A | N | N | Cl | Cl | 0 | 0 | 0 | 1 | Pd |
| 7 | 0 | 2,6-iPr$_2$Ph | Me | N/A | N | N | Br | Br | 0 | 0 | 0 | 1 | Ni |
| 8 | 0 | 2,6-iPr$_2$Ph | Me | N/A | N | N | Cl | Cl | 0 | 0 | 0 | 1 | Ni |
| 9 | 0 | 2,6-iPr$_2$Ph | Me | N/A | N | N | Me | Me | 0 | 0 | 0 | 1 | Ni |
| 10 | 0 | 2,6-iPr$_2$Ph | Me | N/A | N | N | Me | Br | 0 | 0 | 0 | 1 | Ni |
| 11 | 0 | 2,6-iPr$_2$Ph | Me | N/A | N | N | Me | Cl | 0 | 0 | 0 | 1 | Ni |
| 12 | 0 | 2,6-iPr$_2$Ph | Me | N/A | O | N | Me | e | 0 | 0 | 0 | 0 | Pd |
| 13 | 0 | 2,6-iPr$_2$Ph | Me | N/A | O | N | Me | Me | 0 | 0 | 0 | 0 | Pd |
| 14 | 0 | 2,6-iPr$_2$Ph | Me | N/A | O | N | Me | Br | 0 | 0 | 0 | 0 | Pd |
| 15 | 0 | 2,6-iPr$_2$Ph | Me | N/A | O | N | Me | Cl | 0 | 0 | 0 | 0 | Pd |
| 16 | 0 | 2,6-iPr$_2$Ph | Me | N/A | O | N | Br | Br | 0 | 0 | 0 | 0 | Pd |
| 17 | 0 | 2,6-iPr$_2$Ph | Me | N/A | O | N | Cl | Cl | 0 | 0 | 0 | 0 | Pd |
| 18 | 0 | 2,6-iPr$_2$Ph | Me | N/A | O | N | Br | Br | 0 | 0 | 0 | 0 | Ni |
| 19 | 0 | 2,6-iPr$_2$Ph | Me | N/A | O | N | Cl | Cl | 0 | 0 | 0 | 0 | Ni |
| 20 | 0 | 2,6-iPr$_2$Ph | Me | N/A | O | N | Me | Me | 0 | 0 | 0 | 0 | Ni |
| 21 | 0 | 2,6-iPr$_2$Ph | Me | N/A | O | N | Me | Br | 0 | 0 | 0 | 0 | Ni |
| 22 | 0 | 2,6-iPr$_2$Ph | Me | N/A | O | N | Me | Cl | 0 | 0 | 0 | 0 | Ni |
| 23 | 1 | 2,6-iPr$_2$Ph | Me | N/A | N | N | Me | e | 0 | 0 | 0 | 1 | Pd |

TABLE I-continued

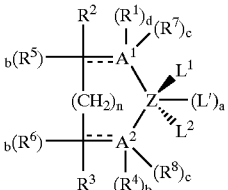

(XV)

| # | n | $R^1/R^4$ | $R^2/R^3$ | $R^5/R^6$ | $A^1$ | $A^2$ | $L^1$ | $L^2$ | a | b | c | d | Z |
|---|---|---|---|---|---|---|---|---|---|---|---|---|---|
| 24 | 1 | 2,6-iPr$_2$Ph | Me | N/A | N | N | Me | Me | 0 | 0 | 0 | 1 | Pd |
| 25 | 1 | 2,6-iPr$_2$Ph | Me | N/A | N | N | Me | Br | 0 | 0 | 0 | 1 | Pd |
| 26 | 1 | 2,6-iPr$_2$Ph | Me | N/A | N | N | Me | Cl | 0 | 0 | 0 | 1 | Pd |
| 27 | 1 | 2,6-iPr$_2$Ph | Me | N/A | N | N | Br | Br | 0 | 0 | 0 | 1 | Pd |
| 28 | 1 | 2,6-iPr$_2$Ph | Me | N/A | N | N | Cl | Cl | 0 | 0 | 0 | 1 | Pd |
| 29 | 1 | 2,6-iPr$_2$Ph | Me | N/A | N | N | Br | Br | 0 | 0 | 0 | 1 | Ni |
| 30 | 1 | 2,6-iPr$_2$Ph | Me | N/A | N | N | Cl | Cl | 0 | 0 | 0 | 1 | Ni |
| 31 | 1 | 2,6-iPr$_2$Ph | Me | N/A | N | N | Me | Me | 0 | 0 | 0 | 1 | Ni |
| 32 | 1 | 2,6-iPr$_2$Ph | Me | N/A | N | N | Me | Br | 0 | 0 | 0 | 1 | Ni |
| 33 | 1 | 2,6-iPr$_2$Ph | Me | N/A | N | N | Me | Cl | 0 | 0 | 0 | 1 | Ni |
| 34 | 0 | 2,5-iPr$_2$C$_4$H$_2$N | Me | N/A | N | N | Br | Br | 0 | 0 | 0 | 1 | Ni |
| 35 | 0 | 2,5-iPr$_2$C$_4$H$_2$N | Me | N/A | N | N | Cl | Cl | 0 | 0 | 0 | 1 | Ni |
| 36 | 0 | 2,5-iPr$_2$C$_4$H$_2$N | Me | N/A | N | N | Me | Me | 0 | 0 | 0 | 1 | Ni |
| 37 | 0 | 2,5-iPr$_2$C$_4$H$_2$N | Me | N/A | N | N | Me | Br | 0 | 0 | 0 | 1 | Ni |
| 38 | 0 | 2,5-iPr$_2$C$_4$H$_2$N | Me | N/A | N | N | Me | Cl | 0 | 0 | 0 | 1 | Ni |
| 39 | 0 | 2,6-Me$_2$Ph | Me | N/A | N | N | Me | e | 0 | 0 | 0 | 1 | Pd |
| 40 | 0 | 2,6-Me$_2$Ph | Me | N/A | N | N | Me | Me | 0 | 0 | 0 | 1 | Pd |
| 41 | 0 | 2,6-Me$_2$Ph | Me | N/A | N | N | Me | Br | 0 | 0 | 0 | 1 | Pd |
| 42 | 0 | 2,6-Me$_2$Ph | Me | N/A | N | N | Me | Cl | 0 | 0 | 0 | 1 | Pd |
| 43 | 0 | 2,6-Me$_2$Ph | Me | N/A | N | N | Br | Br | 0 | 0 | 0 | 1 | Pd |
| 44 | 0 | 2,6-Me$_2$Ph | Me | N/A | N | N | Cl | Cl | 0 | 0 | 0 | 1 | Pd |
| 45 | 0 | 2,6-iPr$_2$Ph | H | N/A | N | N | Me | e | 0 | 0 | 0 | 1 | Pd |
| 46 | 0 | 2,6-iPr$_2$Ph | H | N/A | N | N | Me | Me | 0 | 0 | 0 | 1 | Pd |
| 47 | 0 | 2,6-iPr$_2$Ph | H | N/A | N | N | Me | Br | 0 | 0 | 0 | 1 | Pd |
| 48 | 0 | 2,6-iPr$_2$Ph | H | N/A | N | N | Me | Cl | 0 | 0 | 0 | 1 | Pd |
| 49 | 0 | 2,6-iPr$_2$Ph | H | N/A | N | N | Br | Br | 0 | 0 | 0 | 1 | Pd |
| 50 | 0 | 2,6-iPr$_2$Ph | H | N/A | N | N | Cl | Cl | 0 | 0 | 0 | 1 | Pd |
| 51 | 0 | 2,6-iPr$_2$Ph | H | N/A | N | N | Br | Br | 0 | 0 | 0 | 1 | Ni |
| 52 | 0 | 2,6-iPr$_2$Ph | H | N/A | N | N | Cl | Cl | 0 | 0 | 0 | 1 | Ni |
| 53 | 0 | 2,6-iPr$_2$Ph | H | N/A | N | N | Me | Me | 0 | 0 | 0 | 1 | Ni |
| 54 | 0 | 2,6-iPr$_2$Ph | H | N/A | N | N | Me | Br | 0 | 0 | 0 | 1 | Ni |
| 55 | 0 | 2,6-iPr$_2$Ph | H | N/A | N | N | Me | Cl | 0 | 0 | 0 | 1 | Ni |
| 56 | 0 | 2,5-iPr$_2$C$_4$H$_2$N | H | N/A | N | N | Br | Br | 0 | 0 | 0 | 1 | Ni |
| 57 | 0 | 2,5-iPr$_2$C$_4$H$_2$N | H | N/A | N | N | Cl | Cl | 0 | 0 | 0 | 1 | Ni |
| 58 | 0 | 2,5-iPr$_2$C$_4$H$_2$N | H | N/A | N | N | Me | Me | 0 | 0 | 0 | 1 | Ni |

TABLE I-continued

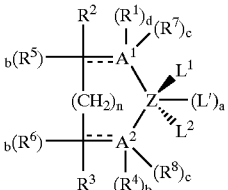

(XV)

| # | n | R¹/R⁴ | R²/R³ | R⁵/R⁶ | A¹ | A² | L¹ | L² | a | b | c | d | Z |
|---|---|-------|-------|-------|----|----|----|----|---|---|---|---|----|
| 59 | 0 | 2,5-iPr₂C₄H₂N | H | N/A | N | N | Me | Br | 0 | 0 | 0 | 1 | Ni |
| 60 | 0 | 2,5-iPr₂C₄H₂N | H | N/A | N | N | Me | Cl | 0 | 0 | 0 | 1 | Ni |
| 61 | 0 | 2,6-iPr₂Ph | An | N/A | N | N | Me | e | 0 | 0 | 0 | 1 | Pd |
| 62 | 0 | 2,6-iPr₂Ph | An | N/A | N | N | Me | Me | 0 | 0 | 0 | 1 | Pd |
| 63 | 0 | 2,6-iPr₂Ph | An | N/A | N | N | Me | Br | 0 | 0 | 0 | 1 | Pd |
| 64 | 0 | 2,6-iPr₂Ph | An | N/A | N | N | Me | Cl | 0 | 0 | 0 | 1 | Pd |
| 65 | 0 | 2,6-iPr₂Ph | An | N/A | N | N | Br | Br | 0 | 0 | 0 | 1 | Pd |
| 66 | 0 | 2,6-iPr₂Ph | An | N/A | N | N | Cl | Cl | 0 | 0 | 0 | 1 | Pd |
| 67 | 0 | 2,5-iPr₂C₄H₂N | An | N/A | N | N | Me | e | 0 | 0 | 0 | 1 | Pd |
| 68 | 0 | 2,5-iPr₂C₄H₂N | An | N/A | N | N | Me | Me | 0 | 0 | 0 | 1 | Pd |
| 69 | 0 | 2,5-iPr₂C₄H₂N | An | N/A | N | N | Me | Br | 0 | 0 | 0 | 1 | Pd |
| 70 | 0 | 2,5-iPr₂C₄H₂N | An | N/A | N | N | Me | Cl | 0 | 0 | 0 | 1 | Pd |
| 71 | 0 | 2,5-iPr₂C₄H₂N | An | N/A | N | N | Br | Br | 0 | 0 | 0 | 1 | Pd |
| 72 | 0 | 2,5-iPr₂C₄H₂N | An | N/A | N | N | Cl | Cl | 0 | 0 | 0 | 1 | Pd |
| 73 | 0 | 2,6-iPr₂Ph | An | N/A | N | N | Br | Br | 0 | 0 | 0 | 1 | Ni |
| 74 | 0 | 2,6-iPr₂Ph | An | N/A | N | N | Cl | Cl | 0 | 0 | 0 | 1 | Ni |
| 75 | 0 | 2,6-iPr₂Ph | An | N/A | N | N | Me | Me | 0 | 0 | 0 | 1 | Ni |
| 76 | 0 | 2,6-iPr₂Ph | An | N/A | N | N | Me | Br | 0 | 0 | 0 | 1 | Ni |
| 77 | 0 | 2,6-iPr₂Ph | An | N/A | N | N | Me | Cl | 0 | 0 | 0 | 1 | Ni |
| 78 | 0 | 2,5-iPr₂C₄H₂N | An | N/A | N | N | Br | Br | 0 | 0 | 0 | 1 | Ni |
| 79 | 0 | 2,5-iPr₂C₄H₂N | An | N/A | N | N | Cl | Cl | 0 | 0 | 0 | 1 | Ni |
| 80 | 0 | 2,5-iPr₂C₄H₂N | An | N/A | N | N | Me | Me | 0 | 0 | 0 | 1 | Ni |
| 81 | 0 | 2,5-iPr₂C₄H₂N | An | N/A | N | N | Me | Br | 0 | 0 | 0 | 1 | Ni |
| 82 | 0 | 2,5-iPr₂C₄H₂N | An | N/A | N | N | Me | Cl | 0 | 0 | 0 | 1 | Ni |
| 83 | 0 | 2,6-iPr₂Ph | k | N/A | N | N | Me | e | 0 | 0 | 0 | 1 | Pd |
| 84 | 0 | 2,6-iPr₂Ph | k | N/A | N | N | Me | Me | 0 | 0 | 0 | 1 | Pd |
| 85 | 0 | 2,6-iPr₂Ph | k | N/A | N | N | Me | Br | 0 | 0 | 0 | 1 | Pd |
| 86 | 0 | 2,6-iPr₂Ph | k | N/A | N | N | Me | Cl | 0 | 0 | 0 | 1 | Pd |
| 87 | 0 | 2,6-iPr₂Ph | k | N/A | N | N | Br | Br | 0 | 0 | 0 | 1 | Pd |
| 88 | 0 | 2,6-iPr₂Ph | k | N/A | N | N | Cl | Cl | 0 | 0 | 0 | 1 | Pd |
| 89 | 0 | 2,6-iPr₂Ph | k | N/A | N | N | Br | Br | 0 | 0 | 0 | 1 | Ni |
| 90 | 0 | 2,6-iPr₂Ph | k | N/A | N | N | Cl | Cl | 0 | 0 | 0 | 1 | Ni |

TABLE I-continued (XV)

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 91 | 0 | 2,6-iPr₂Ph | k | N/A | N | N | Me | Me | 0 | 0 | 0 | 1 | Ni |
| 92 | 0 | 2,6-iPr₂Ph | k | N/A | N | N | Me | Br | 0 | 0 | 0 | 1 | Ni |
| 93 | 0 | 2,6-iPr₂Ph | k | N/A | N | N | Me | Cl | 0 | 0 | 0 | 1 | Ni |
| 94 | 0 | 2,5-iPr₂C₄H₂N | k | N/A | N | N | Me | e | 0 | 0 | 0 | 1 | Pd |
| 95 | 0 | 2,5-iPr₂C₄H₂N | k | N/A | N | N | Me | Me | 0 | 0 | 0 | 1 | Pd |
| 96 | 0 | 2,5-iPr₂C₄H₂N | k | N/A | N | N | Me | Br | 0 | 0 | 0 | 1 | Pd |
| 97 | 0 | 2,5-iPr₂C₄H₂N | k | N/A | N | N | Me | Cl | 0 | 0 | 0 | 1 | Pd |
| 98 | 0 | 2,5-iPr₂C₄H₂N | k | N/A | N | N | Br | Br | 0 | 0 | 0 | 1 | Pd |
| 99 | 0 | 2,5-iPr₂C₄H₂N | k | N/A | N | N | Cl | Cl | 0 | 0 | 0 | 1 | Pd |
| 100 | 0 | 2,5-iPr₂C₄H₂N | k | N/A | N | N | Br | Br | 0 | 0 | 0 | 1 | Ni |
| 101 | 0 | 2,5-iPr₂C₄H₂N | k | N/A | N | N | Cl | Cl | 0 | 0 | 0 | 1 | Ni |
| 102 | 0 | 2,5-iPr₂C₄H₂N | k | N/A | N | N | Me | Me | 0 | 0 | 0 | 1 | Ni |
| 103 | 0 | 2,5-iPr₂C₄H₂N | k | N/A | N | N | Me | Br | 0 | 0 | 0 | 1 | Ni |
| 104 | 0 | 2,5-iPr₂C₄H₂N | k | N/A | N | N | Me | Cl | 0 | 0 | 0 | 1 | Ni |
| 105 | 0 | 2,6-Me₂Ph | An | N/A | N | N | Me | e | 0 | 0 | 0 | 1 | Pd |
| 106 | 0 | 2,6-Me₂Ph | An | N/A | N | N | Me | Me | 0 | 0 | 0 | 1 | Pd |
| 107 | 0 | 2,6-Me₂Ph | An | N/A | N | N | Me | Br | 0 | 0 | 0 | 1 | Pd |
| 108 | 0 | 2,6-Me₂Ph | An | N/A | N | N | Me | Cl | 0 | 0 | 0 | 1 | Pd |
| 109 | 0 | 2,6-Me₂Ph | An | N/A | N | N | Br | Br | 0 | 0 | 0 | 1 | Pd |
| 110 | 0 | 2,6-Me₂Ph | An | N/A | N | N | Cl | Cl | 0 | 0 | 0 | 1 | Pd |
| 111 | 0 | 2,6-Me₂Ph | H | N/A | N | N | Me | e | 0 | 0 | 0 | 1 | Pd |
| 112 | 0 | 2,6-Me₂Ph | H | N/A | N | N | Me | Me | 0 | 0 | 0 | 1 | Pd |
| 113 | 0 | 2,6-Me₂Ph | H | N/A | N | N | Me | Br | 0 | 0 | 0 | 1 | Pd |
| 114 | 0 | 2,6-Me₂Ph | H | N/A | N | N | Me | Cl | 0 | 0 | 0 | 1 | Pd |
| 115 | 0 | 2,6-Me₂Ph | H | N/A | N | N | Br | Br | 0 | 0 | 0 | 1 | Pd |
| 116 | 0 | 2,6-Me₂Ph | H | N/A | N | N | Cl | Cl | 0 | 0 | 0 | 1 | Pd |
| 117 | 0 | 2,6-Me₂Ph | k | N/A | N | N | Me | e | 0 | 0 | 0 | 1 | Pd |
| 118 | 0 | 2,6-Me₂Ph | k | N/A | N | N | Me | Me | 0 | 0 | 0 | 1 | Pd |
| 119 | 0 | 2,6-Me₂Ph | k | N/A | N | N | Me | Br | 0 | 0 | 0 | 1 | Pd |
| 120 | 0 | 2,6-Me₂Ph | k | N/A | N | N | Me | Cl | 0 | 0 | 0 | 1 | Pd |
| 121 | 0 | 2,6-Me₂Ph | k | N/A | N | N | Br | Br | 0 | 0 | 0 | 1 | Pd |
| 122 | 0 | 2,6-Me₂Ph | k | N/A | N | N | Cl | Cl | 0 | 0 | 0 | 1 | Pd |
| 123 | 0 | 2,5-iPr₂C₄H₂N | k | N/A | N | N | Me | e | 0 | 0 | 0 | 1 | Pd |
| 124 | 0 | 2,5-iPr₂C₄H₂N | k | N/A | N | N | Me | Me | 0 | 0 | 0 | 1 | Pd |
| 125 | 0 | 2,5-iPr₂C₄H₂N | k | N/A | N | N | Me | Br | 0 | 0 | 0 | 1 | Pd |
| 126 | 0 | 2,5-iPr₂C₄H₂N | k | N/A | N | N | Me | Cl | 0 | 0 | 0 | 1 | Pd |
| 127 | 0 | 2,5-iPr₂C₄H₂N | k | N/A | N | N | Br | Br | 0 | 0 | 0 | 1 | Pd |
| 128 | 0 | 2,5-iPr₂C₄H₂N | k | N/A | N | N | Cl | Cl | 0 | 0 | 0 | 1 | Pd |
| 129 | 0 | 2,6-Me₂Ph | Me | N/A | N | N | Br | Br | 0 | 0 | 0 | 1 | Ni |
| 130 | 0 | 2,6-Me₂Ph | Me | N/A | N | N | Cl | Cl | 0 | 0 | 0 | 1 | Ni |
| 131 | 0 | 2,6-Me₂Ph | Me | N/A | N | N | Me | Me | 0 | 0 | 0 | 1 | Ni |
| 132 | 0 | 2,6-Me₂Ph | Me | N/A | N | N | Me | Br | 0 | 0 | 0 | 1 | Ni |
| 133 | 0 | 2,6-Me₂Ph | Me | N/A | N | N | Me | Cl | 0 | 0 | 0 | 1 | Ni |
| 134 | 0 | 2,6-Me₂Ph | k | N/A | N | N | Br | Br | 0 | 0 | 0 | 1 | Ni |
| 135 | 0 | 2,6-Me₂Ph | k | N/A | N | N | Cl | Cl | 0 | 0 | 0 | 1 | Ni |

TABLE I-continued (XV)

$$\begin{array}{c} R^2 \quad (R^1)_d (R^7)_c \\ {}_b(R^5) - A^1 - L^1 \\ (CH_2)_n \quad Z - (L')_a \\ {}_b(R^6) - A^2 - L^2 \\ R^3 \quad (R^4)_b (R^8)_c \end{array}$$

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 136 | 0 | 2,6-Me₂Ph | k | N/A | N | N | Me | Me | 0 | 0 | 0 | 1 | Ni |
| 137 | 0 | 2,6-Me₂Ph | k | N/A | N | N | Me | Br | 0 | 0 | 0 | 1 | Ni |
| 138 | 0 | 2,6-Me₂Ph | k | N/A | N | N | Me | Cl | 0 | 0 | 0 | 1 | Ni |
| 139 | 0 | 2,5-iPr₂C₄H₂N | k | N/A | N | N | Br | Br | 0 | 0 | 0 | 1 | Ni |
| 140 | 0 | 2,5-iPr₂C₄H₂N | k | N/A | N | N | Cl | Cl | 0 | 0 | 0 | 1 | Ni |
| 141 | 0 | 2,5-iPr₂C₄H₂N | k | N/A | N | N | Me | Me | 0 | 0 | 0 | 1 | Ni |
| 142 | 0 | 2,5-iPr₂C₄H₂N | k | N/A | N | N | Me | Br | 0 | 0 | 0 | 1 | Ni |
| 143 | 0 | 2,5-iPr₂C₄H₂N | k | N/A | N | N | Me | Cl | 0 | 0 | 0 | 1 | Ni |
| 144 | 0 | 2,4,6-Me₃Ph | Me | N/A | N | N | Me | e | 0 | 0 | 0 | 1 | Pd |
| 145 | 0 | 2,4,6-Me₃Ph | Me | N/A | N | N | Me | Me | 0 | 0 | 0 | 1 | Pd |
| 146 | 0 | 2,4,6-Me₃Ph | Me | N/A | N | N | Me | Br | 0 | 0 | 0 | 1 | Pd |
| 147 | 0 | 2,4,6-Me₃Ph | Me | N/A | N | N | Me | Cl | 0 | 0 | 0 | 1 | Pd |
| 148 | 0 | 2,4,6-Me₃Ph | Me | N/A | N | N | Br | Br | 0 | 0 | 0 | 1 | Pd |
| 149 | 0 | 2,4,6-Me₃Ph | Me | N/A | N | N | Cl | Cl | 0 | 0 | 0 | 1 | Pd |
| 150 | 0 | 2,4,6-Me₃Ph | Me | N/A | N | N | Br | Br | 0 | 0 | 0 | 1 | Ni |
| 151 | 0 | 2,4,6-Me₃Ph | Me | N/A | N | N | Cl | Cl | 0 | 0 | 0 | 1 | Ni |
| 152 | 0 | 2,4,6-Me₃Ph | Me | N/A | N | N | Me | Me | 0 | 0 | 0 | 1 | Ni |
| 153 | 0 | 2,4,6-Me₃Ph | Me | N/A | N | N | Me | Br | 0 | 0 | 0 | 1 | Ni |
| 154 | 0 | 2,4,6-Me₃Ph | Me | N/A | N | N | Me | Cl | 0 | 0 | 0 | 1 | Ni |
| 155 | 0 | 2,4,6-Me₃Ph | H | N/A | N | N | Me | e | 0 | 0 | 0 | 1 | Pd |
| 156 | 0 | 2,4,6-Me₃Ph | H | N/A | N | N | Me | Me | 0 | 0 | 0 | 1 | Pd |
| 157 | 0 | 2,4,6-Me₃Ph | H | N/A | N | N | Me | Br | 0 | 0 | 0 | 1 | Pd |
| 158 | 0 | 2,4,6-Me₃Ph | H | N/A | N | N | Me | Cl | 0 | 0 | 0 | 1 | Pd |
| 159 | 0 | 2,4,6-Me₃Ph | H | N/A | N | N | Br | Br | 0 | 0 | 0 | 1 | Pd |
| 160 | 0 | 2,4,6-Me₃Ph | H | N/A | N | N | Cl | Cl | 0 | 0 | 0 | 1 | Pd |
| 161 | 0 | 2,4,6-Me₃Ph | H | N/A | N | N | Br | Br | 0 | 0 | 0 | 1 | Ni |
| 162 | 0 | 2,4,6-Me₃Ph | H | N/A | N | N | Cl | Cl | 0 | 0 | 0 | 1 | Ni |
| 163 | 0 | 2,4,6-Me₃Ph | H | N/A | N | N | Me | Me | 0 | 0 | 0 | 1 | Ni |
| 164 | 0 | 2,4,6-Me₃Ph | H | N/A | N | N | Me | Br | 0 | 0 | 0 | 1 | Ni |
| 165 | 0 | 2,4,6-Me₃Ph | H | N/A | N | N | Me | Cl | 0 | 0 | 0 | 1 | Ni |
| 166 | 0 | 2,4,6-Me₃Ph | An | N/A | N | N | Me | e | 0 | 0 | 0 | 1 | Pd |
| 167 | 0 | 2,4,6-Me₃Ph | An | N/A | N | N | Me | Me | 0 | 0 | 0 | 1 | Pd |
| 168 | 0 | 2,4,6-Me₃Ph | An | N/A | N | N | Me | Br | 0 | 0 | 0 | 1 | Pd |
| 169 | 0 | 2,4,6-Me₃Ph | An | N/A | N | N | Me | Cl | 0 | 0 | 0 | 1 | Pd |

TABLE I-continued (XV)

$$\text{b(R}^5\text{)}-\overset{\text{R}^2}{\underset{\text{(CH}_2)_n}{|}}\text{A}^1\overset{\text{(R}^1)_d(\text{R}^7)_c}{\underset{}{|}}$$

(structure XV with substituents R¹–R⁸, A¹, A², L¹, L², L', Z)

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 170 | 0 | 2,4,6-Me₃Ph | An | N/A | N | N | Br | Br | 0 | 0 | 0 | 1 | Pd |
| 171 | 0 | 2,4,6-Me₃Ph | An | N/A | N | N | Cl | Cl | 0 | 0 | 0 | 1 | Pd |
| 172 | 0 | 2,4,6-Me₃Ph | An | N/A | N | N | Br | Br | 0 | 0 | 0 | 1 | Ni |
| 173 | 0 | 2,4,6-Me₃Ph | An | N/A | N | N | Cl | Cl | 0 | 0 | 0 | 1 | Ni |
| 174 | 0 | 2,4,6-Me₃Ph | An | N/A | N | N | Me | Me | 0 | 0 | 0 | 1 | Ni |
| 175 | 0 | 2,4,6-Me₃Ph | An | N/A | N | N | Me | Br | 0 | 0 | 0 | 1 | Ni |
| 176 | 0 | 2,4,6-Me₃Ph | An | N/A | N | N | Me | Cl | 0 | 0 | 0 | 1 | Ni |
| 177 | 0 | Ph | j | N/A | N | N | Me | Me | 0 | 0 | 0 | 1 | Pd |
| 178 | 0 | Ph | Me | N/A | N | N | Me | Me | 0 | 0 | 0 | 1 | Pd |
| 179 | 0 | Ph | H | N/A | N | N | Me | Me | 0 | 0 | 0 | 1 | Pd |
| 180 | 0 | Ph | An | N/A | N | N | Me | Me | 0 | 0 | 0 | 1 | Pd |
| 181 | 0 | Ph | j | N/A | N | N | Me | Cl | 0 | 0 | 0 | 1 | Pd |
| 182 | 0 | Ph | Me | N/A | N | N | Me | Cl | 0 | 0 | 0 | 1 | Pd |
| 183 | 0 | Ph | H | N/A | N | N | Me | Cl | 0 | 0 | 0 | 1 | Pd |
| 184 | 0 | Ph | An | N/A | N | N | Me | Cl | 0 | 0 | 0 | 1 | Pd |
| 185 | 0 | 2-PhPh | j | N/A | N | N | Me | Me | 0 | 0 | 0 | 1 | Pd |
| 186 | 0 | 2-PhPh | Me | N/A | N | N | Me | Me | 0 | 0 | 0 | 1 | Pd |
| 187 | 0 | 2-PhPh | H | N/A | N | N | Me | Me | 0 | 0 | 0 | 1 | Pd |
| 188 | 0 | 2-PhPh | An | N/A | N | N | Me | Me | 0 | 0 | 0 | 1 | Pd |
| 189 | 0 | 2-PhPh | j | N/A | N | N | Me | Cl | 0 | 0 | 0 | 1 | Pd |
| 190 | 0 | 2-PhPh | Me | N/A | N | N | Me | Cl | 0 | 0 | 0 | 1 | Pd |
| 191 | 0 | 2-PhPh | H | N/A | N | N | Me | Cl | 0 | 0 | 0 | 1 | Pd |
| 192 | 0 | 2-PhPh | An | N/A | N | N | Me | Cl | 0 | 0 | 0 | 1 | Pd |
| 193 | 0 | 2,6-EtPh | j | N/A | N | N | Me | Me | 0 | 0 | 0 | 1 | Pd |
| 194 | 0 | 2,6-EtPh | Me | N/A | N | N | Me | Me | 0 | 0 | 0 | 1 | Pd |
| 195 | 0 | 2,6-EtPh | H | N/A | N | N | Me | Me | 0 | 0 | 0 | 1 | Pd |
| 196 | 0 | 2,6-EtPh | An | N/A | N | N | Me | Me | 0 | 0 | 0 | 1 | Pd |
| 197 | 0 | 2,6-EtPh | j | N/A | N | N | Me | Cl | 0 | 0 | 0 | 1 | Pd |
| 198 | 0 | 2,6-EtPh | Me | N/A | N | N | Me | Cl | 0 | 0 | 0 | 1 | Pd |
| 199 | 0 | 2,6-EtPh | H | N/A | N | N | Me | Cl | 0 | 0 | 0 | 1 | Pd |
| 200 | 0 | 2,6-EtPh | An | N/A | N | N | Me | Cl | 0 | 0 | 0 | 1 | Pd |
| 201 | 0 | 2-t-BuPh | j | N/A | N | N | Me | Me | 0 | 0 | 0 | 1 | Pd |
| 202 | 0 | 2-t-BuPh | Me | N/A | N | N | Me | Me | 0 | 0 | 0 | 1 | Pd |
| 203 | 0 | 2-t-BuPh | H | N/A | N | N | Me | Me | 0 | 0 | 0 | 1 | Pd |
| 204 | 0 | 2-t-BuPh | An | N/A | N | N | Me | Me | 0 | 0 | 0 | 1 | Pd |
| 205 | 0 | 2-t-BuPh | j | N/A | N | N | Me | Cl | 0 | 0 | 0 | 1 | Pd |
| 206 | 0 | 2-t-BuPh | Me | N/A | N | N | Me | Cl | 0 | 0 | 0 | 1 | Pd |
| 207 | 0 | 2-t-BuPh | H | N/A | N | N | Me | Cl | 0 | 0 | 0 | 1 | Pd |
| 208 | 0 | 2-t-BuPh | An | N/A | N | N | Me | Cl | 0 | 0 | 0 | 1 | Pd |
| 209 | 0 | 1-Np | j | N/A | N | N | Me | Me | 0 | 0 | 0 | 1 | Pd |
| 210 | 0 | 1-Np | Me | N/A | N | N | Me | Me | 0 | 0 | 0 | 1 | Pd |
| 211 | 0 | 1-Np | H | N/A | N | N | Me | Me | 0 | 0 | 0 | 1 | Pd |
| 212 | 0 | 1-Np | An | N/A | N | N | Me | Me | 0 | 0 | 0 | 1 | Pd |
| 213 | 0 | PhMe | j | N/A | N | N | Me | Cl | 0 | 0 | 0 | 1 | Pd |
| 214 | 0 | PhMe | Me | N/A | N | N | Me | Cl | 0 | 0 | 0 | 1 | Pd |
| 215 | 0 | PhMe | H | N/A | N | N | Me | Cl | 0 | 0 | 0 | 1 | Pd |
| 216 | 0 | PhMe | An | N/A | N | N | Me | Cl | 0 | 0 | 0 | 1 | Pd |
| 217 | 0 | PhMe | j | N/A | N | N | Me | Me | 0 | 0 | 0 | 1 | Pd |
| 218 | 0 | PhMe | Me | N/A | N | N | Me | Me | 0 | 0 | 0 | 1 | Pd |
| 219 | 0 | PhMe | H | N/A | N | N | Me | Me | 0 | 0 | 0 | 1 | Pd |
| 220 | 0 | PhMe | An | N/A | N | N | Me | Me | 0 | 0 | 0 | 1 | Pd |
| 221 | 0 | PhMe | j | N/A | N | N | Me | Cl | 0 | 0 | 0 | 1 | Pd |
| 222 | 0 | PhMe | Me | N/A | N | N | Me | Cl | 0 | 0 | 0 | 1 | Pd |
| 223 | 0 | PhMe | H | N/A | N | N | Me | Cl | 0 | 0 | 0 | 1 | Pd |
| 224 | 0 | PhMe | An | N/A | N | N | Me | Cl | 0 | 0 | 0 | 1 | Pd |
| 225 | 0 | Ph₂Me | j | N/A | N | N | Me | Me | 0 | 0 | 0 | 1 | Pd |
| 226 | 0 | Ph₂Me | Me | N/A | N | N | Me | Me | 0 | 0 | 0 | 1 | Pd |
| 227 | 0 | Ph₂Me | H | N/A | N | N | Me | Me | 0 | 0 | 0 | 1 | Pd |

TABLE I-continued (XV)

$$\underset{b(R^6)}{\overset{b(R^5)}{\phantom{-}}}\underset{R^3}{\overset{R^2}{\phantom{-}}} \cdots A^1 \cdots Z \cdots L^1, L^2, (L')_a$$

(structure formula XV with substituents $R^1_d$, $R^7_c$, $R^2$, $R^5$, $R^6$, $R^3$, $R^4_b$, $R^8_c$, $A^1$, $A^2$, $(CH_2)_n$, Z, $L^1$, $L^2$, $(L')_a$)

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 228 | 0 | Ph₂Me | An | N/A | N | N | Me | Me | 0 | 0 | 0 | 1 | Pd |
| 229 | 0 | Ph₂Me | j | N/A | N | N | Me | Cl | 0 | 0 | 0 | 1 | Pd |
| 230 | 0 | Ph₂Me | Me | N/A | N | N | Me | Cl | 0 | 0 | 0 | 1 | Pd |
| 231 | 0 | Ph₂Me | H | N/A | N | N | Me | Cl | 0 | 0 | 0 | 1 | Pd |
| 232 | 0 | Ph₂Me | An | N/A | N | N | Me | Cl | 0 | 0 | 0 | 1 | Pd |
| 233 | 0 | 2,6-t-BuPh | j | N/A | N | N | Me | Me | 0 | 0 | 0 | 1 | Pd |
| 234 | 0 | 2,6-t-BuPh | Me | N/A | N | N | Me | Me | 0 | 0 | 0 | 1 | Pd |
| 235 | 0 | 2,6-t-BuPh | H | N/A | N | N | Me | Me | 0 | 0 | 0 | 1 | Pd |
| 236 | 0 | 2,6-t-BuPh | An | N/A | N | N | Me | Me | 0 | 0 | 0 | 1 | Pd |
| 237 | 0 | 2,6-t-BuPh | j | N/A | N | N | Me | Cl | 0 | 0 | 0 | 1 | Pd |
| 238 | 0 | 2,6-t-BuPh | Me | N/A | N | N | Me | Cl | 0 | 0 | 0 | 1 | Pd |
| 239 | 0 | 2,6-t-BuPh | H | N/A | N | N | Me | Cl | 0 | 0 | 0 | 1 | Pd |
| 240 | 0 | 2,6-t-BuPh | An | N/A | N | N | Me | Cl | 0 | 0 | 0 | 1 | Pd |
| 241 | 0 | 2,6-t-BuPh | H | N/A | N | N | Br | Br | 0 | 0 | 0 | 1 | Ni |
| 242 | 0 | 2,6-t-Bu₂Ph | Me | N/A | N | N | Br | Br | 0 | 0 | 0 | 1 | Ni |
| 243 | 0 | 2,6-t-Bu₂Ph | An | N/A | N | N | Br | Br | 0 | 0 | 0 | 1 | Ni |
| 244 | 0 | 2,6-t-Bu₂Ph | H | N/A | N | N | Br | Br | 0 | 0 | 0 | 1 | Ni |
| 245 | 0 | 2,6-t-Bu₂Ph | Me | N/A | N | N | Br | Br | 0 | 0 | 0 | 1 | Ni |
| 246 | 0 | 2-6-t-Bu₂Ph | An | N/A | N | N | Br | Br | 0 | 0 | 0 | 1 | Ni |
| 247 | 0 | Ph | H | N/A | N | N | Br | Br | 0 | 0 | 0 | 1 | Ni |
| 248 | 0 | Ph | Me | N/A | N | N | Br | Br | 0 | 0 | 0 | 1 | Ni |
| 249 | 0 | Ph | An | N/A | N | N | Br | Br | 0 | 0 | 0 | 1 | Ni |
| 250 | 0 | 2-PhPh | H | N/A | N | N | Br | Br | 0 | 0 | 0 | 1 | Ni |
| 251 | 0 | 2-PhPh | Me | N/A | N | N | Br | Br | 0 | 0 | 0 | 1 | Ni |
| 252 | 0 | 2-PhPh | An | N/A | N | N | Br | Br | 0 | 0 | 0 | 1 | Ni |
| 253 | 0 | 2-iPr-6-MePh | H | N/A | N | N | Br | Br | 0 | 0 | 0 | 1 | Ni |
| 254 | 0 | 2-iPr-6-MePh | Me | N/A | N | N | Br | Br | 0 | 0 | 0 | 1 | Ni |
| 255 | 0 | 2-iPr-6-MePh | An | N/A | N | N | Br | Br | 0 | 0 | 0 | 1 | Ni |
| 256 | 0 | 2,5-t-BuPh | H | N/A | N | N | Br | Br | 0 | 0 | 0 | 1 | Ni |
| 257 | 0 | 2,5-t-BuPh | Me | N/A | N | N | Br | Br | 0 | 0 | 0 | 1 | Ni |
| 258 | 0 | 2,5-t-BuPh | An | N/A | N | N | Br | Br | 0 | 0 | 0 | 1 | Ni |
| 259 | 0 | 2,6-EtPh | H | N/A | N | N | Br | Br | 0 | 0 | 0 | 1 | Ni |
| 260 | 0 | 2,6-EtPh | Me | N/A | N | N | Br | Br | 0 | 0 | 0 | 1 | Ni |
| 261 | 0 | 2,6-EtPh | An | N/A | N | N | Br | Br | 0 | 0 | 0 | 1 | Ni |
| 262 | 0 | 1-Np | H | N/A | N | N | Br | Br | 0 | 0 | 0 | 1 | Ni |
| 263 | 0 | 1-Np | Me | N/A | N | N | Br | Br | 0 | 0 | 0 | 1 | Ni |
| 264 | 0 | 1-Np | An | N/A | N | N | Br | Br | 0 | 0 | 0 | 1 | Ni |
| 265 | 0 | Ph | Ph | N/A | N | N | Br | Br | 0 | 0 | 0 | 1 | Ni |
| 266 | 0 | 2,4,6-Me₃Ph | H | N/A | N | N | Br | Br | 0 | 0 | 0 | 1 | Ni |
| 267 | 0 | 2,4,6-Me₃Ph | Me | N/A | N | N | Br | Br | 0 | 0 | 0 | 1 | Ni |
| 268 | 0 | 2,4,6-Me₃Ph | An | N/A | N | N | Br | Br | 0 | 0 | 0 | 1 | Ni |

TABLE I-continued

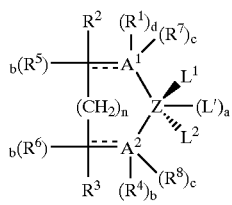

(XV)

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 269 | 0 | 2,4,6-Me₃Ph | Ph | N/A | N | N | Br | Br | 0 | 0 | 0 | 1 | Ni |
| 270 | 1 | 2,6-Pr₂Pr | H | H | N | N | Cl | Cl | 0 | 0 | 0 | 1 | SY |
| 271 | 2 | 2,6-Pr₂Pr | H | H | N | N | Cl | Cl | 0 | 0 | 0 | 1 | SY |
| 272 | 3 | 2,6-Pr₂Pr | H | H | N | N | Cl | Cl | 0 | 0 | 0 | 1 | SY |
| 273 | 1 | 2,6-Pr₂Pr | Me | Me | N | N | Cl | Cl | 0 | 0 | 0 | 1 | SY |
| 274 | 2 | 2,6-Pr₂Pr | Me | Me | N | N | Cl | Cl | 0 | 0 | 0 | 1 | SY |
| 275 | 3 | 2,6-Pr₂Pr | Me | Me | N | N | Cl | Cl | 0 | 0 | 0 | 1 | SY |
| 276 | 1 | 2,6-Me₂Ph | H | H | N | N | Cl | Cl | 0 | 0 | 0 | 1 | SY |
| 277 | 2 | 2,6-Me₂Ph | H | H | N | N | Cl | Cl | 0 | 0 | 0 | 1 | SY |
| 278 | 3 | 2,6-Me₂Ph | H | H | N | N | Cl | Cl | 0 | 0 | 0 | 1 | SY |
| 279 | 1 | 2,6-Me₂Ph | Me | Me | N | N | Cl | Cl | 0 | 0 | 0 | 1 | SY |
| 280 | 2 | 2,6-Me₂Ph | Me | Me | N | N | Cl | Cl | 0 | 0 | 0 | 1 | SY |
| 281 | 3 | 2,6-Me₂Ph | Me | Me | N | N | Cl | Cl | 0 | 0 | 0 | 1 | SY |
| 282 | 1 | 2,4,6-Me₃Ph | H | H | N | N | Cl | Cl | 0 | 0 | 0 | 1 | SY |
| 283 | 2 | 2,4,6-Me₃Ph | H | H | N | N | Cl | Cl | 0 | 0 | 0 | 1 | SY |
| 284 | 3 | 2,4,6-Me₃Ph | H | H | N | N | Cl | Cl | 0 | 0 | 0 | 1 | SY |
| 285 | 1 | 2,4,6-Me₃Ph | Me | Me | N | N | Cl | Cl | 0 | 0 | 0 | 1 | SY |
| 286 | 2 | 2,4,6-Me₃Ph | Me | Me | N | N | Cl | Cl | 0 | 0 | 0 | 1 | SY |
| 287 | 3 | 2,4,6-Me₃Ph | Me | Me | N | N | Cl | Cl | 0 | 0 | 0 | 1 | SY |
| 288 | 1 | 2,6-iPr₂Ph | H | H | N | N | Cl | Cl | 1 | 0 | 0 | 1 | CMW |
| 289 | 2 | 2,6-iPr₂Ph | H | H | N | N | Cl | Cl | 1 | 0 | 0 | 1 | CMW |
| 290 | 3 | 2,6-iPr₂Ph | H | H | N | N | Cl | Cl | 1 | 0 | 0 | 1 | CMW |
| 291 | 1 | 2,6-iPrPh | Me | Me | N | N | Cl | Cl | 1 | 0 | 0 | 1 | CMW |
| 292 | 2 | 2,6-iPrPh | Me | Me | N | N | Cl | Cl | 1 | 0 | 0 | 1 | CMW |
| 293 | 3 | 2,6-iPrPh | Me | Me | N | N | Cl | Cl | 1 | 0 | 0 | 1 | CMW |
| 294 | 1 | 2,6,Me₂Ph | H | H | N | N | Cl | Cl | 1 | 0 | 0 | 1 | CMW |
| 295 | 2 | 2,6,Me₂Ph | H | H | N | N | Cl | Cl | 1 | 0 | 0 | 1 | CMW |
| 296 | 3 | 2,6,Me₂Ph | H | H | N | N | Cl | Cl | 1 | 0 | 0 | 1 | CMW |
| 297 | 1 | 2,6,Me₂Ph | Me | Me | N | N | Cl | Cl | 1 | 0 | 0 | 1 | CMW |
| 298 | 2 | 2,6,Me₂Ph | Me | Me | N | N | Cl | Cl | 1 | 0 | 0 | 1 | CMW |
| 299 | 3 | 2,6,Me₂Ph | Me | Me | N | N | Cl | Cl | 1 | 0 | 0 | 1 | CMW |
| 300 | 1 | 2,4,6-Me₃Ph | H | H | N | N | Cl | Cl | 1 | 0 | 0 | 1 | CMW |
| 301 | 2 | 2,4,6-Me₃Ph | H | H | N | N | Cl | Cl | 1 | 0 | 0 | 1 | CMW |
| 302 | 3 | 2,4,6-Me₃Ph | H | H | N | N | Cl | Cl | 1 | 0 | 0 | 1 | CMW |
| 303 | 1 | 2,4,6-Me₃Ph | Me | Me | N | N | Cl | Cl | 1 | 0 | 0 | 1 | CMW |
| 304 | 2 | 2,4,6-Me₃Ph | Me | Me | N | N | Cl | Cl | 1 | 0 | 0 | 1 | CMW |
| 305 | 3 | 2,4,6-Me₃Ph | Me | Me | N | N | Cl | Cl | 1 | 0 | 0 | 1 | CMW |
| 306 | 1 | 2,6-iPr₂Ph | H | H | N | N | Cl | Cl | 1 | 0 | 0 | 1 | TZH |
| 307 | 2 | 2,6-iPr₂Ph | H | H | N | N | Cl | Cl | 1 | 0 | 0 | 1 | TZH |
| 308 | 3 | 2,6-iPr₂Ph | H | H | N | N | Cl | Cl | 1 | 0 | 0 | 1 | TZH |
| 309 | 1 | 2,6-iPr₂Ph | Me | Me | N | N | Cl | Cl | 1 | 0 | 0 | 1 | TZH |
| 310 | 2 | 2,6-iPr₂Ph | Me | Me | N | N | Cl | Cl | 1 | 0 | 0 | 1 | TZH |
| 311 | 3 | 2,6-iPr₂Ph | Me | Me | N | N | Cl | Cl | 1 | 0 | 0 | 1 | TZH |

TABLE I-continued (XV)

| # | n | R¹/R⁴ | R²/R³ | R⁵/R⁶ | A¹ | A² | L¹ | L² | a | b | c | d | Z |
|---|---|---|---|---|---|---|---|---|---|---|---|---|---|
| 312 | 1 | 2,6-Me$_2$Ph | H | H | N | N | Cl | Cl | 1 | 0 | 0 | 1 | TZH |
| 313 | 2 | 2,6-Me$_2$Ph | H | H | N | N | Cl | Cl | 1 | 0 | 0 | 1 | TZH |
| 314 | 3 | 2,6-Me$_2$Ph | H | H | N | N | Cl | Cl | 1 | 0 | 0 | 1 | TZH |
| 315 | 1 | 2,6-Me$_2$Ph | Me | Me | N | N | Cl | Cl | 1 | 0 | 0 | 1 | TZH |
| 316 | 2 | 2,6-Me$_2$Ph | Me | Me | N | N | Cl | Cl | 1 | 0 | 0 | 1 | TZH |
| 317 | 3 | 2,6-Me$_2$Ph | Me | Me | N | N | Cl | Cl | 1 | 0 | 0 | 1 | TZH |
| 318 | 1 | 2,4,6-Me$_3$Ph | H | H | N | N | Cl | Cl | 1 | 0 | 0 | 1 | TZH |
| 319 | 2 | 2,4,6-Me$_3$Ph | H | H | N | N | Cl | Cl | 1 | 0 | 0 | 1 | TZH |
| 320 | 3 | 2,4,6-Me$_3$Ph | H | H | N | N | Cl | Cl | 1 | 0 | 0 | 1 | TZH |
| 321 | 1 | 2,4,6-Me$_3$Ph | Me | Me | N | N | Cl | Cl | 1 | 0 | 0 | 1 | TZH |
| 322 | 2 | 2,4,6-Me$_3$Ph | Me | Me | N | N | Cl | Cl | 1 | 0 | 0 | 1 | TZH |
| 323 | 3 | 2,4,6-Me$_3$Ph | Me | Me | N | N | Cl | Cl | 1 | 0 | 0 | 1 | TZH |

Footnotes:
e = the group (CH$_2$)$_3$CO$_2$Me
L' = Cl for numbers 288 to 323
An = 1,8-naphthalene
j = the group —C(Me)$_2$—CH$_2$—C(Me)$_2$—
N/A = not applicable
K = —SCH$_2$CH$_2$S—

In Table I, above, the following convention and abbreviations are used: for $R^1$ and $R^4$, when a substituted phenyl ring is present, the amount of substitution is indicated by the number of numbers indicating positions on the phenyl ring, as, for example, 2,6-iPr$_2$Ph represents 2,6-diisopropyl phenyl; iPr=isopropyl; Pr=propyl; Me=methyl; Et=ethyl; t-Bu= tert-butyl; Ph=phenyl; Np=naphthyl; An=1,8-naphthalene; j is the group —C(Me)$_2$—CH$_2$—C(Me)$_2$—; and e is the group (CH$_2$)$_3$CO$_2$Me—; SY=Sc or Y; CMW=Cr, Mo or W; TZH=Ti, Zr, or Hf and N/A=not applicable.

The typical tridentate pre-catalyst compounds may, for example, be represented by the formula:

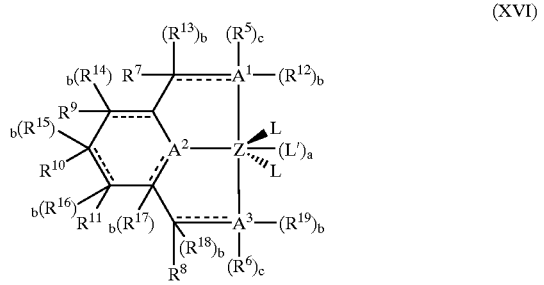

(XVI)

wherein:
$R^5$ and $R^6$ are each independently selected from hydrogen, or an unsubstituted or substituted aryl group wherein said substitution is an alkyl or a functional hetero group which is inert with respect to the contemplated polymerization;

$R^7$ and $R^8$ are each independently selected from hydrogen, an unsubstituted or substituted $C_1$–$C_{20}$ (preferably $C_1$–$C_6$) hydrocarbyl as, for example, alkyl (methyl, ethyl, propyl, pentyl and the like); aryl (phenyl, tolyl and the like) or a functional group which is inert with respect to the polymerization (e.g., nitro, halo and the like);

$R^9$ to $R^{19}$ are each independently selected from hydrogen, an unsubstituted or substituted $C_1$–$C_{20}$ hydrocarbyl or an inert functional group, all as described above for $R^7$; a, b and c are each independently 0 or 1 and represent whether their associated R group is present or not;

Z is a transition metal as defined above, preferably Fe(II), Co(II) or Fe(III);

each $A^1$ to $A^3$ is independently selected as defined in connection with A of Formula I';

and each L and L' is independently selected from a halogen such as chlorine, bromine, iodine or a $C_1$–$C_8$ (preferably $C_1$–$C_5$) alkyl, or any two L groups, together in combination, represent an unsubstituted or substituted, saturated or unsaturated, hydrocarbylene group which together with Z forms a cyclic group, preferably a 3 to 7, most preferably 3 to 5 member ring cyclic group.

Preferred compounds of XVI are those wherein each $R^9$, $R^{10}$ and $R^{11}$ are hydrogen; b is 0, c is 1, and $R^7$ and $R^8$ are each independently selected from halogen, hydrogen or a $C_1$–$C_6$ alkyl, preferably each is independently selected from methyl or hydrogen; and wherein $R^5$ and $R^6$ of XVI are each an aryl or substituted aryl group, preferably wherein the aryl contains substitution in the 2 position, the 2,6 positions or the 2,4,6 positions which is selected from a $C_1$–$C_6$ (most preferably $C_1$–$C_3$) alkyl and the remaining positions are each independently selected from hydrogen (most preferred), halogen or a $C_1$–$C_6$ (preferably $C_1$–$C_3$) alkyl.

Illustrative examples of tridentate pre-catalyst compounds which are useful in providing the catalyst composition of the present invention are compounds of Formula XVI having the following combination of groups shown in Table II below:

TABLE II (XVI)

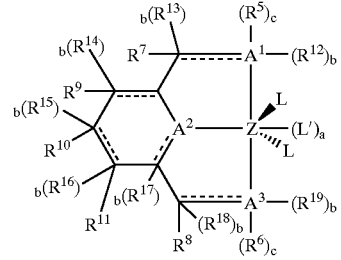

| # | $R^5/R^6$ | $R^7/R^8$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 1. | 2,6-iPr$_2$Ph | Me | H | H | H | N | N | N | 0 | 0 | 1 | * | NA | Fe |
| 2. | 2,6-Cl$_2$Ph | Me | H | H | H | N | N | N | 0 | 0 | 1 | * | NA | Fe |
| 3. | 2,6-Cl$_2$Ph | Me | H | H | H | N | N | N | 0 | 0 | 1 | * | NA | Fe |
| 4. | 2,6-Br$_2$Ph | Me | H | H | H | N | N | N | 0 | 0 | 1 | * | NA | Fe |
| 5. | 2,6-Br$_2$Ph | Me | H | H | H | N | N | N | 0 | 0 | 1 | * | NA | Fe |
| 6. | 2,6-Br$_2$-4-Me—Ph | Me | H | H | H | N | N | N | 0 | 0 | 1 | * | NA | Fe |
| 7. | 2,6-Cl$_2$-4-Me—Ph | Me | H | H | H | N | N | N | 0 | 0 | 1 | * | NA | Fe |
| 8. | 2,5-iPr$_2$C$_4$H$_2$N | Me | H | H | H | N | N | N | 0 | 0 | 1 | * | NA | Fe |
| 9. | 2,5-iPr$_2$C$_4$H$_2$N | Me | H | H | H | N | N | N | 0 | 0 | 1 | * | NA | Fe |
| 10. | 2-t-BuPh | Me | H | H | H | N | N | N | 0 | 0 | 1 | * | NA | Fe |
| 11. | Ph | Me | H | H | H | N | N | N | 0 | 0 | 1 | * | NA | Fe |
| 12. | 2,6-iPr$_2$Ph | Me | H | Me | H | N | N | N | 0 | 0 | 1 | * | NA | Fe |
| 13. | 2,6-iPr$_2$Ph | Me | H | Me | H | N | N | N | 0 | 0 | 1 | * | NA | Fe |
| 14. | 2-t-BuPh | Me | H | Me | H | N | N | N | 0 | 0 | 1 | * | NA | Fe |
| 15. | Ph | Me | H | Me | H | N | N | N | 0 | 0 | 1 | * | NA | Fe |
| 16. | 2,6-iPr$_2$Ph | Me | Me | Me | Me | N | N | N | 0 | 0 | 1 | * | NA | Fe |
| 17. | 2,6-iPr$_2$Ph | Me | Me | Me | Me | N | N | N | 0 | 0 | 1 | * | NA | Fe |
| 18. | 2-t-BuPh | Me | Me | Me | Me | N | N | N | 0 | 0 | 1 | * | NA | Fe |
| 19. | Ph | Me | Me | Me | Me | N | N | N | 0 | 0 | 1 | * | NA | Fe |
| 20. | 2,4,6-Me$_3$Ph | Me | H | H | H | N | N | N | 0 | 0 | 1 | * | NA | Fe |
| 21. | 2,5-iPr$_2$C$_4$H$_2$N | Me | H | H | H | N | N | N | 0 | 0 | 1 | * | NA | Fe |
| 22. | 2,3,4,5,6-Me$_5$Ph | Me | H | H | H | N | N | N | 0 | 0 | 1 | * | NA | Fe |
| 23. | (2-tBuMe$_2$Si1)Bz | Me | H | H | H | N | N | N | 0 | 0 | 1 | * | NA | Fe |
| 24. | (2-Me$_3$Si1)Bz | Me | H | H | H | N | N | N | 0 | 0 | 1 | * | NA | Fe |
| 25. | (2-PhMe$_2$Si1)Bz | Me | H | H | H | N | N | N | 0 | 0 | 1 | * | NA | Fe |
| 26. | (2-PhMeSi1)Bz | Me | H | H | H | N | N | N | 0 | 0 | 1 | * | NA | Fe |
| 27. | (2-Me$_2$Si1)Bz | Me | H | H | H | N | N | N | 0 | 0 | 1 | * | NA | Fe |
| 28. | 2,6-iPr$_2$Ph | Me | H | H | H | N | N | N | 0 | 0 | 1 | * | NA | Co |
| 29. | 2,5-iPr$_2$C$_4$H$_2$N | Me | H | H | H | N | N | N | 0 | 0 | 1 | * | NA | Co |

TABLE II-continued

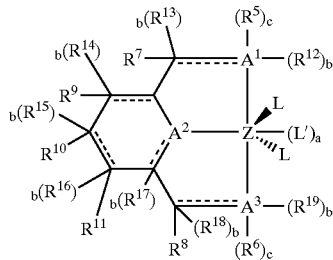

(XVI)

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 30. | 2-t-BuPh | Me | H | H | H | N | N | N | 0 | 0 | 1 | * | NA | Co |
| 31. | Ph | Me | H | H | H | N | N | N | 0 | 0 | 1 | * | NA | Co |
| 32. | 2,6-iPr₂Ph | Me | H | Me | H | N | N | N | 0 | 0 | 1 | * | NA | Co |
| 33. | 2,6-iPr₂Ph | Me | H | Me | H | N | N | N | 0 | 0 | 1 | * | NA | Co |
| 34. | 2-t-BuPh | Me | H | Me | H | N | N | N | 0 | 0 | 1 | * | NA | Co |
| 35. | Ph | Me | H | Me | H | N | N | N | 0 | 0 | 1 | * | NA | Co |
| 36. | 2,6-iPr₂Ph | Me | Me | Me | Me | N | N | N | 0 | 0 | 1 | * | NA | Co |
| 37. | 2,6-iPr₂Ph | Me | Me | Me | Me | N | N | N | 0 | 0 | 1 | * | NA | Co |
| 38. | 2-t-BuPh | Me | Me | Me | Me | N | N | N | 0 | 0 | 1 | * | NA | Co |
| 39. | Ph | Me | Me | Me | Me | N | N | N | 0 | 0 | 1 | * | NA | Co |
| 40. | 2,4,6-Me₃Ph | Me | H | H | H | N | N | N | 0 | 0 | 1 | * | NA | Co |
| 41. | 2,3,4,5,6-Me₅Ph | Me | H | H | H | N | N | N | 0 | 0 | 1 | * | NA | Co |
| 42. | (2-tBuMe₂Sil)Bz | Me | H | H | H | N | N | N | 0 | 0 | 1 | * | NA | Co |
| 43. | 2-MePh | Me | H | H | H | N | N | N | 0 | 0 | 1 | * | NA | Fe |
| 44. | (2-Me₃Sil)Bz | Me | H | H | H | N | N | N | 0 | 0 | 1 | * | NA | Co |
| 45. | (2-PhMe₂Sil)Bz | Me | H | H | H | N | N | N | 0 | 0 | 1 | * | NA | Co |
| 46. | (2-PhMeSil)Bz | Me | H | H | H | N | N | N | 0 | 0 | 1 | * | NA | Co |
| 47. | (2-Me₃Sil)Bz | Me | H | H | H | O | N | 0 | 0 | 0 | 0 | * | NA | Co |
| 48. | NA | Me | H | H | H | O | N | 0 | 0 | 0 | 0 | * | NA | Fe |
| 49. | NA | Me | H | Me | H | O | N | 0 | 0 | 0 | 0 | * | NA | Fe |
| 50. | NA | i-Pr | H | H | H | O | N | 0 | 0 | 0 | 0 | * | NA | Fe |
| 51. | NA | i-Pr | H | Me | H | O | N | 0 | 0 | 0 | 0 | * | NA | Fe |
| 52. | NA | i-Pr | Me | Me | Me | O | N | 0 | 0 | 0 | 0 | * | NA | Fe |
| 53. | NA | Ph | H | H | H | O | N | 0 | 0 | 0 | 0 | * | NA | Fe |
| 54. | NA | Ph | H | Me | H | O | N | 0 | 0 | 0 | 0 | * | NA | Fe |
| 55. | NA | Me | H | H | H | O | N | 0 | 0 | 0 | 0 | * | NA | Co |
| 56. | NA | Me | H | Me | H | O | N | 0 | 0 | 0 | 0 | * | NA | Co |
| 57. | NA | i-Pr | H | H | H | O | N | 0 | 0 | 0 | 0 | * | NA | Co |
| 58. | NA | i-Pr | H | Me | H | O | N | 0 | 0 | 0 | 0 | * | NA | Co |
| 59. | NA | i-Pr | Me | Me | Me | O | N | 0 | 0 | 0 | 0 | * | NA | Co |
| 60. | NA | Ph | H | H | H | O | N | 0 | 0 | 0 | 0 | * | NA | Co |
| 61. | NA | Ph | H | Me | H | O | N | 0 | 0 | 0 | 0 | * | NA | Co |
| 62. | 2,6-iPr₂Ph | Me | H | H | H | N | N | N | 1 | 0 | 1 | * | H₂O | Fe |
| 63. | 2,6-iPr₂Ph | Me | H | H | H | N | N | N | 1 | 0 | 1 | * | THF | Fe |
| 64. | 2,6-iPr₂Ph | Me | H | H | H | N | N | N | 1 | 0 | 1 | * | ROH | Fe |
| 65. | 2,6-iPr₂Ph | Me | H | H | H | N | N | N | 1 | 0 | 1 | * | RSH | Fe |
| 66. | 2,6-iPr₂Ph | Me | H | H | H | N | N | N | 1 | 0 | 1 | * | RNH₂ | Fe |
| 67. | 2,6-Cl₂Ph | Me | H | H | H | N | N | N | 1 | 0 | 1 | * | H₂O | Fe |
| 68. | 2,6-Cl₂Ph | Me | H | H | H | N | N | N | 1 | 0 | 1 | * | THF | Fe |
| 69. | 2,6-Cl₂Ph | Me | H | H | H | N | N | N | 1 | 0 | 1 | * | ROH | Fe |
| 70. | 2,6-Cl₂Ph | Me | H | H | H | N | N | N | 1 | 0 | 1 | * | RSH | Fe |

TABLE II-continued (XVI)

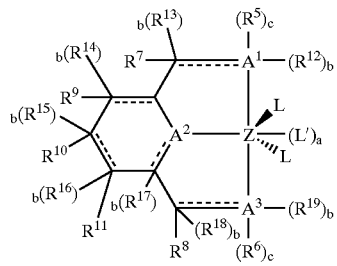

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 71. | 2,6-Cl₂Ph | Me | H | H | H | N | N | N | 1 | 0 | 1 | * | RNH₂ | Fe |
| 72. | 2,6-Br₂Ph | Me | H | H | H | N | N | N | 1 | 0 | 1 | * | H₂O | Fe |
| 73. | 2,6-Br₂Ph | Me | H | H | H | N | N | N | 1 | 0 | 1 | * | THF | Fe |
| 74. | 2,6-Br₂Ph | Me | H | H | H | N | N | N | 1 | 0 | 1 | * | ROH | Fe |
| 75. | 2,6-Br₂Ph | Me | H | H | H | N | N | N | 1 | 0 | 1 | * | RSH | Fe |
| 76. | 2,6-Br₂Ph | Me | H | H | H | N | N | N | 1 | 0 | 1 | * | RNH₂ | Fe |
| 77. | 2,6-Br₂-4-Me—Ph | Me | H | H | H | N | N | N | 1 | 0 | 1 | * | H₂O | Fe |
| 78. | 2,6-Br₂-4-Me—Ph | Me | H | H | H | N | N | N | 1 | 0 | 1 | * | THF | Fe |
| 79. | 2,6-Br₂-4-Me—Ph | Me | H | H | H | N | N | N | 1 | 0 | 1 | * | ROH | Fe |
| 80. | 2,6-Br₂-4-Me—Ph | Me | H | H | H | N | N | N | 1 | 0 | 1 | * | RSH | Fe |
| 81. | 2,6-Br₂-4-Me—Ph | Me | H | H | H | N | N | N | 1 | 0 | 1 | * | RNH₂ | Fe |
| 82. | 2,6-Cl₂-4-Me—Ph | Me | H | H | H | N | N | N | 1 | 0 | 1 | * | H₂O | Fe |
| 83. | 2,6-Cl₂-4-Me—Ph | Me | H | H | H | N | N | N | 1 | 0 | 1 | * | THF | Fe |
| 84. | 2,6-Cl₂-4-Me—Ph | Me | H | H | H | N | N | N | 1 | 0 | 1 | * | ROH | Fe |
| 85. | 2,6-Cl₂-4-Me—Ph | Me | H | H | H | N | N | N | 1 | 0 | 1 | * | RSH | Fe |
| 86. | 2,6-Cl₂-4-Me—Ph | Me | H | H | H | N | N | N | 1 | 0 | 1 | * | RNH₂ | Fe |
| 87. | 2,5-iPr₂C₄H₂N | Me | H | H | H | N | N | N | 1 | 0 | 1 | * | H₂O | Fe |
| 88. | 2,5-iPr₂C₄H₂N | Me | H | H | H | N | N | N | 1 | 0 | 1 | * | THF | Fe |
| 89. | 2,5-iPr₂C₄H₂N | Me | H | H | H | N | N | N | 1 | 0 | 1 | * | ROH | Fe |
| 90. | 2,5-iPr₂C₄H₂N | Me | H | H | H | N | N | N | 1 | 0 | 1 | * | RSH | Fe |
| 91. | 2,5-iPr₂C₄H₂N | Me | H | H | H | N | N | N | 1 | 0 | 1 | * | RNH₂ | Fe |
| 92. | 2,5-Me₂C₄H₂N | Me | H | H | H | N | N | N | 1 | 0 | 1 | * | H₂O | Fe |
| 93. | 2,5-Me₂C₄H₂N | Me | H | H | H | N | N | N | 1 | 0 | 1 | * | THF | Fe |
| 94. | 2,5-Me₂C₄H₂N | Me | H | H | H | N | N | N | 1 | 0 | 1 | * | ROH | Fe |
| 95. | 2,5-Me₂C₄H₂N | Me | H | H | H | N | N | N | 1 | 0 | 1 | * | RSH | Fe |
| 96. | 2,5-Me₂C₄H₂N | Me | H | H | H | N | N | N | 1 | 0 | 1 | * | RNH₂ | Fe |

TABLE II-continued (XVI)

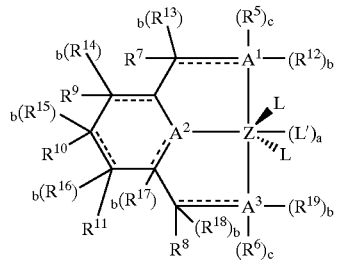

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 97. | 2-t-BuPh | Me | H | H | H | N | N | N | 0 | 0 | 1 | * | N/A | Fe |
| 98. | 2-t-BuPh | Me | H | H | H | N | N | N | 1 | 0 | 1 | * | H₂O | Fe |
| 99. | 2-t-BuPh | Me | H | H | H | N | N | N | 1 | 0 | 1 | * | THF | Fe |
| 100. | 2-t-BuPh | Me | H | H | H | N | N | N | 1 | 0 | 1 | * | ROH | Fe |
| 101. | 2-t-BuPh | Me | H | H | H | N | N | N | 1 | 0 | 1 | * | RSH | Fe |
| 102. | 2-t-BuPh | Me | H | H | H | N | N | N | 1 | 0 | 1 | * | RNH₂ | Fe |
| 103. | 2-Et—Ph | Me | H | H | H | N | N | N | 0 | 0 | 1 | * | NA | Fe |
| 104. | 2-Et—Ph | Me | H | H | H | N | N | N | 1 | 0 | 1 | * | H₂O | Fe |
| 105. | 2-EtPh | Me | H | H | H | N | N | N | 1 | 0 | 1 | * | THF | Fe |
| 106. | 2-EtPh | Me | H | H | H | N | N | N | 1 | 0 | 1 | * | ROH | Fe |
| 107. | 2-EtPh | Me | H | H | H | N | N | N | 1 | 0 | 1 | * | RSH | Fe |
| 108. | 2-EtPh | Me | H | H | H | N | N | N | 1 | 0 | 1 | * | RNH₂ | Fe |
| 109. | 2-Me—Ph | Me | H | H | H | N | N | N | 0 | 0 | 1 | * | NA | Fe |
| 110. | 2-Me—Ph | Me | H | H | H | N | N | N | 1 | 0 | 1 | * | H₂O | Fe |
| 111. | 2-Me—Ph | Me | H | H | H | N | N | N | 1 | 0 | 1 | * | THF | Fe |
| 112. | 2-Me—Ph | Me | H | H | H | N | N | N | 1 | 0 | 1 | * | ROH | Fe |
| 113. | 2-Me—Ph | Me | H | H | H | N | N | N | 1 | 0 | 1 | * | RSH | Fe |
| 114. | 2-Me—Ph | Me | H | H | H | N | N | N | 1 | 0 | 1 | * | RNH₂ | Fe |
| 115. | Ph | Me | H | H | H | N | N | N | 0 | 0 | 1 | * | NA | Fe |
| 116. | Ph | Me | H | H | H | N | N | N | 1 | 0 | 1 | * | H₂O | Fe |
| 117. | Ph | Me | H | H | H | N | N | N | 1 | 0 | 1 | * | THF | Fe |
| 118. | Ph | Me | H | H | H | N | N | N | 1 | 0 | 1 | * | ROH | Fe |
| 119. | Ph | Me | H | H | H | N | N | N | 1 | 0 | 1 | * | RSH | Fe |
| 120. | Ph | Me | H | H | H | N | N | N | 1 | 0 | 1 | * | RNH₂ | Fe |
| 121. | 2,6-iPr₂Ph | Me | H | H | H | N | N | N | 1 | 0 | 1 | * | H₂O | Fe |
| 122. | 2,6-iPr₂Ph | Me | H | H | H | N | N | N | 1 | 0 | 1 | * | THF | Fe |
| 123. | 2,6-iPr₂Ph | Me | H | H | H | N | N | N | 1 | 0 | 1 | * | ROH | Fe |
| 124. | 2,6-iPr₂Ph | Me | H | H | H | N | N | N | 1 | 0 | 1 | * | RSH | Fe |
| 125. | 2,6-iPr₂Ph | Me | H | H | H | N | N | N | 1 | 0 | 1 | * | RNH₂ | Fe |
| 126. | 2,6-iPr₂Ph | H | H | H | H | N | N | N | 1 | 0 | 1 | * | H₂O | Fe |
| 127. | 2,6-iPr₂Ph | H | H | H | H | N | N | N | 1 | 0 | 1 | * | THF | Fe |
| 128. | 2,6-iPr₂Ph | H | H | H | H | N | N | N | 1 | 0 | 1 | * | ROH | Fe |
| 129. | 2,6-iPr₂Ph | H | H | H | H | N | N | N | 1 | 0 | 1 | * | RSH | Fe |
| 130. | 2,6-iPr₂Ph | H | H | H | H | N | N | N | 1 | 0 | 1 | * | RNH₂ | Fe |
| 131. | 2,6-Cl₂Ph | H | H | H | H | N | N | N | 1 | 0 | 1 | * | H₂O | Fe |
| 132. | 2,6-Cl₂Ph | H | H | H | H | N | N | N | 1 | 0 | 1 | * | THF | Fe |
| 133. | 2,6-Cl₂Ph | H | H | H | H | N | N | N | 1 | 0 | 1 | * | ROH | Fe |
| 134. | 2,6-Cl₂Ph | H | H | H | H | N | N | N | 1 | 0 | 1 | * | RSH | Fe |
| 135. | 2,6-Cl₂Ph | H | H | H | H | N | N | N | 1 | 0 | 1 | * | RNH₂ | Fe |
| 136. | 2,6-Br₂Ph | H | H | H | H | N | N | N | 1 | 0 | 1 | * | H₂O | Fe |
| 137. | 2,6-Br₂Ph | H | H | H | H | N | N | N | 1 | 0 | 1 | * | THF | Fe |
| 138. | 2,6-Br₂Ph | H | H | H | H | N | N | N | 1 | 0 | 1 | * | ROH | Fe |
| 139. | 2,6-Br₂Ph | H | H | H | H | N | N | N | 1 | 0 | 1 | * | RSH | Fe |

TABLE II-continued (XVI)

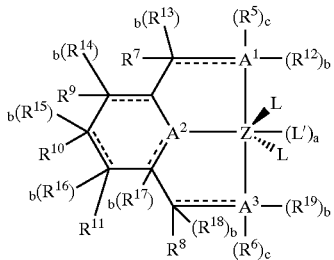

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 140. | 2,6-Br₂Ph | H | H | H | H | N | N | N | 1 | 0 | 1 | * | RNH₂ | Fe |
| 141. | 2,6-Br₂-4-Me—Ph | H | H | H | H | N | N | N | 1 | 0 | 1 | * | H₂O | Fe |
| 142. | 2,6-Br₂-4-Me—Ph | H | H | H | H | N | N | N | 1 | 0 | 1 | * | THF | Fe |
| 143. | 2,6-Br₂-4-Me—Ph | H | H | H | H | N | N | N | 1 | 0 | 1 | * | ROH | Fe |
| 144. | 2,6-Br₂-4-Me—Ph | H | H | H | H | N | N | N | 1 | 0 | 1 | * | RSH | Fe |
| 145. | 2,6-Br₂-4-Me—Ph | H | H | H | H | N | N | N | 1 | 0 | 1 | * | RNH₂ | Fe |
| 146. | 2,6-Cl₂-4-Me—Ph | H | H | H | H | N | N | N | 1 | 0 | 1 | * | H₂O | Fe |
| 147. | 2,6-Cl₂-4-Me—Ph | H | H | H | H | N | N | N | 1 | 0 | 1 | * | THF | Fe |
| 148. | 2,6-Cl₂-4-Me—Ph | H | H | H | H | N | N | N | 1 | 0 | 1 | * | ROH | Fe |
| 149. | 2,6-Cl₂-4-Me—Ph | H | H | H | H | N | N | N | 1 | 0 | 1 | * | RSH | Fe |
| 150. | 2,6-Cl₂-4-Me—Ph | H | H | H | H | N | N | N | 1 | 0 | 1 | * | RNH₂ | Fe |
| 151. | 2,5-iPr₂C₄H₂N | H | H | H | H | N | N | N | 1 | 0 | 1 | * | H₂O | Fe |
| 152. | 2,5-iPr₂C₄H₂N | H | H | H | H | N | N | N | 1 | 0 | 1 | * | THF | Fe |
| 153. | 2,5-iPr₂C₄H₂N | H | H | H | H | N | N | N | 1 | 0 | 1 | * | ROH | Fe |
| 154. | 2,5-iPr₂C₄H₂N | H | H | H | H | N | N | N | 1 | 0 | 1 | * | RSH | Fe |
| 155. | 2,5-iPr₂C₄H₂N | H | H | H | H | N | N | N | 1 | 0 | 1 | * | RNH₂ | Fe |
| 156. | 2,5-Me₂C₄H₂N | H | H | H | H | N | N | N | 1 | 0 | 1 | * | H₂O | Fe |
| 157. | 2,5-Me₂C₄H₂N | H | H | H | H | N | N | N | 1 | 0 | 1 | * | THF | Fe |
| 158. | 2,5-Me₂C₄H₂N | H | H | H | H | N | N | N | 1 | 0 | 1 | * | ROH | Fe |
| 159. | 2,5-Me₂C₄H₂N | H | H | H | H | N | N | N | 1 | 0 | 1 | * | RSH | Fe |
| 160. | 2,5-Me₂C₄H₂N | H | H | H | H | N | N | N | 1 | 0 | 1 | * | RNH₂ | Fe |
| 161. | 2-t-BuPh | H | H | H | H | N | N | N | 0 | 0 | 1 | * | N/A | Fe |
| 162. | 2-t-BuPh | H | H | H | H | N | N | N | 1 | 0 | 1 | * | H₂O | Fe |
| 163. | 2-t-BuPh | H | H | H | H | N | N | N | 1 | 0 | 1 | * | THF | Fe |
| 164. | 2-t-BuPh | H | H | H | H | N | N | N | 1 | 0 | 1 | * | ROH | Fe |
| 165. | 2-t-BuPh | H | H | H | H | N | N | N | 1 | 0 | 1 | * | RSH | Fe |
| 166. | 2-t-BuPh | H | H | H | H | N | N | N | 1 | 0 | 1 | * | RNH₂ | Fe |
| 167. | 2-Et—Ph | H | H | H | H | N | N | N | 0 | 0 | 1 | * | NA | Fe |
| 168. | 2-Et—Ph | H | H | H | H | N | N | N | 1 | 0 | 1 | * | H₂O | Fe |
| 169. | 2-EtPh | H | H | H | H | N | N | N | 1 | 0 | 1 | * | THF | Fe |
| 170. | 2-EtPh | H | H | H | H | N | N | N | 1 | 0 | 1 | * | ROH | Fe |

TABLE II-continued (XVI)

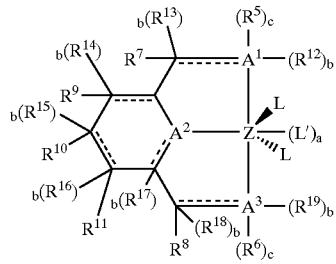

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 171. | 2-EtPh | H | H | H | H | N | N | N | 1 | 0 | 1 | * | RSH | Fe |
| 172. | 2-EtPh | H | H | H | H | N | N | N | 1 | 0 | 1 | * | RNH₂ | Fe |
| 173. | 2-Me—Ph | H | H | H | H | N | N | N | 0 | 0 | 1 | * | NA | Fe |
| 174. | 2-Me—Ph | H | H | H | H | N | N | N | 1 | 0 | 1 | * | H₂O | Fe |
| 175. | 2-Me—Ph | H | H | H | H | N | N | N | 1 | 0 | 1 | * | THF | Fe |
| 176. | 2-Me—Ph | H | H | H | H | N | N | N | 1 | 0 | 1 | * | ROH | Fe |
| 177. | 2-Me—Ph | H | H | H | H | N | N | N | 1 | 0 | 1 | * | RSH | Fe |
| 178. | 2-Me—Ph | H | H | H | H | N | N | N | 1 | 0 | 1 | * | RNH₂ | Fe |
| 179. | Ph | H | H | H | H | N | N | N | 0 | 0 | 1 | * | NA | Fe |
| 180. | Ph | H | H | H | H | N | N | N | 1 | 0 | 1 | * | H₂O | Fe |
| 181. | Ph | H | H | H | H | N | N | N | 1 | 0 | 1 | * | THF | Fe |
| 182. | Ph | H | H | H | H | N | N | N | 1 | 0 | 1 | * | ROH | Fe |
| 183. | Ph | H | H | H | H | N | N | N | 1 | 0 | 1 | * | RSH | Fe |
| 184. | Ph | H | H | H | H | N | N | N | 1 | 0 | 1 | * | RNH₂ | Fe |
| 185. | 2,6-iPr₂Ph | H | H | H | H | N | N | N | 1 | 0 | 1 | * | NA | Fe |
| 186. | 2,6-iPr₂Ph | H | H | H | H | N | N | N | 1 | 0 | 1 | * | H₂O | Fe |
| 187. | 2,6-iPr₂Ph | H | H | H | H | N | N | N | 1 | 0 | 1 | * | THF | Fe |
| 188. | 2,6-iPr₂Ph | H | H | H | H | N | N | N | 1 | 0 | 1 | * | ROH | Fe |
| 189. | 2,6-iPr₂Ph | H | H | H | H | N | N | N | 1 | 0 | 1 | * | RSH | Fe |
| 190. | 2,6-iPr₂Ph | H | H | H | H | N | N | N | 1 | 0 | 1 | * | RNH₂ | Fe |
| 191. | 2,6-iPr₂Ph | Me | Me | Me | Me | N | N | N | 0 | 0 | 1 | * | NA | Fe |
| 192. | 2,6-iPr₂Ph | Me | Me | Me | Me | N | N | N | 0 | 0 | 1 | * | NA | Fe |
| 193. | 2-t-BuPh | Me | Me | Me | Me | N | N | N | 0 | 0 | 1 | * | NA | Fe |
| 194. | Ph | Me | Me | Me | Me | N | N | N | 0 | 0 | 1 | * | NA | Fe |
| 195. | 2,4,6-Me₃Ph | Me | H | H | H | N | N | N | 0 | 0 | 1 | * | NA | Fe |
| 196. | 2,5-iPr₂C₄H₂N | Me | H | H | H | N | N | N | 0 | 0 | 1 | * | NA | Fe |
| 197. | 2,3,4,5,6-Me₅Ph | Me | H | H | H | N | N | N | 0 | 0 | 1 | * | NA | Fe |
| 198. | (2-tBuMe₂Sil)Bz | Me | H | H | H | N | N | N | 0 | 0 | 1 | * | NA | Fe |
| 199. | (2-Me₃Sil)Bz | Me | H | H | H | N | N | N | 0 | 0 | 1 | * | NA | Fe |
| 200. | (2-PhMe₂Sil)Bz | Me | H | H | H | N | N | N | 0 | 0 | 1 | * | NA | Fe |
| 201. | (2-PhMeSil)Bz | Me | H | H | H | N | N | N | 0 | 0 | 1 | * | NA | Fe |
| 202. | (2-Me₂Sil)Bz | Me | H | H | H | N | N | N | 0 | 0 | 1 | * | NA | Fe |
| 203. | 2,6-iPr₂Ph | Me | H | H | H | N | N | N | 0 | 0 | 1 | * | NA | Co |
| 204. | 2,5-iPr₂C₄H | Me | H | H | H | N | N | N | 0 | 0 | 1 | * | NA | Co |
| 205. | 2-t-BuPh | Me | H | H | H | N | N | N | 0 | 0 | 1 | * | NA | Co |
| 206. | Ph | Me | H | H | H | N | N | N | 0 | 0 | 1 | * | NA | Co |
| 207. | 2,6-iPr₂Ph | Me | H | Me | H | N | N | N | 0 | 0 | 1 | * | NA | Co |
| 208. | 2,6-iPr₂Ph | Me | H | Me | H | N | N | N | 0 | 0 | 1 | * | NA | Co |
| 209. | 2-t-BuPh | Me | H | Me | H | N | N | N | 0 | 0 | 1 | * | NA | Co |
| 210. | Ph | Me | H | Me | H | N | N | N | 0 | 0 | 1 | * | NA | Co |
| 211. | 2,6-iPr₂Ph | Me | Me | Me | Me | N | N | N | 0 | 0 | 1 | * | NA | Co |

TABLE II-continued (XVI)

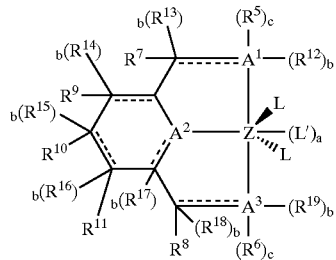

| # | R⁵/R⁶ | R⁷/R⁸ | R⁹ | R¹⁰ | R¹¹ | A¹ | A² | A³ | a | b | c | L | L' | Z |
|---|---|---|---|---|---|---|---|---|---|---|---|---|---|---|
| 212. | 2,6-iPr₂Ph | Me | Me | Me | Me | N | N | N | 0 | 0 | 1 | * | NA | Co |
| 213. | 2-t-BuPh | Me | Me | Me | Me | N | N | N | 0 | 0 | 1 | * | NA | Co |
| 214. | Ph | Me | Me | Me | Me | N | N | N | 0 | 0 | 1 | * | NA | Co |
| 215. | 2,4,6-(Me)₃Ph | Me | H | H | H | N | N | N | 0 | 0 | 1 | * | NA | Co |
| 216. | 2,3,4,5,6-Me₅Ph | Me | H | H | H | N | N | N | 0 | 0 | 1 | * | NA | Co |
| 217. | (2-tBuMe₂Sil)Bz | Me | H | H | H | N | N | N | 0 | 0 | 1 | * | NA | Co |
| 218. | 2-MePh | Me | H | H | H | N | N | N | 0 | 0 | 1 | * | NA | Fe |
| 219. | (2-Me₃Sil)Bz | Me | H | H | H | N | N | N | 0 | 0 | 1 | * | NA | Co |
| 220. | (2-PhMe₂Sil)Bz | Me | H | H | H | N | N | N | 0 | 0 | 1 | * | NA | Co |
| 221. | (2-PhMeSil)Bz | Me | H | H | H | N | N | N | 0 | 0 | 1 | * | NA | Co |
| 222. | (2-Me₃Sil)Bz | Me | H | H | H | O | N | 0 | 0 | 0 | 0 | * | NA | Co |
| 223. | NA | Me | H | H | H | O | N | 0 | 0 | 0 | 0 | * | NA | Fe |
| 224. | NA | Me | H | Me | H | O | N | 0 | 0 | 0 | 0 | * | NA | Fe |
| 225. | NA | i-Pr | H | H | H | O | N | 0 | 0 | 0 | 0 | * | NA | Fe |
| 226. | NA | i-Pr | H | Me | H | O | N | 0 | 0 | 0 | 0 | * | NA | Fe |
| 227. | NA | i-Pr | Me | Me | Me | O | N | 0 | 0 | 0 | 0 | * | NA | Fe |
| 228. | NA | Ph | H | H | H | O | N | 0 | 0 | 0 | 0 | * | NA | Fe |
| 229. | NA | Ph | H | Me | H | O | N | 0 | 0 | 0 | 0 | * | NA | Fe |
| 230. | NA | Me | H | H | H | O | N | 0 | 0 | 0 | 0 | * | NA | Co |
| 231. | NA | Me | H | Me | H | O | N | 0 | 0 | 0 | 0 | * | NA | Co |
| 232. | NA | i-Pr | H | H | H | O | N | 0 | 0 | 0 | 0 | * | NA | Co |
| 233. | NA | i-Pr | H | Me | H | O | N | 0 | 0 | 0 | 0 | * | NA | Co |
| 234. | NA | i-Pr | Me | Me | Me | O | N | 0 | 0 | 0 | 0 | * | NA | Co |
| 235. | NA | Ph | H | H | H | O | N | 0 | 0 | 0 | 0 | * | NA | Co |
| 236. | NA | Ph | H | Me | H | O | N | 0 | 0 | 0 | 0 | * | NA | Co |
| 237. | 2,6-iPr₂Ph | Me | H | F | H | N | N | N | 1 | 0 | 1 | Cl | Cl | VNT |
| 238. | 2,6-iPr₂Ph | Me | H | Cl | H | N | N | N | 1 | 0 | 1 | Cl | Cl | VNT |
| 239. | 2,6-iPr₂Ph | Me | H | Br | H | N | N | N | 1 | 0 | 1 | Cl | Cl | VNT |
| 240. | 2,6-iPr₂Ph | Me | H | I | H | N | N | N | 1 | 0 | 1 | Cl | Cl | VNT |
| 241. | 2,6-iPr₂Ph | Me | H | H | H | N | N | N | 1 | 0 | 1 | Cl | Cl | VNT |
| 242. | 2,6-iPr₂Ph | Me | H | H | H | N | N | N | 1 | 0 | 1 | Cl | Cl | VNT |
| 243. | 2,6-iPr₂Ph | H | H | F | H | N | N | N | 1 | 0 | 1 | Cl | Cl | VNT |
| 244. | 2,6-iPr₂Ph | H | H | Cl | H | N | N | N | 1 | 0 | 1 | Cl | Cl | VNT |
| 245. | 2,6-iPr₂Ph | H | H | Br | H | N | N | N | 1 | 0 | 1 | Cl | Cl | VNT |
| 246. | 2,6-iPr₂Ph | H | H | I | H | N | N | N | 1 | 0 | 1 | Cl | Cl | VNT |
| 247. | 2,6-Me₂Ph | Me | H | H | H | N | N | N | 1 | 0 | 1 | Cl | Cl | VNT |
| 248. | 2,6-Me₂Ph | Me | H | F | H | N | N | N | 1 | 0 | 1 | Cl | Cl | VNT |
| 249. | 2,6-Me₂Ph | Me | H | Cl | H | N | N | N | 1 | 0 | 1 | Cl | Cl | VNT |
| 250. | 2,6-Me₂Ph | Me | H | B | H | N | N | N | 1 | 0 | 1 | Cl | Cl | VNT |

TABLE II-continued (XVI)

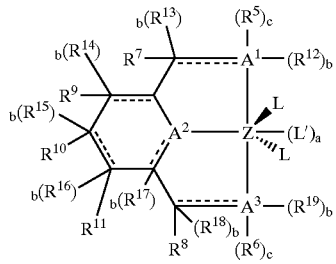

| # | $R^5/R^6$ | $R^7/R^8$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 251. | 2,6-Me$_2$Ph | Me | H | I | H | N | N | N | 1 | 0 | 1 | Cl | Cl | VNT |
| 252. | 2,6-Me$_2$Ph | H | H | H | H | N | N | N | 1 | 0 | 1 | Cl | Cl | VNT |
| 253. | 2,6-Me$_2$Ph | H | H | F | H | N | N | N | 1 | 0 | 1 | Cl | Cl | VNT |
| 254. | 2,6-Me$_2$Ph | H | H | Cl | H | N | N | N | 1 | 0 | 1 | Cl | Cl | VNT |
| 255. | 2,6-Me$_2$Ph | H | H | Br | H | N | N | N | 1 | 0 | 1 | Cl | Cl | VNT |
| 256. | 2,6-Me$_2$Ph | H | H | I | H | N | N | N | 1 | 0 | 1 | Cl | Cl | VNT |
| 257. | 2,4,6-Me$_3$Ph | Me | H | H | H | N | N | N | 1 | 0 | 1 | Cl | Cl | VNT |
| 258. | 2,4,6-Me$_3$Ph | Me | H | F | H | N | N | N | 1 | 0 | 1 | Cl | Cl | VNT |
| 259. | 2,4,6-Me$_3$Ph | Me | H | Cl | H | N | N | N | 1 | 0 | 1 | Cl | Cl | VNT |
| 260. | 2,4,6-Me$_3$Ph | Me | H | Br | H | N | N | N | 1 | 0 | 1 | Cl | Cl | VNT |
| 261. | 2,4,6-Me$_3$Ph | H | H | I | H | N | N | N | 1 | 0 | 1 | Cl | Cl | VNT |
| 262. | 2,4,6-Me$_3$Ph | H | H | H | H | N | N | N | 1 | 0 | 1 | Cl | Cl | VNT |
| 263. | 2,4,6-Me$_3$Ph | H | H | F | H | N | N | N | 1 | 0 | 1 | Cl | Cl | VNT |
| 264. | 2,4,6-Me$_3$Ph | H | H | Cl | H | N | N | N | 1 | 0 | 1 | Cl | Cl | VNT |
| 265. | 2,4,6-Me$_3$Ph | H | H | Br | H | N | N | N | 1 | 0 | 1 | Cl | Cl | VNT |
| 266. | 2,4,6-Me$_3$Ph | H | H | I | H | N | N | N | 1 | 0 | 1 | Cl | Cl | VNT |
| 267. | 2,6-iPr$_2$Ph | H | H | H | H | N | N | N | 1 | 0 | 1 | Cl | Cl | MTR |
| 268. | 2,6-iPr$_2$Ph | H | H | F | H | N | N | N | 1 | 0 | 1 | Cl | Cl | NTR |
| 269. | 2,6-iPr$_2$Ph | H | H | Cl | H | N | N | N | 1 | 0 | 1 | Cl | Cl | MTR |
| 270. | 2,6-iPr$_2$Ph | H | H | B | H | N | N | N | 1 | 0 | 1 | Cl | Cl | MTR |
| 271. | 2,6-iPr$_2$Ph | H | H | I | H | N | N | N | 1 | 0 | 1 | Cl | Cl | MTR |
| 272. | 2,6-iBr$_2$Ph | Me | H | H | H | N | N | N | 1 | 0 | 1 | Cl | Cl | MTR |
| 273. | 2,6-iPr$_2$Ph | Me | H | F | H | N | N | N | 1 | 0 | 1 | Cl | Cl | MTR |
| 274. | 2,6-iPr$_2$Ph | Me | H | Cl | H | N | N | N | 1 | 0 | 1 | Cl | Cl | MTR |
| 275. | 2,6-iPr$_2$Ph | Me | H | Br | H | N | N | N | 1 | 0 | 1 | Cl | Cl | MTR |
| 276. | 2,6-iPr$_2$Ph | Me | H | I | H | N | N | N | 1 | 0 | 1 | Cl | Cl | MTR |
| 277. | 2,6-Me$_2$Ph | H | H | H | H | N | N | N | 1 | 0 | 1 | Cl | Cl | MTR |
| 278. | 2,6-Me$_2$Ph | H | H | F | H | N | N | N | 1 | 0 | 1 | Cl | Cl | MTR |
| 279. | 2,6-Me$_2$Ph | H | H | Cl | H | N | N | N | 1 | 0 | 1 | Cl | Cl | MTR |
| 280. | 2,6-Me$_2$Ph | H | H | B | H | N | N | N | 1 | 0 | 1 | Cl | Cl | MTR |
| 281. | 2,6-Me$_2$Ph | H | H | I | H | N | N | N | 1 | 0 | 1 | Cl | Cl | MTR |

TABLE II-continued (XVI)

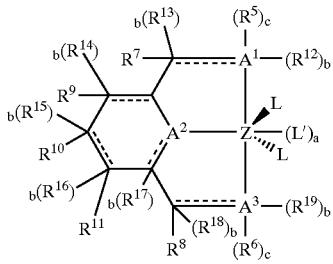

| # | $R^5/R^6$ | $R^7/R^8$ | $R^9$ | $R^{10}$ | $R^{11}$ | $A^1$ | $A^2$ | $A^3$ | a | b | c | L | L' | Z |
|---|---|---|---|---|---|---|---|---|---|---|---|---|---|---|
| 282. | 2,6-Me$_2$Ph | Me | H | H | H | N | N | N | 1 | 0 | 1 | Cl | Cl | MTR |
| 283. | 2,6-Me$_2$Ph | Me | H | F | H | N | N | N | 1 | 0 | 1 | Cl | Cl | MTR |
| 284. | 2,6-Me$_2$Ph | Me | H | Cl | H | N | N | N | 1 | 0 | 1 | Cl | Cl | MTR |
| 285. | 2,6-Me$_2$Ph | Me | H | Br | H | N | N | N | 1 | 0 | 1 | Cl | Cl | MTR |
| 286. | 2,6-Me$_2$Ph | Me | H | I | H | N | N | N | 1 | 0 | 1 | Cl | Cl | MTR |
| 287. | 2,4,6-Me$_3$Ph | H | H | H | H | N | N | N | 1 | 0 | 1 | Cl | Cl | MTR |
| 288. | 2,4,6-Me$_3$Ph | H | H | F | H | N | N | N | 1 | 0 | 1 | Cl | Cl | MTR |
| 289. | 2,4,6-Me$_3$Ph | H | H | Cl | H | N | N | N | 1 | 0 | 1 | Cl | Cl | MTR |
| 290. | 2,4,6-Me$_3$Ph | H | H | B | H | N | N | N | 1 | 0 | 1 | Cl | Cl | MTR |
| 291. | 2,4,6-Me$_3$Ph | H | H | I | H | N | N | N | 1 | 0 | 1 | Cl | Cl | MTR |
| 292. | 2,4,6-Me$_3$Ph | Me | H | H | H | N | N | N | 1 | 0 | 1 | Cl | Cl | MTR |
| 293. | 2,4,6-Me$_3$Ph | Me | H | F | H | N | N | N | 1 | 0 | 1 | Cl | Cl | MTR |
| 294. | 2,4,6-Me$_3$Ph | Me | H | Cl | H | N | N | N | 1 | 0 | 1 | Cl | Cl | MTR |
| 295. | 2,4,6-Me$_3$Ph | Me | H | Br | H | N | N | N | 1 | 0 | 1 | Cl | Cl | MTR |
| 296. | 2,4,6-Me$_3$Ph | Me | H | I | H | N | N | N | 1 | 0 | 1 | Cl | Cl | MTR |

Footnotes:
NA = Not Applicable
VNT = V, Nb, or Ta
MTR = Mn, Tc, or Re

The asterisk (*) in Table II above represents both anionic ligand groups (L) of the above preferred tridentate compounds XVI and for each of the above compounds both L groups are, respectively, chlorine; bromine; methyl (—CH$_3$); ethyl (—C$_2$H$_5$); propyl (—C$_3$H$_5$, each of the isomers); butyl (—C$_4$H$_9$, each of the isomers); dimethylamine; 1,3-butadiene-1,4 diyl; 1,4-pentadiene-1,5 diyl; C$_4$ alkylene; and C$_5$ alkylene. Also in Table II B$_z$=benzyl; Sil=siloxyl; iPrPh =isopropylphenyl; t-Bu=tert-butyl; Me$_2$= dimethyl, Me$_3$=trimethyl, etc.

R represents each independently selected from hydrogen, an unsubstituted or substituted C$_1$–C$_{20}$ hydrocarbyl group such as an alkyl, aryl, alkaryl or aralkyl group, as for example, methyl, ethyl, i-propyl, butyl (all isomers), phenyl, tolyl, 2,6- (or 2,5-, 2,4-, 3,5-) diisopropyl (or -dialkyl) phenyl-and the like; or any R groups and adjacent carbon atoms, such as R$^2$ and R$^3$, taken together can provide an unsubstituted or substituted C$_3$–C$_{20}$ ring forming hydrocarbylene group, such as hexylene, 1,8-naphthylene and the like.

It will be understood that the identity of the various L groups of both the Group (1) and Group (2) transition metal compounds will determine the nature of the process steps needed to form the ultimate catalyst composition which is believed to exist, during polymerization, as an activated pair of a cation, or cation like (referred to herein collectively as Cationic) component and an anion or anion like (referred to herein collectively as Anionic) component. The Cationic component is the pre-catalyst which has undergone activation typically by imparting a full or partial positive charge to the metal center Z and the Anionic component is a full or partial negatively charged component derived from the support-activator agglomerate and is believed to be in close proximity to, and provides charge balance for, the activated metal center Z under conventional polymerization reaction conditions while remaining labile. The term "labile" is used herein to mean that under polymerization conditions, the anionic component is only loosely associated at the site of the catalyst activity so as to permit displacement by a polymerizable monomer at the point of monomer addition.

Thus, the manner in which the pre-catalyst is activated typically depends on the identity of the L groups, particularly L$^3$ in the case of the Group (1) compounds and L in the case of the Group (2) compounds. From a generic standpoint, activation of pre-catalyst is believed to result from removal of at least one $L^3$ of Formulas I and III to XIV or at least one L group of Formulas X, XV (L group designated $L^1$ or $L^2$), XI, and XVI from the metal center in a manner sufficient to generate an open coordination site at said metal center.

A variety of mechanisms and materials are known or possible for accomplishing activation. Depending on the identity of $L^3$ or L and the support-activator agglomerate, such mechanisms may be induced in 1 or 2 stages (relative to a designated molecule). Activation in a single stage typically involves synthesizing a pre-catalyst that can be activated directly by the support-activator agglomerate (e.g., wherein $L^3$ or L is initially selected as hydrocarbyl in the synthesis of the pre-catalyst). Activation in 2 stages typically involves pre-catalyst alkylation in a first stage, referred to for purposes of the present invention as "pre-activation." In the pre-activation stage at least one electronic withdrawing L group of either of the Group (1) or (2) compounds (e.g., Cl) is replaced with at least one less electronic withdrawing L group (e.g., alkyl or olefin) which is more easily displaced in the second stage by the support-activator agglomerate to cause activation at the metal center, Z. Accordingly, pre-activation can be induced via known alkylation reactions with organometallic compounds, such as organolithium or preferably organoaluminum hydrides or alkyls. Pre-activation permits one to use the support-activator agglomerate in all instances for completing activation and thereby eliminate the need to use expensive methylalumoxane or activating agents such as boron containing activators (or co-catalysts). However, while pre-activation is described hereinabove as being carried out prior to contact of a pre-catalyst with the support-activator agglomerate, it is to be understood that the process of the present invention includes pre-activation in a step that follows contact of the ligand and transition metal reactants with one another and with the support-activator agglomerate. Therefore, pre-activation of a Group (1) or Group (2) material can be carried out before, during or after contact with the support-activator agglomerate provided that ligand and transition metal reactants have been contacted; i.e., that a suitable pre-catalyst susceptible to pre-activation is present.

Thus, while activation mechanisms by which conventional coordination catalyst systems operate include, but are not limited to (a) abstraction of at least one $L^3$ group of the Group (1) compounds or at least one L group of the Group (2) compounds by a Lewis acid by an abstracting moiety such as carbonium, tropylium, carbenium, ferrocenium and mixtures, and (b) protonation (by a Brønsted acid) of the $L^3$ or L group, when $L^3$ or L constitutes a hydride or hydrocarbyl (e.g. alkyl) group, such mechanisms typically require materials additional to the support for implementation. The same is not true for the present invention. It is a particular advantage of the present invention that such conventional ionizing agents used to produce ionic catalysts can be eliminated and replaced with the support-activator agglomerate of the present invention which performs the dual function of activation and supporting agent.

From a practical standpoint, it is preferred that $L^3$ of the Group (1) compounds or L of the Group (2) compounds be halogen, e.g., Cl, in the pre-catalyst. This stems from the fact that when $L^3$ or L is halogen (highly electron withdrawing) the pre-catalyst is very stable and can easily be transported. However, because $L^3$ or L in this instance is highly electron withdrawing, it may be more difficult to induce activation thereof by the support-activator agglomerate. Thus, as indicated above, it is possible to pre-activate the pre-catalyst, by replacement of the halogens constituting $L^3$ or L with less electron withdrawing groups such as hydrocarbyl groups, e.g., alkyl groups, using organometallic compounds. The particular point in time when the organometallic compound contacts the pre-catalyst is at the option of the manufacturer and can be (a) before, during or after contact of the support-activator agglomerate with pre-catalyst prior to entry into the polymerization zone and/or (b) upon or during polymerization by direct addition to the polymerization zone. However, because pre-activated catalysts are less stable than the halogenated precursors thereof, organometallic compound addition, when employed, is preferably conducted in the presence of the support-activator agglomerate. It is a further particular advantage of the present invention that activation of the pre-catalyst (having L=halogen) can be delayed by avoiding the use of the organometallic compound to induce pre-activation until polymerization occurs. Thus, such pre-catalyst can be impregnated into/onto the support-activator agglomerate and the same recovered without activation until used for polymerization. When employing lower amounts of organometallic compound, such compound can be added to the reactor during polymerization.

Accordingly, one preferred embodiment comprises using pre-catalyst wherein each $L^3$ group of the Group (1) compounds or each L group of the compounds of Formula X or XI of the Group (2) compounds is a halogen atom. In this embodiment the pre-catalyst and support-activator agglomerate are separately mixed. In another embodiment said pre-catalyst, support-activator agglomerate and at least one organometallic compound (represented by Formula XVII below) as a scavenger and/or alkylating agent are admixed simultaneously prior to polymerization. In this embodiment, at least one of the halogens constituting $L^3$ or L becomes a new hydrocarbyl $L^3$ or L group derived from the organometallic compound during pre-activation. More specifically, when used as a scavenging and alkylating agent, the organometallic compound is typically added directly to the polymerization zone, whereas when employed as an alkylating agent alone it is desirably added to the mixture of support-activator agglomerate and pre-catalyst. Organometallic compounds suitable for use in pre-activation include those represented by formula (XVII):

$$M(R^{12})_s \qquad \text{XVII}$$

wherein M represents an element of the Group 1, 2 or 13 of the Periodic Table, a tin atom or a zinc atom; each $R^{12}$ independently represents a hydrogen atom, a halogen atom, hydrocarbyl, typically $C_1$ to $C_{24}$ hydrocarbyl, including $C_1$ to $C_{24}$ alkyl or alkoxy and aryl, aryloxy, arylalkyl, arylalkoxy, alkylaryl or alkylaryloxy group having 6 to 24 carbon atoms (such as a hydrogen atom, halogen atom (e.g., chlorine, fluorine, bromine, iodine and mixtures thereof), alkyl groups (e.g., methyl, ethyl, propyl, pentyl, hexyl, heptyl, decyl, isopropyl, isobutyl, s-butyl, t-butyl), alkoxy groups (e.g., methyoxy, ethoxy, propoxy, butoxy, isopropoxy), aryl groups (e.g., phenyl, biphenyl, naphthyl), aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), and alkylaryloxy groups (e.g., methylphenoxy). For Group (1) and Group (2) compounds when at least one $L^3$ or L, respectively, is non-hydrocarbyl, preferably at least one $R^{12}$ is hydrocarbyl, e.g., an alkyl group having 1 to 24 carbon atoms or an aryl, arylalkyl or alkylaryl group having 6 to 24 carbon atoms, e.g., to provide a source of hydrocarbyl groups for alkylation of the pre-catalyst. In each instance, "s" is the oxidation number of M.

The preferred organometallic compounds are those wherein M is aluminum. Representative examples of organometallic compounds include alkyl aluminum compounds, preferably trialkyl aluminum compounds, such as trimethyl aluminum, triethyl aluminum, triisopropyl aluminum, tri-isobutyl aluminum, tri-n-propylaluminum, triisobutylaluminum, tri-n-butylaluminum, triamylaluminum, and the like; alkyl aluminum alkoxides such as ethyl aluminum diethoxide, diisobutyl aluminum ethoxide, di(tert-butyl) aluminum butoxide, diisopropyl aluminum ethoxide, dimethyl aluminum ethoxide, diethyl aluminum ethoxide, di-n-propyl aluminum ethoxide, di-n-butyl aluminum ethoxide, and the like; aluminum alkoxides such as aluminum ethoxide, aluminum propoxide, aluminum butoxide and the like; alkyl or aryl aluminum halides such as diethyl aluminum chloride, ethyl aluminum dichloride, diisopropyl aluminum chloride and the like; aluminum aryloxides such as aluminum phenoxide, and the like; and mixed aryl, alkyl or aryloxy, alkyl aluminum compounds and aluminum hydrides such as dimethylaluminum hydride, diethylaluminum hydride, diisopropylaluminum hydride, di-n-propylaluminum hydride, diisobutylaluminum hydride, and di-n-butylaluminum hydride. The most preferred organometallic compounds are the trialkyl aluminum compounds. When at least one $L^3$ of the Group (1) transition metal compounds or at least one L of the Group (2) transition metal compounds is halogen, the pre-catalyst and/or the organometallic compound can be mixed in a diluent, preferably an inert diluent, prior to, simultaneously with, or after contact (of either one) with the support-activator agglomerate. The pre-catalyst, when two L groups of either Group (1) or Group (2) are halogen, is stable to materials which are poisons to the activated catalyst.

In a second preferred embodiment wherein in the pre-catalyst each $L^3$ of a Group (1) compound (or material) or L of a Group (2) compound (or material) is a hydrocarbyl, a hydrocarbylene or a hydrocarbyloxy group, there is no need for the addition or handling of the organometallic compound. Thus, the catalyst composition can be readily formed and used without pre-activation. However, even in this instance, it is still preferred to employ at least some organometallic compound as a scavenger during polymerization to deactivate potential poisons to the activated catalyst.

The support-activator agglomerate is a composite in the form of agglomerate particles of at least two components, namely, (A) at least one inorganic oxide component and (B) at least one ion-containing layered component. In addition, the morphology of the support-activator agglomerate can be varied, e.g., its tendency to break apart (frangibility or attritability, characterized by a property referred to as the Attrition Quality Index or AQI) and, depending on the specific chemical and physical nature of the support-activator agglomerate, may influence the performance of the catalyst composition (see WO 97/48743).

The inorganic oxide Component-A of the support-activator agglomerate particles of the present invention are derived from porous inorganic oxides including $SiO_2$, $Al_2O_3$, $AlPO_4$, MgO, $TiO_2$, $ZrO_2$, $Cr_2O_3$; mixed inorganic oxides including $SiO_2.Al_2O_3$, $SiO_2.MgO$, $MgO.SiO_2.Al_2O_3$, $SiO_2.TiO_2.Al_2O_3$, $SiO_2.Cr_2O_3.TiO_2$ and $SiO_2.Cr_2O_3.TiO_2$. Where the inorganic oxide (including mixed inorganic oxides) is capable of forming a gel by known commercial procedures, it is preferred to utilize the same in a gel configuration for the milling procedures described herein. If the inorganic oxide is not susceptible to gel formation, the free oxide or mixed oxides derived from other conventional techniques such as precipitation, coprecipitation, or just admixing, can be utilized directly for the milling procedures after washing. Most preferably, Component-A of the support-activator agglomerate contains typically at least 80, preferably at least 90, and most preferably at least 95%, by weight, silica gel (e.g., hydrogel, aerogel, or xerogel) based on the weight of the catalyst support. Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

Silica gel is prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel in less than about one-half hour. The resulting gel is then washed. The concentration of the $SiO_2$ in the hydrogel which is formed is usually in the range of typically between about 15 and about 40, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C. Washing is accomplished simply by immersing the newly formed hydrogel in a continuously moving stream of water which leaches out the undesirable salts, leaving about 99.5 wt. % pure silica ($SiO_2$) behind. The pH, temperature, and duration of the wash water will influence the physical properties of the silica, such as surface area (SA) and pore volume (PV). Silica gel washed at 65–90° C. at pH's of 8–9 for 28–36 hours will usually have SA's of 290–350 $m^2/g$ and form aerogels with PV's of 1.4 to 1.7 cc/gm. Silica gel washed at pH's of 3–5 at 50–65° C. for 15–25 hours will have SA's of 700–850 $m^2/g$ and form aerogels with PV's of 0.6–1.3 cc/g When employing a Component-A inorganic oxide containing at least 80 wt. % silica gel, the remaining balance of the inorganic oxide Component-A can comprise various additional components. These additional components may be of two types, namely (1) those which are intimately incorporated into the gel structure upon formation, e.g., by cogelling silica gel with one or more other gel forming inorganic oxide materials, and (2) those materials which are admixed with silica gel particles prior to milling or after milling in slurry form just prior to spray drying. Thus, materials includable in the former category are silica-alumina, silica-titania, silica-titania-alumina, and silica-alumina-phosphate cogels. In the latter category, components which may be admixed, in minor proportions, with the silica hydrogel particles prior to milling and/or just prior to agglomeration include those prepared separately from inorganic oxides such as magnesium oxide, titanium oxide, thorium oxide, e.g., oxides of Groups 4 and 16, as well as other particulate constituents.

Other particulate constituents which may be present include those constituents having catalytic properties, not adversely affected by water, spray drying or calcination, such as finely divided oxides or chemical compounds, recognizing, however, that these constituents play no part in the agglomeration procedure. Similarly, it is possible to add powders or particles of other constituents to the silica hydrogel particles to impart additional properties to the support-activator agglomerate obtained. Accordingly, in addition to those powders or particulates having catalytic properties, there may be added materials which possess absorbent properties, such as synthetic zeolites. Thus, it is possible to obtain complex catalyst supports wherein amorphous silica gel contains crystallizable elements and the like. The skilled artisan will appreciate that the amounts of such additional components typically will be controlled in order to avoid compromising the desired agglomerate properties described herein. Also, it is feasible to add constituents to the inorganic oxide which may be eliminated after agglomeration in order to control porosity within a desired range; such agents as sulfur, graphite, wood charcoal, and the like being particularly useful for this purpose. When non-silica gel components are to be employed with silica gel, they may be added to the slurry to be agglomerated. However, it is preferable that they be present in the silica gel during or prior to milling (when milling is employed) as described hereinafter, since they will be less likely to disturb the desired agglomerate morphology after spray drying when they are also subjected to milling.

In view of the above, the term "silica gel", when used to describe the process steps up to and including agglomeration, is intended to include the optional inclusion of the aforementioned non-silica gel constituents permitted to be present in Component-A of the support-activator agglomerate.

Component-B of the support-activator agglomerate is a layered material having a three-dimensional structure which exhibits the strongest chemical bonds in only two dimensions. More specifically, the strongest chemical bonds are formed in and within two dimensional planes which are stacked on top of each other to form a three dimensional solid. The two dimensional planes are held together by weaker chemical bonds than those holding an individual plane together and generally arise from Van der Waals forces, electrostatic interactions, and hydrogen bonding. The electrostatic interactions are mediated by ions located between the layers and in addition, hydrogen bonding can occur between complementary layers or can be mediated by interlamellar bridging molecules. Representative examples of suitable layered materials includable in layered Component-B can be amorphous or crystalline, preferably amorphous. Suitable layered Component-B materials include clay, and clay minerals.

Clay is typically composed of clay minerals (i.e., crystalline silicate salts) as the main constituent. The clay or clay mineral is usually an inorganic polymeric compound of high molecular complexity constituted of a tetrahedral unit in which a central silicon atom coordinates oxygen atoms and an octahedral unit in which a central aluminum, magnesium or iron atom coordinates oxygen or hydroxide. The skeletal structures of many clays or clay minerals are not electrically neutral and have positive, most typically negative, charges on their surfaces. When possessing a negatively charged surface, they have cations in their interlaminar structures to complement such negative charges. Such interlaminar cations can be ion-exchanged by other cations. A quantification of a clay's ability to exchange interlaminar cations is called its cation exchange capacity (CEC) and is represented by milliequivalents (meq) per 100 g of clay. CEC differs depending upon the type of clay, and Clay Handbook, second edition (compiled by Japanese Clay Association, published by Gihodo Shuppan K. K.) gives the following information: Kaolinite: 3 to 15 meq/100 g; halloysite: 5 to 40 meq/100 g; montmorillonite: 80 to 150 meq/100 g; illite: 10 to 40 meq/100 g; vermiculite: 100 to 150 meq/100 g; chlorite: 10 to 40 meq/100 g; and zeolite-attapulgite: 20 to 30 meq/100 g. Thus, layered Component-B to be used in the present invention is a material, e.g., clay or clay mineral, typically having its surface negatively charged and preferably also having the ability to exchange cations.

Thus, clay minerals generally have the characteristic layered structure described above, containing between the layers, various degrees of negative charges. In this respect, the clay mineral is substantially different from metal oxides having a three-dimensional structure such as silica, alumina, and zeolite. The clay minerals are classified according to the degree of the aforementioned negative charge for the chemical formula: (1) biophilite, kaolinite, dickalite, and talc having a negative charge of 0 (zero); (2) smectite having a negative charge of from −0.25 to −0.6; (3) vermiculite having a negative charge of from −0.6 to −0.9; (4) mica having a negative charge of from about −1; and (5) brittle mica having a negative charge of about −2. Each of the above groups includes various minerals. For example, the smectite group includes montmorillonite, beidellite, saponite, nontronite hectorite, teniolite, suconite and related analogues; the mica group includes white mica, palagonite and illite. These clay minerals exist in nature, and also can be synthesized artificially with a higher purity. Any of the natural and artificial clay minerals having a negative charge below 0 are useful in the present invention. The presently preferred clay is montmorillonite, e.g., sodium montmorillonite. Further, clays and clay minerals may be used as they are without subjecting them to any treatment prior to formation of the support-activator agglomerate therefrom, or they may be treated by ball milling, sieving, acid treatment or the like prior to such formation. Further, they may be treated to have water added and adsorbed or may be treated to effect dehydration under heating before support-activator agglomerate formation. They may be used alone or in combination as a mixture of two or more of them for support-activation synthesis.

Component-B preferably has a pore volume of pores having a diameter of at least 40 Å (e.g., 40–1000 Å), as measured by a mercury intrusion method employing a mercury porosimeter, of at least 0.1 cc/g, more preferably from 0.1 to 1 cc/g. The average particle size of Component-B can vary typically from about 0.01 to about 50, preferably from about 0.1 to about 25, and most preferably from about 0.5 to about 10 microns.

The clays suitable for use as Component-B of the support-activator agglomerate may be subjected to pretreatment with chemicals prior or subsequent to support-activator agglomerate formation. However, such pretreatments are not preferred or required in order to obtain the benefits of the present invention. Examples of the chemical pretreatment include treatment with an acid or alkali, treatment with a salt, and treatment with an organic or inorganic compound. The last treatment can result in formation of a composite material. The treatment of the clay mineral with the acid or alkali may not only remove impurities from the mineral, but also may elute part of metallic cations from the crystalline structure of the clay, or may destructively alter the crystalline structure into an amorphous structure. Examples of the acids used for this purpose are Brønsted acids, such as hydrochloric, sulfuric, nitric, acetic acid and the like. Sodium hydroxide, potassium hydroxide and calcium hydroxide are preferably used as alkali chemical in the alkali pretreatment of the clay mineral.

In the case where the clay mineral is pretreated with a salt or an inorganic, or organic compound to give a composite material, the crystalline structure may be retained substantially without being broken and, rather a product that has been modified by ion exchange may be obtained.

Examples of the inorganic salt compounds that may be used in the pretreatment with salts include ionic halide salts, such as sodium chloride, potassium chloride, lithium chloride, magnesium chloride, aluminum chloride, iron chloride and ammonium chloride; sulfate salts, such as sodium sulfate, potassium sulfate, aluminum sulfate and ammonium sulfate; carbonate salts, such as potassium carbonate, sodium carbonate and calcium carbonate; and phosphate salts, such as sodium phosphate, potassium phosphate, aluminum phosphate and ammonium phosphate. Examples of the organic salt compounds include sodium acetate, potassium acetate, potassium oxalate, sodium citrate, sodium tartarate and the like.

In the case where the clay mineral is treated with an organic compound, such compounds will typically comprise a Lewis basic functional group containing an element of the Group 15 or 16 of the Periodic Table, such as organoammonium cation, oxonium cation, sulfonium cation, and phosphonium cation. The organic compound may also preferably comprise a functional group other than the Lewis basic functional group, such as carbonium cation, tropylium cation, and a metal cation. After undergoing such treatment, the exchangeable metallic cations originally present in the clay mineral are exchanged with the enumerated organic cations. Thus, compounds that yield a carbon cation, for example, trityl chloride, tropylium bromide and the like; or a complex compound that yields metallic complex cation, for example a ferrocenium salt and the like; may be used as the organic compound in the pretreatment. In addition to these compounds, onium salts may be used for the same purpose.

As examples of the inorganic compound used for the synthesis of inorganic composite material, metal hydroxides that yield hydroxide anions, for example, aluminum hydroxide, zirconium hydroxide, chromium hydroxide and the like may be mentioned.

Particular examples of guest organic cations that may be introduced for modification of the clay minerals, include: triphenylsulfonium, trimethylsulfonium, tetraphenylphosphonium, alkyl tri(o-tolyl) phosphonium, triphenylcarbonium, cycloheptatrienium, and ferrocenium; ammonium ions, for example aliphatic ammonium cations, such as butyl ammonium, hexyl ammonium, decyl ammonium, dodecyl ammonium, diamyl ammonium, tributyl ammonium, and N,N-dimethyl decyl ammonium; and aromatic ammonium cations such as anilinium, N-methyl anilinium, N,N-dimethyl anilinium, N-ethyl anilinium, N,N-diethyl anilinium, benzyl ammonium, toluidinium, dibenzyl ammonium, tribenzyl ammonium, N,N-2,4,6-pentamethyl anilinium and the like; and also oxonium ions, such as dimethyl oxonium, diethyl oxonium and the like. These examples are not limiting.

Ion exchange of the exchangeable cations in the clay mineral with selected organic cations is typically brought about by contacting the clay with an onium compound (salt) comprising the organic cations. Particular examples of the onium salts which may be used, include: ammonium compounds; for example aliphatic amine hydrochloride salts, such as propylamine HCl salt, isopropylamine HCl salt, butylamine HCl salt, hexylamine HCl salt, decylamine HCl salt, dodecylamine HCl salt, diamylamine HCl salt, tributylamine HCl salt, triamylamine HCl salt, N,N-dimethyl decylamine HCl salt, N,N-dimethyl undecylamine HCl salt and the like; aromatic amine hydrochloride salts, such as aniline HCl salt, N-methylaniline HCl salt, N,N-dimethylaniline HCl salt, N-ethylaniline HCl salt, N,N-diethylaniline HCl salt, o-toluidine HCl salt, p-toluidine HCl salt, N-methyl-o-toluidine HCl salt, N-methyl-p-toluidine HCl salt, N,N-dimethyl-o-toluidine HCl salt, N,N-dimethyl-p-toluidine HCl salt, benzylamine HCl salt, dibenzylamine HCl salt, N,N-2,4,6-pentamethyl aniline HCl salt and the like; hydrofluoric, hydrobromic and hydroiodic acid salts and sulfate salts of the above-listed aliphatic and aromatic amines; and oxonium compounds, such as hydrochloric acid salts of methyl ether, ethyl ether, phenyl ether and the like. Of the onionium compounds the exemplified ammonium or oxonium compounds, preferably the ammonium compounds and more preferably the aromatic amine salts are employed in the modification of the clay mineral.

The onium compound to be reacted with the clay mineral may be in the isolated form. Alternatively, the onium compound may be formed in situ, for example by contacting the corresponding amine compound, a heteroatom-containing compound, such as an ether or sulfide compound, and a proton acid, such as hydrofluoric, hydrochloric, hydroiodic or sulfuric acid, in the reaction solvent in which the clay mineral is to be pretreated subsequently. The reaction conditions under which the clay mineral can be modified by the onium compound are not critical. Also the relative proportions of the reactants used therein are not critical. Preferably, however, when used the onium compound is employed in a proportion of not less than 0.5 equivalents per equivalent of the cation present in the clay mineral, and more preferably in a proportion of at least equivalent amount. The clay mineral may be used singly or in admixture with other clay mineral or minerals. Also the onium compound may be used singly or in admixture with other onium compounds. The reaction solvent used in the modification pretreatment process may be water or a polar organic solvent. Examples of the organic solvents which may be used include alcohols, such as methyl alcohol, ethyl alcohol and the like; acetone, tetrahydrofuran, N,N-dimethyl formamide, dimethylsulfoxide, methylene chloride and the like. The solvent may be used singly or as a mixture of two or more solvents. Preferably, water or an alcohol is employed.

What can be viewed as separate and distinct classes of chemical modification treatments to which the clays can be subjected is referred to as pillaring and delamination. Pillaring is a phenomenon whereby the platelets of certain clays, such as smectite clays, which are swellable, are separated by intercalation of large guest cations between the negatively charged platelet sheets, which cations function as molecular props or pillars separating the platelets and preventing the layers from collapsing under van der Waals forces. Pillared clays are typically prepared by reacting a smectite clay, such as montmorillonite, with polyoxymetal cations such as polyoxycations of aluminum and zirconium. The reaction product is normally dried in air and calcined to convert the intercalated cations into metal oxide clusters interposed between the platelets of the clay such that the spacing between the platelets ranges from about 6 to about 10 Angstroms and is maintained at such values when the clay is heated to a temperature between about 500° C. and 700° C. When the reaction product is dried, the clay platelets, which are propped apart by the metal oxide clusters, orient themselves face-to-face, thereby forming a lamellar structure which yields an X-ray diffraction pattern containing distinct first order or (001) reflection. The extent of lamellar ordering is indicated by the X-ray powder diffraction pattern of the pillared clay. A well-ordered, air-dried, pillared montmorillonite may exhibit six or more orders of reflection. Pillared clays and their preparation are described more fully in the article entitled "Intercalated Clay Catalysts," *Science,* Vol. 220, No. 4595 pp. 365–371 (Apr.

22, 1983) and in U.S. Pat. Nos. 4,176,090; 4,216,188; 4,238,364; 4,248,739; 4,271,043; 4,367,163; 4,629,712; 4,637,992; 4,761,391; 4,859,648; and 4,995,964. The disclosures of the aforementioned articles and patents are incorporated herein by reference in their entireties.

In contrast to pillared clays, having platelets which are ordered in a face-to-face arrangement, delaminated clays also contain large cations but the platelets are oriented edge-to-edge and edge-to-face in what can be described as a "house-of-cards" structure containing macropores of a size typically found in amorphous aluminosilicates in addition to the micropores found in pillared clays. (See U.S. Pat. No. 4,761,391 for a further discussion.)

Accordingly, it is contemplated that such pillared and delaminated clays are includable as further embodiments of modified clays which may be employed as Component-B in the support-activator agglomerate.

While it is possible and permissible to modify Component-B with guest cations as described above, such procedures add process steps to the overall preparation, and from a process point of view, are preferably not employed. However, when Component-B is modified by exchanging originally present cations for guest cations, the goal sought to be achieved by such exchange is to render the support-activator agglomerate capable of activating either the pre-catalyst or the pre-activated catalyst as described above. It is believed that the indigenous cations typically present in the aforementioned clays are already capable of accomplishing this goal.

The support-activator agglomerate is made from an intimate admixture of Components-A and -B, which admixture is shaped in the form of an agglomerate or agglomerate particles. The term "agglomerate" refers to a product that combines particles held together by a variety of physical and/or chemical forces. More specifically, each agglomerate particle is preferably composed of a plurality of contiguous, constituent primary particles derived primarily from Component-A and much smaller secondary constituent particles derived from both Component-A and Component-B preferably joined and connected at their points of contact. The weight ratio of Component-A to Component-B in the agglomerate can vary typically from about 0.25:1 to about 99:1, preferably from about 0.5:1 to about 20:1, most preferably from about 1:1 to about 10:1 (e.g., 4:1).

The agglomerates of the present invention preferably will exhibit a higher macropore content than the constituent primary or secondary particles as a result of the interparticle voids between the constituent particles. However, such interparticle voids may be almost completely filled with the smaller secondary particles in other embodiments of the spray dried agglomerates. The agglomeration of Components-A and -B may be carried out in accordance with the methods well known to the art, in particular, by such methods as pelletizing, extrusion, shaping into beads in a rotating coating drum, and the like. The nodulizing technique whereby composite particles having a diameter of not greater than about 0.1 mm are agglomerated to particles with a diameter of at least about 1 mm by means of a granulation liquid may also be employed.

The preferred agglomerates are made by drying, preferably spray drying a slurry of Components-A and -B. More specifically, in this embodiment, the support-activator agglomerate is made by admixing Components-A and -B to form a slurry, preferably an aqueous slurry, comprising typically at least 50, preferably at least 75 (e.g., at least 80), and most preferably at least 85 (e.g., at least 90), but less than 100 wt. % water based on the slurry weight. However, organic solvents, such as $C_5$ to $C_{12}$ alkanes, alcohols (e.g. isopropyl alcohol), may also be employed although they represent a fire hazard relative to water and often make agglomerates too fragile for use as polymerization catalysts.

To render Component-A suitable for agglomerate formation, e.g. drying or spray drying, various milling procedures are typically employed (although not required). The goal of the milling procedure is ultimately to provide Component-A, when intended to be spray dried, with an average particle size of typically from about 2 to about 10 (e.g. 3 to about 7) preferably from about 4 to about 9, and most preferably from about 4 to 7 microns. Desirably, the milling procedures will also impart a particle size Distribution Span to the particles in the slurry of typically from 0.5 to about 3.0, and preferably from about 0.5 to about 2.0. The particle size Distribution Span is determined in accordance with the following equation:

$$\text{Distribution Span} = \frac{D_{90} - D_{10}}{D_{50}} \qquad \text{Equation 1a}$$

wherein $D_{10}$, $D_{50}$, and $D_{90}$ represent the $10^{th}$, $50^{th}$, and $90^{th}$ percentile, respectively, of the particle size (diameter) distribution, i.e. a $D_{90}$ of 100 microns means that 90 volume % of the particles have diameters less than or equal to 100 microns.

Still more preferably, the milling is conducted to impart a particle size distribution to the Component-A inorganic oxides in the slurry to be spray dried such that the Component-A colloidal content is typically from about 2 to about 60 (e.g. 2 to about 40), preferably from about 3 to about 25, and most preferably from about 4 to about 20 wt. %. Where "diameter" is not otherwise defined by the test used to measure it, e.g., the mercury intrusion method employing a mercury porosimeter, then the term diameter does not require that the particle or void space be a perfect sphere for it to have a measurable diameter; it can be spheroidal, ovoid or irregularly shaped. For purposes of the present invention, the term diameter means the major dimension that is representative of the size of the particle or void.

The colloidal content of Component-A to be spray dried is determined by centrifuging a sample for 30 minutes at 3600 RPM. The liquid (supernatant) which remains on top of the test tube is decanted, and analyzed for percent solids. The percent of colloidal material is then determined by the following equation:

$$\% \text{ colloid} = \left[ \frac{\left(\frac{1-B}{B}\right) - 2.2}{\left(\frac{1-A}{A}\right) - 2.2} \right] \times 100 \qquad \text{Equation 1b}$$

wherein
A=wt. % solids in supernatant/100, and
B=wt. % solids of original slurry/100

The colloidal content will possess a particle diameter in the colloidal range of typically less than about 1, preferably less than about 0.5, and typically from about 0.4 to about 1 micron. All particle size and particle size distribution measurements described herein are determined using a Mastersizer™ unit (available from Malvern Inc.), which operates on the principle of laser light diffraction and is known to those skilled in the art of small particle analysis.

As the colloidal content of the dry solids content of the Component-A slurry exceeds about 60 wt. %, the constituent particles of the agglomerate can become bound too tightly together. Conversely, while the presence of at least some colloidal content of the slurry is desired, a slurry containing no colloidal content (e.g. dry milled powder alone) can produce agglomerates of the support-activator agglomerate which have extremely low physical integrity to an undesirable degree. In such instances it may be desirable to include some alternative source of binder.

One milling process which has been found to impart the aforedescribed properties, as well as the desired morphology, involves a wet milling procedure and optionally a dry milling procedure.

A wet milling procedure is characterized by the presence of liquid, e.g. water, during the milling procedure. Thus, wet milling is typically performed on a slurry of the inorganic oxide particles having a solids content of typically from about 15 to about 25 weight % based on the slurry weight. More specifically, with wet milling, Component-A is slurried in a media (usually water) and the mixture then subjected to intense mechanical action, such as the high speed blades of a hammer mill or rapidly churning media of a sand mill. Wet milling reduces particle size and produces colloidal silica as well. Accordingly, the inorganic oxide (typically while still wet) is then subjected to a milling operation as described below to prepare it for spray drying.

In the wet milling procedure, the washed inorganic oxide is typically subjected to a milling procedure well known in the art that is necessary to produce slurries with the particle sizes specified above. Suitable mills include hammer mills, impact mills (where particle size reduction/control) is achieved by impact of the oxide with metal blades and retained by an appropriately sized screen), and sand mills (where particle size control/reduction is achieved by contact of the oxide with hard media such as sand or zirconia beads). The colloidal particles within the wet milled material are the primary source of the colloid content in the slurry to be spray dried as described above, and are believed to act as a binder upon spray drying.

A dry milling procedure is characterized by the substantial absence of free flowing liquid, e.g. water or solvent. By "substantial absence" in this regard is meant that water or solvent can be present to the extent that it is not in such an amount as to constitute a distinct, separate phase from the inorganic oxide. Thus, while the final dry milled material may contain some absorbed moisture, it is essentially in powder form, not a suspension or solution of particles in liquid. The dry milling referred to typically takes particulate inorganic oxide and reduces it in size either by mechanical action, impingement onto a metal surface, or collision with other particles after entrainment into a high-velocity air stream.

In the dry milling procedure, Component-A is typically milled in a manner sufficient to reduce its average particle size to typically from about 2 to about 10, preferably from about 3 to about 7, and most preferably from about 3 to 6 microns, and its moisture content to typically less that about 50, preferably less than about 25, and most preferably less that about 15 weight %. In order to attain the dry milling particle size targets at the higher moisture contents, it may be desirable to conduct dry milling while the particles are frozen. The dry milling is also conducted preferably to impart a particle size distribution such that the Distribution Span is typically from about 0.5 to about 3.0, preferably from about 0.5 to about 2.0, and most preferably from about 0.7 to about 1.3. Thus, the resulting dry milled material exists in the form of a powder prior to being slurried for spray drying.

The dry milling is preferably conducted in a mill capable of flash drying the inorganic oxide while milling. Flash drying is a standard industrial process where the material to be dried is quickly dispersed into a hot air chamber and exposed to an air stream of 370–537° C. The rate of air and material input is balanced such that the temperature of the outgoing air and the material entrained in it is generally 121–176° C. The whole process of drying usually takes place in less than 10 seconds, reducing the moisture content to less than about 10%. Alternatively, the inorganic oxide can be separately flash dried to the aforedescribed moisture content in a flash dryer and then placed in a dry mill and milled. Suitable dry mills include an ABB Raymond™ impact mill or an ALJET™ FLUID ENERGY MILL. Ball mills can also be used. Suitable flash drying equipment includes Bowen™ flash dryer. Other similar equipment is well known in the chemical processing industry. Flash drying is typically accomplished by exposing the inorganic oxide to conditions of temperature and pressure sufficient to reduce the moisture content thereof to levels as described above over a period of time of typically less than about 60, preferably less than about 30, and most preferably less than about 5 seconds. Dry milling typically does not produce colloidal silica.

In accordance with one embodiment of the agglomerate formation by spray drying, at least a portion of the material constituting Component-A is derived from wet milling, and optionally but preferably at least a portion is derived from dry milling. Thus, prior to agglomeration, Component-A will typically comprise a mixture of previously wet milled inorganic oxide, e.g. silica gel, and dry milled inorganic oxide, e.g. silica gel powder. More specifically, the weight ratio (on a dry solids content basis as defined hereinafter) of the wet milled:dry milled inorganic oxide solids in the slurry can vary typically from about 9:0 to about 0.1:1 (e.g., 9:1), preferably from about 1.5:1 to about 0.1:1, and most preferably from about 0.6:1 to about 0.25:1. The particular wet milled to dry milled solids ratio of Component-A employed will be selected to achieve the target properties in the final slurry to be used in agglomerate formation.

In an alternative embodiment, a sequential milling procedure can be employed to impart the target properties of average particle size and particle size distribution. The sequential milling procedure involves dry milling a sample of the Component-A inorganic oxide and then wet milling the previously dry milled sample.

It has been observed that drying of inorganic oxide starting material during dry milling and then using the dry milled product for wet milling tends to produce a lower colloidal content relative to mixing a separately prepared dry milled product and a separately prepared wet milled product. The reason for this phenomenon is not entirely understood. However, sufficient colloidal content is produced to bind the agglomerate together in a desirable manner. Once the target average particle size and preferably the particle size Distribution Span is imparted to Component-A, a slurry, preferably aqueous slurry, is prepared for agglomeration, preferably by spray drying.

The Component-B layered material, e.g. clay, is typically comprised of fine particles having an average particle size of typically less than 10, preferably less than 5, and most preferably less than 1 micron, such particle sizes ranging typically from about 0.1 to about 10, preferably from about 0.1 to about 5, and most preferably from about 0.1 to about 1 microns. Other preferable physical properties of the clay include a total nitrogen pore volume of typically greater than 0.005 (e.g., 0.005 to 1.50), preferably greater than about 0.1 (e.g., 0.1 to 2) cc/g; a nitrogen surface area of typically greater than 10, preferably greater than 30 (e.g., 10 to 100)

m²/g; and an Apparent Bulk Density (ABD) of typically greater than 0.10, preferably greater than 0.25 (e.g., 0.10 to 0.75) g/cc. Milling procedures can be employed to achieve these target properties, if necessary.

To agglomerate by spray drying, Components-A and -B are admixed, typically in a suitable diluent, to form a slurry of the same. The diluent can be aqueous or organic or a mixture thereof. The preferred liquid slurry medium for spray drying is aqueous, typically greater than 75, preferably greater than 80, and most preferably greater than 95 wt. % water (e.g. entirely water). The weight ratio of Component-A to Component-B in the slurry, can vary typically from about 0.25:1 to about 99:1, preferably from about 0.5:1 to about 20:1, and most preferably from about 1:1 to about 10:1 (e.g., 4:1). The solids content of the slurry containing the mixture of Components-A and -B can vary typically from about 5 to about 25, preferably from about 10 to about 20, and most preferably from about 15 to about 20 wt. % based on the slurry weight.

Accordingly, agglomerate formation is controlled to impart preferably the following properties to the support-activator agglomerate:

A surface area of typically at least about 20, preferably at least about 30, and most preferably from at least about 50 m²/g, which surface area can range typically from about 20 to about 800, preferably from about 30 to about 700, and most preferably from about 50 to about 600 m²/g;

A bulk density of the support-activator agglomerate particles of typically at least about 0.15, preferably at least about 0.20, and most preferably at least about 0.25 g/ml, which bulk density can range typically from about 0.15 to about 1, preferably from about 0.20 to about 0.75, and most preferably from about 0.25 to about 0.45 g/ml;

An average pore diameter of typically from about 30 to about 300, and most preferably from about 60 to about 150 Angstroms; and A total pore volume of typically from about 0.10 to about 2.0, preferably from about 0.5 to about 1.8, and most preferably from about 0.8 to about 1.6 cc/g.

The particle size and particle size distribution sought to be imparted to the support-activator agglomerate particles depends upon the type of polymerization reaction in which the ultimate supported catalyst will be employed. For example, a solution polymerization process typically can employ an average particle size of from about 1 to about 10 microns; a continuous stirred tank reactor (CSTR) slurry polymerization process of from about 8 to 50 microns; a loop slurry polymerization process of from about 10 to about 150 microns; and a gas phase polymerization process of from about 20 to about 120 microns. Moreover, each polymer manufacturer has its own preferences based on the particular reactor configuration.

Once the desired average particle size is determined for the agglomerates based on the targeted polymerization process, the particle size distribution will desirably be such that the Distribution Span is typically from about 0.5 to about 4, preferably from about 0.5 to about 3, and most preferably from about 0.5 to 2. Accordingly, as a generalization, the average particle size of the agglomerates will range typically from about 4 to about 250 (e.g. about 8 to about 200), and preferably from about 8 to about 100 (e.g. about 30 to about 60) microns.

When the agglomerates are formed by spray drying, they preferably can be further characterized in that typically at least 80, preferably at least 90, and most preferably at least 95 volume % of that fraction of the support-activator agglomerate particles smaller that the $D_{90}$ of the entire agglomerate particle size distribution possesses microspheroidal shape (i.e., morphology). Evaluation of the microspheroidal morphology is performed on that fraction of the particle size distribution of the support-activator agglomerates which is smaller than the $D_{90}$ to avoid distortion of the results by a few large particle chunks which because of their large volume, would constitute a non-representative sample of the agglomerate volume. The term "spheroidal" as used herein means small particles of a generally rounded, but not necessarily spherical shape. This term is intended to distinguish from irregular jagged chunks and leaf or rod like configurations. "Spheroidal" is also intended to include polylobed configurations wherein the lobes are also generally rounded, although polylobed structures are uncommon when the agglomerate is made as described herein.

Each microspheroid is preferably composed of a loosely to densely packed composite of Components-A and -B typically with some, to substantially no, interstitial void spaces, and typically substantially no visible boundaries, in an electron micrograph, between particles originally derived from Components-A and -B. The microspheroidal shape of the support-activator agglomerate significantly enhances the desired morphology of the polymers derived therefrom. Thus, one is able simultaneously and significantly to enhance catalyst activity and desired polymer morphology by utilizing the 2 components of support-activator agglomerate.

The terms "surface area" and "pore volume" refer herein to the specific surface area and pore volume determined by nitrogen adsorption using the B.E.T. technique as described by S. Brunauer, P. Emmett, and E. Teller in Journal of American Chemical society, 60, pp. 209–319 (1939). Bulk density is measured by quickly transferring (in 10 seconds) the sample powder into a graduated cylinder which overflows when exactly 100 cc is reached. No further powder is added at this point. The rate of powder addition prevents settling within the cylinder. The weight of the powder is divided by 100 cc to give the density.

Spray drying conditions are typically controlled in order to impart the desired target properties described above to the agglomerate. The most influential spray drying conditions are the pH of the aqueous slurry to be spray dried, as well as its dry solids content. By "dry solids content" as used herein is meant the weight of solids in the slurry after a sample of such solids have been dried at 175° C. for 3 hours, and then at 955° C. for 1 hour. Thus, dry solids content is used to quantify the weight of solid ingredients that exist in the slurry and to avoid inclusion of adsorbed water in such weight.

Typically, the pH of the slurry will be controlled or adjusted to be from about 5 to about 10 (e.g., 8 to 9), preferably from about 7 to about 9, and the dry solids content will be controlled or adjusted to be typically from about 12 to 30, preferably from about 15 to about 25, and most preferably from about 18 to about 22 (e.g. 20) weight % based on the weight of the slurry and the dry weight of the gel.

Control of the remaining variables in the spray drying process, such as the viscosity and temperature of the feed, surface tension of the feed, feed rate, the selection and operation of the atomizer (preferably an air atomizer is employed and preferably without the use of a pressure nozzle), the atomization energy applied, the manner in which air and spray are contacted, and the rate of drying, are well within the skill of the spray dry artisan once directed by the target properties sought to be imparted to the product produced by the spray drying. (See, for example, U.S. Pat.

No. 4,131,452.) Product separation from the drying air follows completion of the spray drying stage when the dried product remains suspended in the air. Any convenient collection method can be employed, such as removal from the base of the spray dryer by the use of separation equipment.

After formation, the support-activator agglomerate is preferably sized prior to calcination since the agglomerates will pick up moisture if sized after calcination. This can be conveniently accomplished by screening or air classifying as is well known in the art. The particle size and particle size distribution selected will depend on the catalyst type and polymerization process to be applied, as would be well known in the art.

To provide uniformity to the catalyst as well as the resulting polymer, it is desirable to calcine the support-activator agglomerate to control any residual moisture present in the support. When calcination is employed, it will typically be conducted at sufficient temperature and time to reduce the total volatiles to between about 0.1 and 8 wt. % where the total volatiles are determined by measuring the weight loss upon destructive calcination of the sample at 1000° C. However, the calcination temperature will also affect the interrelationship between the desired silica to clay ratio and the organo-aluminum compound amount, and the activity of the catalyst as described hereinafter in more detail. Accordingly, calcination, when employed, will typically be conducted by heating the support-activator agglomerate to temperatures of typically from about 100 to about 800, preferably from about 150 to about 600, and most preferably from about 200 to about 300° C. for periods of typically from about 1 to about 600 (e.g., 50 to 600), and preferably from about 50 to about 300 minutes. The atmosphere of calcination can be air or an inert gas. Calcination should be conducted to avoid sintering.

The preferred manner in which the support-activator agglomerate is combined with the pre-catalyst reactants, i.e., transition metal reactant and ligand reactant, will depend in part on the polymerization technique to be employed. More specifically, the catalyst systems described herein are useful for producing polymers using high pressure polymerization, solution polymerization, slurry polymerization, or gas phase polymerization techniques. As used herein, the term polymerization includes homopolymerization (i.e., the polymerization of a single monomer), copolymerization (e.g., polymerization of two monomers) and terpolymerization (e.g., polymerization of three monomers), as well as the interpolymerization of any number of suitable monomers. One skilled in the art will recognize that the catalyst systems of the present invention comprise catalyst components that are capable of polymerizing monomers having different characteristics. Consequently, a catalyst system comprising Group (1) and Group (2) materials, e.g., metallocene and bidentate, ligand-containing pre-catalyst components, may effect polymerization of different classes of monomers than a catalyst system comprising a Group (1) pre-catalyst material.

Deployment of the catalyst system(s) of the present invention can vary depending on the polymerization process employed, with a preference for permitting the in situ formation of the activated catalyst system in the presence of the polymerizable monomer. Thus, where the catalyst is to be used for gas phase polymerization, the ligand-forming reactant(s) and the transition metal reactant(s) can be combined with the support-activator agglomerate in the presence of a solvent or diluent and the solvent or diluent optionally evaporated. For polymerizations which are to be conducted in the liquid state, the catalyst system components can be mixed in a suitable liquid medium, preferably inert, preferably a hydrocarbon liquid, for addition to the polymerization zone, or mixed in a medium that is the same as, or miscible in, the liquid in which the polymerization is to be conducted.

As indicated above, an organometallic compound can be employed for pre-activation of the pre-catalyst, e.g., where $L^3$ of the Group (1) material or L of the Group (2) material of the pre-catalyst is chlorine. It can also be employed as a scavenger for poisons in the polymerization zone.

The mixing of ligand reactant, or, alternatively, reactants capable of forming a ligand (all referred to in the following discussion as Component I), transition metal reactant (referred to in the following discussion as Component II), and support-activator agglomerate (referred to in the following discussion as Component III), for each of Group (1) and Group (2) materials, can be readily accomplished by introducing the components into a substantially inert liquid (i.e., inert with regard to chemical reactivity toward Components I, II and III), which can serve as a diluent or solvent for one or more of the catalyst's components. More specifically, the inert liquid preferably is a non-solvent for the support-activator agglomerate at contact temperatures to assure that the same will be suspended or dispersed in the liquid during contact with the ligand reactant, transition metal reactant and/or pre-catalyst. Suitable inert liquids include hydrocarbon liquids, preferably $C_5$–$C_{10}$ aliphatic or cycloaliphatic hydrocarbons, or $C_6$–$C_{12}$ aromatic or alkyl substituted aromatic hydrocarbons and mixtures thereof. For the appropriate ligand and transition metal reactants, the inert liquid may also be selected from certain inert oxyhydrocarbon liquids, such as a $C_1$–$C_8$ alkanol, such as methanol, ethanol, isopropanol, butanol and the like; an di($C_1$–$C_3$alkyl)ether, such as diethyl ether, ethyl propyl ether and the like; a cyclic ether, such as tetrahydrofuran, glyme, diglyme and the like; and alkyl aldehydes and ketones. The liquids may be used to form the catalyst composition according to the present invention and removed prior to the catalyst composition being introduced into the polymerization zone. Alternately, the liquid may be inert with respect to the polymerization process contemplated and, therefore, may be used as the liquid to form the catalyst composition and to introduce the formed catalyst composition into the polymerization zone. Still further, when the liquid is inert with respect to the polymerization process (including the monomer and the resultant polymer), the catalyst composition may be formed in-situ in the polymerization zone by introducing the Components I, II and III, and, optionally, an organometallic compound as previously described, directly to the polymerization zone.

The above-described Components are introduced into the, preferably inert, liquid and maintained therein under agitation and, typically, at low to moderate temperature and pressure conditions. Particularly suitable liquids are hydrocarbons and include, for example, 1,2-dichloroethane, dichloromethane, pentane, isopentane, hexane, heptane, octane, isooctane, nonane, isononane, decane, cyclohexane, methylcyclohexane, toluene, and combinations of two or more of such diluents. With suitable Components, ethers such as diethylether and tetrahydrofuran can also be used.

The morphological configuration in which the Group 1 and Group 2 materials are deployed will typically involve use of the support-activator agglomerate of the present invention as a support wherein the Group 1, Components I and II species, are immobilized in a manner typically associated with chemical and/or physical adsorption or absorption in: (a) the same support-activator agglomerate particles also containing (by adsorption and/or absorption)

the Group 2, Components I and II species (referred to as the single or one particle embodiment); (b) different support-activator agglomerate particles which do not contain the Group 2, Components I and II species (referred to as the dual or two particle embodiment), and which can optionally eventually be admixed with the Group 2, Components I and II species-containing support-activator agglomerate; or (c) mixtures of (a) and (b) (referred to as the blended embodiment).

Generally, for Group (2) catalyst materials, i.e., late-transition metal compounds, Components I, II and III can be introduced into the, preferably inert, liquid in any order (i.e., sequentially) or substantially simultaneously. For purposes of the present invention and in this regard, the term "substantially simultaneously" means that the introduction of each component begins within about 20 seconds, preferably within about 10 seconds, more preferably within about 5 seconds, of one another. It is preferred that, when the Components are introduced sequentially, they are introduced in rapid order; that is, without a substantial period of delay between each Component's introduction. For purposes of the present invention and with regard to sequential introduction, "without substantial delay" means within about 1 second to about 30 minutes, preferably about 30 seconds to about 15 minutes, more preferably about 1 minute to about 10 minutes, after the completed addition of the prior component. For the Group (1) catalyst materials, i.e., metallocene compounds, it is preferred to add ligand-containing reactants first, followed by deprotonation and then to react with a transition metal compound to form a pre-catalyst which is then contacted with the support-activator agglomerate. Alternatively, with regard to Group (1) materials, the pre-catalyst is contacted with the organometallic compound in order to alkylate the pre-catalyst and the resulting alkylated compound is contacted with the support-activator agglomerate. Overall, these contacting steps can be accomplished in a time period of about 1 minute to about 1 hour. Where both Group (1) (metallocene and/or constrained geometry) and Group (2) (bidentate and/or tridentate) ligand-containing and transition metal-containing reactants are introduced in a manner sufficient to incorporate both Group (1) and Group (2) materials together in single support-activator agglomerate particles of the present invention, referred to for purposes of the present discussion as a "one-particle" catalyst system, the ligand-containing and transition metal-containing reactants for each of the Groups are preferably introduced sequentially. For example, a metallocene ligand-containing compound and a metallocene transition metal compound are introduced with agitation, either substantially simultaneously or sequentially. Then, after a suitable time interval to allow for reaction and formation of the metallocene pre-catalyst followed by addition of the support-activator agglomerate, a bidentate ligand and a bidentate transition metal are introduced, either simultaneously or sequentially. In a still further alternative sequencing, the Group (1) reactants can be added substantially simultaneously with the support-activator agglomerate and, after an appropriate time to allow for reaction and contact with the support-activator agglomerate, the Group (2) reactants are introduced, either substantially simultaneously or sequentially. In this manner, and with the benefit of the teachings herein, it can be seen that various permutations and combinations of reactions sequencing is possible and each such alternative sequencing methods is included within the scope of the present invention. Examples of such variations in the sequence of addition of reactants are illustrated in the following table in which the numbers indicate which component is added first, second, or third; use of the number for more than one component indicates that the components are added substantially simultaneously:

TABLE III

Addition Sequence Order

| Variation | Component I Ligand-Containing Reactant** | | Component II Transition Metal-Containing Reactant** | | Component III Support-activator agglomerate |
|---|---|---|---|---|---|
| | MCN/CG | BD/TD | MCN/CG | BD/TD | |
| 1 | 1 | — | 1 | — | 1 |
| 2 | 2 | — | 2 | — | 1 |
| 3 | 1 | — | 2 | — | 1 |
| 4 | 2 | — | 1 | — | 1 |
| 5 | 1 | — | 1 | — | 2 |
| 6 | 1 | 2 | 1 | 2 | 3 |
| 7 | 1 | 3 | 1 | 3 | 2 |
| 8 | 2 | 1 | 2 | 1 | 3 |
| 9 | 3 | 1 | 3 | 1 | 2 |
| 10 | 1 | 2 | 1 | 2 | 1 |
| 11 | 2 | 1 | 2 | 1 | 1 |
| 12 | 1 | 3 | 2 | 3 | 1 |
| 13 | 2 | 3 | 1 | 3 | 1 |
| 14 | 3 | 1 | 3 | 2 | 1 |
| 15 | 3 | 2 | 3 | 1 | 1 |
| 16 | 1 | 2 | 1 | 2 | 3 |
| 17 | 2 | 1 | 2 | 1 | 3 |
| 18 | 1 | 3 | 1 | 3 | 2 |
| 19 | 3 | 1 | 3 | 1 | 2 |

*If required by the nature of L or $L^3$, an organometallic compound can be added, e.g., following addition of ligand-containing reactant and transition metal reactant pair(s); or before, with or after addition of the support-activator agglomerate.
**MCN = metallocene; CG = constrained geometry; BD = bidentate; TD = tridentate. While MCN and CG are treated as members of one class, and BD and TD as members of another, the examples should be understood to teach that, when a class is present, one or more components of a class can be added.

Alternatively, Components I and II of at least one of the reactants of Group (1) material can be introduced into a reactor, substantially simultaneously or sequentially, together with the support-activator agglomerate, Component III, also substantially simultaneously or sequentially, as discussed immediately above, in order to form a supported catalyst. Also as discussed above, if required by the nature of the transition metal compound, an organometallic reactant can also be introduced before, during or after addition of Component III in order to obtain an appropriately activated catalyst. In this embodiment the supported catalyst comprises one class of catalyst. Similarly, referring to the teachings in U.S. provisional patent application No. 60/287,607, filed Apr. 30, 2001, another supported catalyst can be formed based on at least one Group (2) material (bidentate and/or tridentate ligand and transition metal reactants). If desired, each of the individually prepared Group (1) and Group (2) pre-catalyst materials can be mixed or blended, as solutions, slurries or in dried particulate form, in any proportion desired, in order to form the "two-particle" catalyst system embodiment. Optionally, and if required, each of the catalyst particle types can be further, individually or jointly, contacted with an organometallic compound. In each instance, formation of the supported catalyst can be conducted in the same or in a separate reactor prior to polymerization.

The temperature during contact and reaction of the Components may range typically from about −100° C. to about 200° C.; preferably from about −78° C. to about 150° C.; and most preferably from about 0° C. to about 25° C. (e.g. 60° C. to about 100° C.). The particular temperature selected by one skilled in the art depends on the reactivity and temperature sensitivity of the transition metal compound and the ligand-containing compound to be used for generating the intended Group (1) and, optionally, Group (2) pre-catalyst, e.g., metallocene, constrained geometry, bidentate and tridentate. For example, for a metallocene pre-catalyst, it typically involves deprotonation of a cyclopentadiene or cyclopentadiene derivative compound. Since alkyl-lithium or magnesium compounds are frequently used for this purpose, low temperature conditions are preferred. The Components can be contacted at reduced, atmospheric or elevated pressure. Atmospheric conditions in the mixing and/or contact zone should preferably be substantially anaerobic and anhydrous. The Components are mixed for a period, preferably from about 0.5 minutes to about 24 hours; more preferably from about 1 minute to about 12 hours; and most preferably from about 0.5 to about 5 hours in order to provide a substantially uniform pre-catalyst or catalyst composition or system. In this regard, the term "substantially uniform" means that there are few, if any, visibly apparent layers of undispersed Components; or, if the Components are visually distinguishable from one another, the pattern generated thereby appears random to the unaided eye.

When the supported catalyst composition is formed outside of the polymerization zone, the formed product can be separated from the inert liquid, by, for example, spray drying, filtration, vacuum distillation or the like to provide a solid, particulate preformed catalyst composition. The solid preformed catalyst is preferably stored under anaerobic conditions until being introduced into a polymerization reaction zone for use in producing polymer, e.g., polyolefin, products. The resultant catalyst composition is storage stable for about 3 months to about 6 months or longer.

Alternatively, the mixture of Components I, II and III in the, preferably inert, liquid hydrocarbon (i.e., inert with respect to the Components and the resulting catalyst composition), can remain without separation or purification as a slurry and be used directly as a polymerization catalyst composition. Thus, the catalyst compositions supported on the support-activator agglomerate can be formed by the single-step of mixing the Group (1) and, optionally, Group (2) Components in an inert liquid as described hereinabove, and then either directly transferring the formed liquid dispersion or slurry to the polymerization reaction zone or placing it in storage under anaerobic conditions for later introduction to the polymerization reaction zone. In this embodiment wherein the catalyst system is not separated from the liquid in which it is formed, the inert liquid used to form the dispersion or slurry preferably is chosen from those liquids which (a) are miscible with the liquids used in the polymerization reaction zone, (b) are inert with respect to the solvents, monomer(s) and polymer products contemplated and (c) are capable of suspending or dispersing Component III. Preferably, such an inert liquid is a non-solvent for the support-activator agglomerate.

The polymerization catalyst composition may also be formed in-situ in a liquid phase polymerization reaction zone. The Components I, II and III may be introduced neat, in solution or as a slurry or dispersion, particularly with regard to Component III, the support-activator agglomerate, in an inert liquid, which may be the same liquid as that of the polymerization media. In such cases, the liquid(s) used to introduce the Components used in forming the catalyst composition preferably is compatible or miscible with the liquid used as the polymerization media.

In a gas phase polymerization process, supported catalyst particles prepared according to the teachings herein can be introduced into the gas phase polymerization zone under polymerizing conditions. Alternatively, a slurry of such supported catalyst in a suitable diluent can be injected into the gas phase polymerization zone under conditions where the liquid slurry medium would desirably evaporate leaving the catalyst in a fluidized solid form.

In a batch polymerization process, the Components may be introduced prior to, concurrently with or subsequent to the introduction of the olefinic monomer feed, using a sequencing variation based on those described above. It is preferred that the catalyst forming reactants be introduced first. It has been found that, particularly with Group (2) materials, the catalyst composition forms rapidly from the reactants under normal polymerization conditions to exhibit high catalytic activity and to provide a high molecular weight polymer product.

When both Group (1) and Group (2) materials are present, their concentration relative to the activator of Component III can be adjusted by controlling the amount of each of Group (1) and Group (2) material that is used as well as by varying the Lewis acidity when preparing Component III. Alternatively, each of Group (1) and Group (2) can be contacted individually with Component III using either the one-particle or two-particle method, at the desired concentrations and ratios. Where the two particle method is used, each of the supported catalysts are blended to produce a dual component catalyst system having the desired amounts of Group (1) and Group (2) components in the final catalyst system. Alternatively, as described above, Group (1) and Group (2) materials can each be present in most, if not all, of the support-activator agglomerate particles. Using either approach, an organometallic compound, if required, can be employed individually or jointly with Group (1) and Group (2) materials. The ability to vary the relative concentrations, dispersion, contact time, etc. of the individual elements provides an opportunity for improved control of the overall polymerization process. Using the teachings herein, in the resulting catalyst system, the Group (1) material(s) and, optionally, Group (2) material(s) are in intimate contact with the support-activator agglomerate and the monomer(s) are provided improved access to the activated catalyst system. Consequently, the catalyst composition comprises pre-catalyst(s), as described, which is adsorbed and/or absorbed by the support-activator agglomerate. In this context, adsorption refers to adherence to the surface of the support-activator agglomerate, whereas absorption refers to penetration into the inner structure of the support-activator agglomerate particles.

Generally, the amounts of Component I (ligand-forming reactant) and Component II (transition metal reactant) in the, preferably inert, liquid hydrocarbon are controlled in order to provide a molar ratio of Component I/Component II of from about 0.01/1 to about 10/1; preferably from about 0.1/1 to about 2/1; and most preferably from about 0.1/1 to about 1/1. In addition, the ratio of micromoles of Component I to grams of Component III (support-activator agglomerate) is typically from about 5:1 to about 500:1; preferably from about 10:1 to about 250:1; and most preferably from about 20:1 to about 100:1 (e.g., about 60:1).

While a catalyst resulting from Group (2) material and the support-activator agglomerate described herein exhibits high catalytic activity even in the absence of a co-catalyst activator, such activators are desirably used to activate so called single-site transition metal catalysts, such as those based on bidentate and tridentate transition metal ligand complexes. The conventionally used activators are organometallic compounds such as methylalumoxane or borane and borate compounds, and these materials present handling and cost concerns. However, when a metallocene and/or constrained geometry ligand based catalyst composition, or a bidentate and/or tridentate ligand based catalyst composition is formed using a transition metal reactant having all $L^3$ or L groups, respectively, in the form of halogens as described above, the resultant pre-catalyst should be contacted with an organometallic compound (Formula XVII). Such contact can be effected as previously described with regard to catalyst preparation or in connection with polymerization. In those instances where an organometallic compound is used, it can be conveniently introduced into the polymerization zone in an inert liquid. Suitable organometallic compounds are described in detail above.

The amount of optional organometallic compound in the inert liquid hydrocarbon depends on whether it is intended to be employed for pre-activation of the pre-catalyst or as a scavenger in the polymerization zone. The organometallic compound, when employed in connection with catalyst formation, pre-activates the pre-catalyst which is then believed to be fully activated by the Lewis acidity of the support-activator agglomerate. When employed for such pre-activation, the amount used also depends on the amounts of each of the Group (1) and, optionally Group (2), pre-catalyst present. For example, if both are present and there is a higher concentration of the bi- and/or tridentate pre-catalyst relative to the amount of metallocene and/or constrained geometry pre-catalyst, then the amount of organometallic compound will tend to favor that required to satisfy the alkylation pre-activation requirements of the former over the latter. One skilled in the art can readily determine such requirements independently for each of the particular pre-catalyst species selected and adjust the amount of organometallic compound for the concentration of each pre-catalyst in the mixture. Generally, it is controlled to be such as to provide a molar ratio of organometallic compound to pre-catalyst of typically from about 0.2:1 to about 5000:1 (e.g., 0.1 to about 3000:1), preferably from about 2:1 to about 2000:1, and most preferably from about 4:1 to about 1000:1. As a reference point for arriving at a useful level of optional organometallic compound, it is noted that where only bi- and/or tridentate pre-catalysts are present, the amount of organometallic compound employed for pre-activation in a, preferably inert, liquid hydrocarbon would be controlled to be such as to provide a molar ratio of organometallic compound to bi- and/or tridentate pre-catalyst of typically from about 0.01:1 to about 5000:1; preferably from about 0.1:1 to about 3000:1; and most preferably from about 2:1 to about 1000:1. Furthermore, when the organometallic compound is employed as a scavenger by addition directly to the polymerization zone, the molar ratio can vary typically from about 1:1 to about 5000:1, preferably from about 2:1 to about 3000:1, most preferably from about 10:1 to about 2000:1. Alternatively, one can express the amount of the organometallic compound, when employed, as a function of the weight of the support-activator agglomerate. More specifically, the ratio of millimoles (mmol) of organometallic compound to grams of support-activator agglomerate employed can vary typically from about 0.001:1 to about 100:1 (e.g., 0.01:1 to about 90:1); preferably from about 0.1:1 to about 75:1 (e.g., 2:1 to about 50:1); and most preferably from about 0.1:1 to about 20:1 (e.g., 3:1 to about 15:1).

The amount of liquid hydrocarbon used for reaction or preparation of the catalyst system from reactants can vary typically from about 5 to about 98; preferably from about 60 to about 98; and most preferably from about 75 to about 90 wt. % based on the combined weight of liquid hydrocarbon and the reactants, described above as Components I, II and III. The catalyst complex achieved herein in all of the above-described embodiments results in effective immobilization of the ligand-containing catalyst complex onto and/or into the support-activator agglomerate matrix and activation of the complex as a single-site catalyst complex.

The catalyst composition of the present invention can be used for polymerization, typically addition or olefin polymerization, processes wherein one or more monomers are contacted with the coordination catalyst system (either in its original inert liquid or as separated solid product, as described above) by introduction into the polymerization zone under polymerization conditions. Mixed active catalyst compositions, e.g., metallocene and bidentate or tridentate catalysts are also feasible. For example, depending on the selection of the particular ligand for use in a bidentate or tridentate polymerization catalyst, one can produce oligomers. Consequently, the concurrent use of an active metallocene catalyst can generate a polymer incorporating such oligomer directly into the polymer backbone. For example, use of ethylene in the presence of an appropriate bidentate or tridentate catalyst can generate oligomer(s) of ethylene, e.g., dimers, trimers, and/or tetramers, etc., which are copolymerized with the ethylene to generate a copolymer. Depending on the relative amount of each catalyst species, varying amounts of the oligomer can be generated which can result in a copolymer of varying composition, e.g., a low density ethylene copolymer can be produced using a single feed monomer.

The catalysts of the present invention are useful for carrying out polymerization. Suitable polymerizable monomers include unsaturated monomers, typically ethylenically unsaturated or olefinic monomers, acetylenically unsaturated monomers, conjugated and non-conjugated dienes and polyenes. The terms olefins and olefinic monomers include olefins, alpha-olefins, diolefins, styrenic monomers (including styrene, alkyl substituted styrene and other polymerizable functionalized styrene derivatives), cyclic olefins, and mixtures thereof. Generally, monomers suitable for use in producing a polymerized product by use of the catalyst systems of the invention disclosed herein include any unsaturated monomers capable of polymerization by the catalysts described herein and comprise at least one member selected from the group consisting of alpha-olefins, non-conjugated diolefins, acetylenically unsaturated monomers, olefinically unsaturated aromatic monomers, and unsaturated $C_{20}$ to $C_{200}$ macromonomers. Generally an alpha-olefin can be represented by the formula $CH_2=CHR^x$, wherein $R^x$ is n-alkyl or branched alkyl, preferably n-alkyl. A linear alpha-olefin is a compound of the same formula wherein $R^x$ is n-alkyl. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene or combinations thereof, as well as long chain terminally unsaturated (e.g., vinyl, vinylidene, etc.) oligomeric or polymeric reaction products formed during the polymerization and $C_{10-30}$ alpha-olefins specifically added to the reaction mixture in order to produce relatively long chain branches in the resulting polymers. Particularly useful commercial polymers are based on the polymerization of ethylene; propylene; 1-butene, 4-methyl-pentene-1,1-hexene, 1-octene, and combinations of ethylene and/or propylene with one or more of such other alpha-olefins. The most preferred is ethylene alone or with other alpha-olefins, e.g., $C_3$ to $C_{20}$ alpha-olefins, for example, ethylene plus 1-hexene; and ethylene plus propylene, with or without a polydiene or nonconjugated diene such as 1,4-hexadiene, norbornadiene, dicyclopentadiene, ethylidene norbornene, 1,7-octadiene and other strained geometry olefins. Other preferred monomers include styrene, halo- or alkyl substituted styrenes, tetrafluoroethylene, and vinylcyclobutene. Mixtures of the above-mentioned monomers may also be employed. Additionally, with a suitable catalyst, the polymerization monomers may include functionalized ethylenically unsaturated monomers wherein the functional group is selected from hydroxyl, carboxylic acid, carboxylic acid esters, acetates, ethers, amides, amines and the like.

The coordination catalyst system(s) produced by the processes of the present invention can be advantageously employed in high pressure, solution, slurry or gas phase polymerization processes. Methods and apparatus for effecting such polymerization reactions are well known. The catalyst system according to the present invention can be used in similar amounts and under similar conditions known for olefin polymerization catalysts. However, since the present catalyst systems can exhibit enhanced catalyst activity, it may be determined that lower catalyst concentrations are required for production of a specific polymer under a given set of conditions. Alternatively, with the use of such a more active catalyst system, use of the same catalyst concentration as is conventionally used with prior art coordinate catalyst compositions can result in higher yields of polymer product.

For example, polymerization of olefin monomers can be carried out in the gas phase by fluidizing, under polymerization conditions, a bed comprising the target polyolefin powder and particulates of the catalyst composition using a fluidizing gas stream comprising gaseous monomer. For the gas phase process, the temperature is typically from approximately 0° C. to just below the melting point of the polymer. In the slurry process, the temperature, pressure and choice of diluent are such that the produced polymer forms as a suspension or slurry in the liquid hydrocarbon diluent. In a slurry process, the process is suitably performed with a liquid, preferably inert, diluent such as a saturated aliphatic hydrocarbon. The hydrocarbon is typically a $C_3$ to $C_{10}$ hydrocarbon, e.g., propane, isobutane or an aromatic hydrocarbon liquid such as benzene, toluene or xylene. In a slurry process, the temperature is typically from approximately 0° C. to a higher temperature just below the temperature at which the polymer becomes soluble in the polymerization medium. In a solution process the (co)polymerization is typically conducted by introducing the monomer into a solution or suspension of the catalyst composition in a liquid hydrocarbon under conditions of temperature and pressure such that the produced polyolefin forms as a solution in the hydrocarbon diluent. For the solution process, the temperature is typically from the temperature at which the polymer is soluble in the reaction medium up to approximately 275° C. Pressures used in the polymerization processes can be selected from a relatively wide range of pressures suitable for the particular process under consideration. Generally, such pressures range from subatmospheric to about 20,000 psi; preferred pressures can range from atmospheric to about 1000 psi; and most preferred from 50 to 550 psi. Polymer recovery also varies with the nature of the polymerization process. For example, the polymer can be recovered directly from the gas phase process, by filtration or evaporation of the slurry from the slurry process, or evaporation of solvent in the solution process.

The polymer products produced by the processes and catalysts of the present invention typically can exhibit a broad molecular weight distribution. Polymer molecular weight distribution (MWD) is a measure of the range of molecular weights within a given copolymer sample. It is characterized in terms of at least one of the ratios of weight-average to number-average molecular weight, Mw/Mn, and z-average to weight-average molecular weight, Mz/Mw, where:

$$Mw = \frac{\Sigma N_i M_i^2}{\Sigma N_i M_i}$$

$$Mn = \frac{\Sigma N_i M_i}{\Sigma N_i}$$

$$Mz = \frac{\Sigma N_i M_i^3}{\Sigma N_i M_i^2}$$

wherein $N_i$ is the number of molecules of molecular weight $M_i$.

Molecular weight and molecular weight distribution can be measured by techniques well known in the art, e.g., size exclusion chromatography. For example, one method uses a Waters (brand) model 150C gel permeation chromatograph (GPC) equipped with a Chromatix KMX-6 (LDC-Milton Roy, Riviera Beach, Fla.) on-line light scattering photometer. The system can usefully be operated at 135 C with 1,2,4 trichlorobenzene as the mobile phase. Showdex (Showa-Denko America, Inc.) polystyrene gel columns 802, 803, 804 and 805 are conveniently used. This technique is discussed in "Liquid Chromatography of Polymers and Related Materials III", J. Cazes editor, Marcel Dekker, 1981, p. 207 (incorporated herein by reference to the extent permitted). Typically, no corrections for column spreading are needed since data on generally accepted standards, e.g., National Bureau of Standards Polyethene 1484 and anionically produced hydrogenated polyisoprene (an alternating ethylene-propylene copolymer) demonstrate that such corrections of Mw/Mn or Mz/Mw are less than 0.05 unit. Mw/Mn is calculated from an elution time-molecular weight relationship whereas Mz/Mw is determined using the light scattering photometer. Light scattering and refractive index detectors are particularly useful for determining Mw and Mw/Mn, respectively. The numerical analyses can be performed using a commercially available computer software program, GPC2, MOLWT2 available from LDC/Milton Roy-Riviera Beach, Fla. The methods for determining such molecular characteristics are well known in the polymer art. The equipment and polymer reference standards used in making such measurements can vary, e.g., column types, polystyrene or polymethacrylate reference standards, diluents, temperature, etc. Similarly, molecular weight values can be calculated using so-called universal calibration theory or absolute molecular weights including corrections for branching using measured polymer intrinsic viscosity. However, comparisons of different polymers can be made provided that a consistent set of test conditions and assumptions are used which are appropriate for the polymers being tested in order to determine such molecular weight values.

Use of the catalyst systems taught herein result in both polymer and process improvements, including polymers having broad molecular weight distributions (e.g., Mw/Mn of from about 3 to about 15 or more, for example 25), polymer particles with good spherical morphology and good average bulk density, a catalyst exhibiting high catalyst activity and a process with little or no reactor fouling. Furthermore, as a consequence of the use of mixed pre-catalyst types, one skilled in the art can control the amounts of each catalyst type in order to "tune-in" the desired MWD, modality, branching and/or polymer chain end unsaturation and polymer properties such as melt flow, film forming characteristics, film strength, etc.

The polymers, particularly the alphaolefin based polymers produced according to the catalyst system of this invention have utility according to the molecular weight, comonomer incorporation level (where included), polydispersity index (PDI) or molecular weight distribution (MWD), etc. Thus, typical applications include films, fibers molded thermoplastics by any of the known means of melt processing and subsequent extrusion and/or thermoforming. In such applications incorporation of additives such as processing aids, stabilizers, pigments, fillers and other polymer components as are conventionally known can be utilized. Specific examples include high density polyethylene and isotactic polypropylene film, including oriented forms of film and those modified by the incorporation of resins or other additives.

All references herein to elements or metals belonging to a certain Group refer to the Periodic Table of the Elements in Hawley's Condensed Chemical Dictionary, 12$^{th}$ Edition. Also, any references to the Group or Groups shall be to the Group or Groups as reflected in this Periodic Table of Elements using the new notation system for numbering groups.

The following examples are given as specific illustrations of the invention. It should be understood, however, that the invention is not limited to the specific details set forth in the examples. All parts and percentages in the examples, as well as in the remainder of the specification, are by weight unless otherwise specified.

Further, any range of numbers recited in the specification or paragraphs hereinafter describing various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. The term "about" when used as a modifier for, or in conjunction with, a variable, is intended to convey that the numbers and ranges disclosed herein are flexible and that practice of the present invention by those skilled in the art using temperatures, concentrations, amounts, contents, carbon numbers, properties such as particle size, surface area, pore diameter, pore volume, bulk density, etc., that are outside of the range or different from a single value, will achieve the desired result, namely, processes for producing coordination catalyst systems and polymers such as polyolefins polymerized using such systems.

EXAMPLE 1
Preparation of Support-Activator Agglomerate

Part A—Preparation of Base Silica Hydrogel

Silica gel was prepared by mixing an aqueous solution of sodium silicate and sulfuric acid under suitable agitation and temperature to form a silica sol that set to a gel in about 8 minutes. The resulting gel was base washed with dilute (about 2 wt. %) ammonia (NH$_3$) solution at 65.5° C. (150° F.) for 18 to 36 hours. During this time, the silica gel was cleansed of salt by-products and the surface area was modified. The base wash was followed by a fresh water wash wherein the gel was placed in a re-circulating bath at 82° C.

The base washed gel was aged at 65–82° C. for about 36 hours and a pH of 6 to 7 for one sample designated 1A, and a pH of 7.5 to 9 for another sample designated 1B. The surface area (SA) of the gel was thereby reduced to about 600 m$^2$/g for Sample 1A and to 300 m$^2$/g for Sample 1B. The resulting water washed gel of Samples 1A and 1B have a SiO$_2$ content of about 35 wt. % with the balance being water, and an Average Particle Size (APS) of Samples 1A and 1B from 0.5 to 2.0 micron.

Part B(i)—Preparation of Wet Milled Hydrogel Sample 2A (SA=600 m$^2$/g)

A Sample 1A silica gel prepared in accordance with Part A was subjected to wet milling in a sand mill. Sufficient water was then added thereto to make a slurry of 20 wt. % solids. The bulk sample particle size was reduced with a blade mill and further processed through a wet sand mill to reduce the average particle size (APS) to <100 microns. The sample was then sand milled. The slurry was pumped through the sand mill at 1 liter per minute with a media load of 80% (4 liters) zirconia silicate 1.2 mm beads. The average particle size was reduced to 8 and 10 microns and the particle size distribution was 4/8/15 microns for D10, D50 and D90. The surface area was 600 m$^2$/g. The resulting wet milled sample was designated Sample 2A. Sample 2A had a colloidal content between 20 and 25 wt. % as determined by centrifugation.

Part B(ii)—Preparation of Wet Milled Hydrogel Sample 2B (SA=300 m$^2$/g)

Example 1, Part B(i) was repeated using base silica gel Sample 1B. The resulting wet milled sample was designated Sample 2B and had a colloidal content between 15 and 30 wt. % as determined by centrifugation and a SA of 300 m$^2$/g. The resulting material was designated Sample 2B.

Part C—Preparation of Dry Milled Sample 3B (SA=300 m$^2$/g)

A base silica gel Sample 1B prepared in accordance with Part A was subjected to dry milling procedure as follows:

The sample was flash or spray dried to a moisture content below 10 wt. %. The dried powder sample was then milled to an average particle size (APS) of about 5 microns, a surface area (SA) of still about 300 m$^2$/g, and a N$_2$ pore volume of 1.5 cc/g. The resulting sample was designated Sample 3B.

Part D—Preparations of Dry Milled Sample 3A (SA=600 m$^2$/g)

Part C was repeated except that the base silica gel was Sample 1A prepared in accordance with Example 1, Part A. The resulting dry milled sample had a moisture content of less than 10 wt. %, an APS of 5 microns and a SA of 600 m$^2$/g. The resulting sample was designated Sample 3A.

Part E—Preparation of Silica Slurry

Six different blends (designated Runs 1 to 6) of Sample 2B and Sample 3B were prepared at weight ratios of Sample 3B (dry milled):Sample 2B (wet milled) as reported in Table I. Before blending, Sample 3B was slurried in water to a 20 wt. % solids content using a mixer. The Sample 3B slurry was then added to the 20 wt. % solids content aqueous slurry of Sample 2B at amounts sufficient to achieve the ratios reported in Table I.

TABLE I

Silica Support Slurries
Sample 3B (Dry Milled):Sample 2B (Wet Milled)

| Run No. | Ex. or Comparative Ex. | Ratio, Weight % | Weight Ratio |
|---|---|---|---|
| 1 | Ex 1 Part E | 79/21 | 3.75:1 |
| 2 | Ex 1 Part E | 78/22 | 3.50:1 |
| 3 | Ex 1 Part E | 75/25 | 3.00:1 |
| 4 | Ex 1 Part E | 70/30 | 2.25:1 |
| 5 | Ex 1 Part E | 60/40 | 1.50:1 |
| 6 | Ex 1 Part E | 0/100 | 0:1 |

Part F—Preparation of Alternate Silica Support Slurries

Part E was repeated except that Sample 3B (300 m$^2$/g) was replaced with Sample 3A (600 m$^2$/g) and Sample 2B (300 m$^2$/g) was replaced with Sample 2A (600 m$^2$/g). The dry milled/wet milled ratios employed are summarized at Table V and the slurries designated Runs 7 to 9.

TABLE II

Sample 3A (Dry Milled):Sample 2A (Wet Milled)

| Run No. | Ratio, Weight % | Weight Ratio |
|---|---|---|
| 7 | 75/25 | 3.00:1 |
| 8 | 60/40 | 1.50:1 |
| 9 | 0/100 | 0:1 |

Part G—Preparation of Clay Slurry

A montmorillonite clay available from Southern Clay, under the trade names, Montmorillonite BP Colloidal Clay, was obtained. This clay has the following properties as summarized at Table III.

TABLE III

Chemical Composition of Montmorillonite BP Colloidal Clay

| Chemical Composition | | Physical Properties | |
|---|---|---|---|
| Component | Wt. % | Appearance | Tan Powder |
| $SiO_2$ | 69.5 | Apparent Bulk Density | 0.45 g/cc |
| $Fe_2O_3$ | 4.4 | Surface Area | 70 $m^2/g$ |
| $Al_2O_3$ | 19.0 | APS | 1.5 microns |
| MgO | 2.3 | Average Pore Diameter | 114 Å |
| CaO | 1.0 | Total Pore Volume | 0.20 cc/g |
| $Na_2O$ | 2.7 | | |
| $SO_4$ | 0.6 | | |

Part H—Preparation of Silica/Clay Slurry for Spray Drying

Each of the silica slurries of Runs 1 to 9 was combined with the clay slurry of Part G in a manner sufficient to control the weight ratio of silica:clay dry solids to be as reported at Table IV. Each slurry was adjusted with acid (sulfuric acid) or base (ammonium hydroxide) to achieve a slurry pH of 7–8.5. The APS of the slurry solids was about 4 to 5 microns, the total dry solids content of the slurry was about 15 to 18 wt. %. The resulting slurries are designated Runs 13 to 21.

TABLE IV

Spray Drying or Tray Drying Slurry and Conditions

| Run No. | Ex. No. or Comparative Ex. No. | Silica Source (Run No.) | Silica:Clay Dry Solids Ratio (w/w) |
|---|---|---|---|
| 10 | Ex 1 Pt H | 1 | 95:5 |
| 11 | Ex 1 Pt H | 2 | 90:10 |
| 12 | Ex 1 Pt H | 3 | 80:20 |
| 13 | Ex 1 Pt H | 4 | 65:35 |
| 14 | Ex 1 Pt H | 5 | 50:50 |
| 15 | Ex 1 Pt H | 6 | 25:75 |
| 16 | Ex 1 Pt H | 7 | 80:20 |
| 17 | Ex 1 Pt H | 8 | 50:50 |
| 18 | Ex 1 Pt H | 9 | 25:75 |

Part I—Spray Drying of Silica/Clay Slurry

The pH value of the silica/clay slurry was adjusted and was then pumped to a spray dryer to dry the mixture and to form microspheroidal agglomerates. All spray drying is conducted by using a Bowen 3-ft. diameter spray dryer with inlet-outlet temperatures of 350/150° C. and a two-fluid spray nozzle using air at 10–30 psi to atomize the slurry. The air through-put of the Niro is dampened to keep the spray chamber under 7" water vacuum and the slurry is fed at 250–300 cc/min. The product is then collected in the chamber collection pot, located directly under the drying chamber, where the coarsest fraction drops out from air entrainment. Other, smaller fractions go to a cyclone collection pot and the smallest to a baghouse. The chamber material is then screened through 200 to 250 mesh to give the desired APS of 40–55 microns. The Total Volatiles (TV %) at 954.4° C. (1750° F.) of the spray dried product is in the range of 2–20 wt. %, so further drying in a static bed oven at 150–800° C. is then used to lower the total volatiles down to 0.5–5%.

The total yield of material from the spray dryer chamber collection pot and from screening the same is about 15–20 wt. %. Table V below reports silica/clay morphological properties of the resulting agglomerates. The resulting agglomerate samples are designated Runs 19 to 27.

TABLE V

Spray Dried Silica/Clay Support-Activator Agglomerate Product Properties

| | | | Column | | | |
|---|---|---|---|---|---|---|
| 1 | 2 | 3 | 4 | 5 | 6 | 7 |
| | Slurry | | | | | |
| Ex. | Source | | Support-Activator Agglomerate | | | |
| No. | Table | | Properties | | | |
| Run No. | or Comp Ex. | VII (Run No.) | Silica:Clay (Weight Ratio) | APS, microns | SA, $m^2/g$ | Pore Vol., cc/g | Drying Method |
| 19 | Ex 1 | 10 | 95:5 | 45 | 275 | 1.65 | Spray |
| 20 | Ex 1 | 11 | 90:10 | 45 | 268 | 1.61 | Spray |
| 21 | Ex 1 | 12 | 80:20 | 45 | 251 | 1.48 | Spray |
| 22 | Ex 1 | 13 | 65:35 | 45 | 213 | 1.28 | Spray |
| 23 | Ex 1 | 14 | 50:50 | 45 | 185 | 1.04 | Spray |
| 24 | Ex 1 | 15 | 25:75 | 45 | 160 | 0.64 | Spray |
| 25 | Ex 1 | 16 | 80:20 | 45 | 494 | 1.16 | Spray |
| 26 | Ex 1 | 17 | 50:50 | 45 | 322 | 0.83 | Spray |
| 27 | Ex 1 | 18 | 25:75 | 45 | 192 | 0.54 | Spray |

Part J—Preparation of MgO-Containing Silica-Clay Agglomerate Materials

An aqueous slurry that contained 23 lb water, dry milled Sample 3A (900 g; with an APS of 5 microns and a SA/PV of 600 $m^2/g$/1.50 cc/g; Ex. 1 Part D), MgO (500 g; MagChem 30, trade name for magnesium oxide product of the Martin Marietta Chemical Co., Hunt Valley, Md.; 98% MgO with an APS of 4 microns and a SA of 25 $m^2/g$.), and clay (500 g; as described above) was added 5 lbs (2,270 g) of wet-milled hydrogel Sample 2A (SA 600 $m^2/g$; Ex 1 Part Bi) above. The combined slurries were then spray dried in the 3 ft. diameter Niro with an inlet/outlet temperature of 350/150° C. The material caught at the chamber collection pot was screened through 200 mesh screen. The APS of the particle is 54 micron, whereas the SA and PV are 369 m2/g and 0.89 cc/g, respectively. The MgO content is 20.6%.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

I claim:

1. A process for preparing a catalyst system capable of polymerizing at least one unsaturated monomer comprising sequentially or substantially simultaneously providing:
   (I) particles of a support-activator agglomerate formed by agglomerating:
      (A) at least one inorganic oxide component selected from the group consisting of $SiO_2$, $Al_2O_3$, MgO, $AlPO_4$, $TiO_2$, $ZrO_2$, and $Cr_2O_3$; with
      (B) at least one ion containing layered material having interspaces between the layers and sufficient Lewis acidity to activate the pre-catalyst compound of (II) when said pre-catalyst is in contact with said support-activator agglomerate, said layered material having a cationic component and an anionic component, wherein said cationic component is present within the interspace of the layered material, said layered material being intimately mixed with said inorganic oxide component within the agglomerate particle in amounts sufficient to provide a coordination catalyst system having the ability to polymerize said at least one unsaturated monomer;
   (II) pre-catalyst reactants, comprising at least one Group (1) material and optionally at least one Group (2) material:
      wherein said Group (1) material comprises:
      (A) at least one transition metal reactant capable of reacting with at least one metallocene or constrained geometry ligand-containing reactant; and
      (B) at least one metallocene or constrained geometry ligand-containing reactant;
      and wherein said Group (1) material is capable of
      (C) being supported upon contact with said support-activator agglomerate, or
      (D) being converted, upon contact with an organometallic compound, to an intermediate capable of being activated upon contact with said support-activator agglomerate,
      wherein said transition metal of (II) (A) is at least one member selected from Groups 3, 4 or Lanthanide metals, of the Periodic Table of Elements; and
      wherein said Group (2) material comprises:
      (E) at least one transition metal reactant capable of reacting with at least one bidentate ligand-containing reactant to form a Group (2) material; and
      (F) at least one bidentate ligand-containing reactant;
      and wherein said Group (2) material is capable of:
      (G) being activated upon contact with said support-activator agglomerate or
      (H) being converted, upon contact with an organometallic compound, to an intermediate capable of being activated upon contact with said support-activator agglomerate,
      wherein said transition metal of (II) (E) is at least one member selected from Groups 3 to 10 of the Periodic table; and
   contacting, in the presence of at least one liquid hydrocarbon, said support-activator agglomerate, said pre-catalyst reactant Group (1) and, optionally Group (2) materials, in a manner sufficient to form a pre-catalyst and, together with said support-activator agglomerate to provide in said liquid hydrocarbon, a ratio of micromoles of total ligand-containing compound to grams of support-activator agglomerate of from about 5:1 to about 500:1, and to cause at least one of absorption and adsorption of said pre-catalyst by said support-activator agglomerate.

2. The process of claim 1 wherein said pre-catalyst reactants comprise Group (1) material, said process further comprising including at least one organometallic compound in said liquid hydrocarbon represented by the formula:

$$M(R^{12})_s$$

wherein M represents at least one element of Groups 1, 2, or 13 of the Periodic Table, tin or zinc, and each $R^{12}$ independently represents at least one of hydrogen, halogen, or hydrocarbyl group, and s is the oxidation number of M, said organometallic compound being in intimate contact with said pre-catalyst reactants, wherein the amount of organometallic compound present in said liquid hydrocarbon is sufficient to provide a molar ratio of organometallic compound to pre-catalyst of from about 0.01:1 to about 5000:1.

3. The process of claim 1 wherein said pre-catalyst Group (1) reactants form at least one transition metal compound represented by the formula:

$$Cp^*_q ZL^x_m L^y_n L^3_p \qquad (I)$$

wherein:

each Cp* independently represents anionic, delocalized, ★-bonded, cyclopentadienyl group, substituted cyclopentadienyl group, cyclopentadienyl derivative group, or substituted cyclopentadienyl derivative group, with two Cp* groups being optionally joined together by a moiety having up to 30 non-hydrogen atoms thereby forming a bridged structure;

Z represents at least one transition metal selected from Ti, Zr, or Hf in the +2, +3 or +4 oxidation state;

$L^x$ is a divalent substituent of up to 50 non-hydrogen atoms that, when present, together with Cp* forms a metallocycle with Z;

$L^y$ each occurrence independently represents a neutral Lewis base having up to 20 non-hydrogen atoms or $L^y$ can represent a second transition metal compound of the same type as formula I such that two metal Z centers are bridged by one or two $L^3$ groups;

$L^3$ each occurrence independently represents a monovalent, anionic moiety having up to 50 non-hydrogen atoms, a neutral, conjugated or non-conjugated diene π-bonded to Z, with two $L^3$ groups together optionally constituting a divalent anionic moiety having both valences bound to Z, and with $L^3$ and $L^y$ together optionally constituting a moiety both covalently bound to Z and coordinated thereto by a Lewis base functionality;

q is an integer of 1 or 2 and represents the number of Cp* groups bound to Z;

m is an integer of 0 or 1 and represents the number of $L^x$ groups bound to Z;

n is an integer of from 0 to 3;

p is an integer of from 1 to 3;

the sum of q+m+p being equal to the formal oxidation state of Z; and provided that where any one of $L^x$, $L^y$ and $L^3$ is hydrocarbyl containing, such L group is not Cp*; and wherein said pre-catalyst Group (2) reactants form at least one transition metal compound represented by the formula:

wherein:
(I) each A independently represents one of the elements oxygen, sulfur, phosphorus or nitrogen, wherein each of said elements is either unsubstituted or substituted with a hydrocarbon-based radical or group;
(II) Z represents a transition metal selected from the group consisting of Fe, Co, Ni, Ru, Rh, Pd, Os, Ir, Pt in the +2 oxidation state, or Ti, V, Cr, Mn, Zr, and Hf in the +2, +3 or +4 oxidation state:
(III) each L and L' independently represents a ligand selected from at least one of hydrogen, halogen, or hydrocarbon-based radical, or two L groups, together represent a hydrocarbon-based radical, which, together with Z, constitute a heterocyclic ring structure;
(IV) a is an integer of 0 or 1 and represents the number of L' groups bound to Z, the lines joining each A to each other A represent a hydrocarbon-based radical joined to A by a double or single bond, the lines joining each A to Z represent a covalent or dative bond.

4. The process of claim 3 wherein said pre-catalyst Group (1) reactants form at least one transition metal compound represented by the formulae:

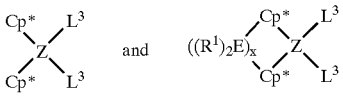

wherein:
Cp*, Z and each $L^3$ are as defined in claim 3;
E is silicon or carbon;
$R^1$ each occurrence is independently selected from the group consisting of hydrogen, silyl, hydrocarbyl or hydrocarbyloxy having up to 30 carbon or silicon atoms; and
x is an integer of 1 to 8; and
wherein said pre-catalyst Group (2) reactants form at least one transition metal compound represented by the formula:

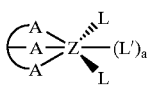

wherein:
(I) each A independently represents one of the elements oxygen, sulfur, phosphorous or nitrogen, wherein each of said elements is either unsubstituted or substituted with a hydrocarbon-based radical or group;
(II) Z represents a transition metal selected from the group consisting of Fe, Co, Ni, Ru, Rh, Pd, Os, Ir, Pt in the +2 oxidation state or Ti, V, Cr, Mn, Zr, and Hf in the +2, +3 or +4 oxidation state;

(III) each L and L' independently represents a ligand selected from at least one of hydrogen, halogen or hydrocarbon-based radical, or two L groups together represent a hydrocarbon-based radical, which together with Z, constitute a heterocyclic ring structure; and
(IV) a is an integer of 0, 1, or 2 and represents the number of L' groups bound to Z, the lines joining each A to each other A represent a hydrocarbon-based radical joined to A by a double or single bond, and the lines joining each A to Z represent a covalent or dative bond.

5. The process of claim 3 wherein said pre-catalyst Group (1) reactants form at least one transition metal compound represented by the formula:

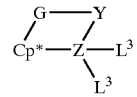

wherein:
Z, Cp* and $L^3$ are as defined in claim 3;
G is a divalent moiety comprising oxygen, boron, or a member of Group 14 of the Periodic Table of Elements; and
Y is a linking group comprising nitrogen, phosphorous, oxygen or sulfur, with G and Y together optionally constituting a fused ring structure; and
wherein said pre-catalyst Group (2) reactants form at least one transition metal compound represented by the formula:

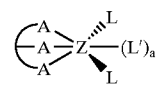

wherein:
(I) each A independently represents oxygen, sulfur, phosphorous or nitrogen, wherein each of said elements is either unsubstituted or substituted with a hydrocarbon-based radical or group;
(II) Z represents a transition metal selected from the group consisting of Fe, Co, Ni, Ru, Rh, Pd, Os, Ir, Pt in the +2 oxidation state or Ti, V, Cr, Mn, Zr, and Hf in the +2, 30 'or +4 oxidation state;
(III) each L and L' independently represents a ligand selected from at least one of hydrogen, halogen or hydrocarbon-based radical, or two L groups together represent a hydrocarbon-based radical, which together with Z, constitute a heterocyclic ring structure; and
(IV) a is an integer of 0, 1, or 2 and represents the number of L' groups bound to Z, the lines joining each A to each other A represent a hydrocarbon-based radical joined to A by a double or single bond, and the lines joining each A to Z represent a covalent or dative bond.

6. The process of any one of claims 3, 4 and 5 wherein Cp* is selected from cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, or decahydroanthracenyl; and wherein each A represents a nitrogen atom, each L and L' is independently selected from halogen or hydrocarbyl, or two L groups together represent hydrocarbylene which together with Z constitute a 3 to 7 member heterocyclic ring structure.

7. The process of claim 2 wherein M is aluminum, s is 3, and $R^{12}$ is $C_1$ to $C_{24}$ alkyl.

8. The process of any one of claims 3, 4 and 5 wherein Cp* is substituted with at least one $C_1$ to $C_{10}$ hydrocarbyl group and wherein Z of said pre-catalyst reactant Group (2) material is selected from at least one of Ni, Pd, Fe, or Co.

9. The process of any one of claims 4 and 5 wherein at least one $L^3$ group is selected from halogen or hydrocarbyl and wherein Z of said pre-catalyst reactant Group (2) material is selected from Ni or Pd and each L of said pre-catalyst reactant Group (2) material is independently selected from chlorine, bromine, iodine, and $C_1$–$C_8$ alkyl.

10. The process of any one of claims 4 and 5 wherein each $L^3$ is independently selected from chlorine, bromine, iodine, or $C_1$–$C_8$ alkyl and wherein Z of said pre-catalyst reactant Group (2) material is selected from iron or cobalt and each L of said pre-catalyst reactant Group (2) material is independently selected from chlorine, bromine, iodine, and $C_1$–$C_8$ alkyl.

11. The process of claim 3 prepared by the additional step of including in said liquid hydrocarbon of step III, at least one organometallic compound represented by the formula:

$$M\ (R^{12})_s$$

wherein M represents at least one element of Group 1, 2, or 13 of the Periodic Table, tin or zinc, and each $R^{12}$ independently represents at least one of hydrogen, halogen, or hydrocarbyl group, and s is the oxidation number of M; said organometallic compound being in intimate contact with said pre-catalyst reactants in an amount sufficient to provide a molar ratio of pre-catalyst to organometallic compound from about 1:1 to about 2000:1.

12. The process of claim 4 comprising the additional step of including at least one organometallic compound in said liquid hydrocarbon represented by the formula:

$$M\ (R^{12})_s$$

wherein M represents at least one element of Group 1, 2, or 13 of the Periodic Table, tin or zinc, and each $R^{12}$ independently represents at least one of hydrogen, halogen or hydrocarbyl group, and s is the oxidation number of M; said organometallic compound being in intimate contact with said pre-catalyst reactants in an amount sufficient to provide a molar ratio of pre-catalyst to organometallic compound in the hydrocarbon liquid from about 1:1 to about 2000:1.

13. The process of claim 5 comprising the additional step of including at least one organometallic compound in said liquid hydrocarbon represented by the formula:

$$M\ (R^{12})_s$$

wherein M represents at least one element of Group 1, 2, or 13 of the Periodic Table, tin or zinc, and each $R^{12}$ independently represents at least one of hydrogen, halogen or hydrocarbyl group, and s is the oxidation number of M; said organometallic compound being in intimate contact with said pre-catalyst reactants in an amount sufficient to provide a molar ratio of pre-catalyst to organometallic compound in the hydrocarbon liquid from about 1:1 to about 2000:1.

14. The process of claim 11 wherein M is aluminum, $R^{12}$ is alkyl or alkoxy, s is 3, and in said pre-catalyst reactant Group (1) material, Z is selected from Zr, Ti or Hf, and $L^3$ is halogen and in said pre-catalyst reactant Group (2) material, Z is selected from Ni or Pd, and L is halogen.

15. The process of any one of claims 11 and 12 wherein M is aluminum, $R^{12}$ is alkyl or alkoxy, s is 3, and in said pre-catalyst reactant Group (1) material, Z is selected from Zr, Ti or Hf, and $L^3$ is halogen and in said pre-catalyst reactant Group (2) material, Z is selected from Fe or Co, and L is halogen.

16. The process of claim 1 wherein said support-activator agglomerate is at least one clay or clay mineral having a negative charge below 0.

17. The process of claim 16 wherein said layered material is a smectite clay, the weight ratio of inorganic oxide to clay in the support-activator agglomerate particle is from about 0.25:1 to about 99:1, and the ratio of micromoles of pre-catalyst to grams of support-activator agglomerate is from about 5:1 to about 200:1.

18. The process of claim 17 wherein the smectite clay is at least one of montmorillonite and hectorite, the weight ratio of inorganic oxide to clay in the support-activator agglomerate particle is from about 0.5:1 to about 20:1, and the ratio of micromoles of pre-catalyst to grams of support-activator agglomerate is from about 20:1 to about 60:1.

19. The process of claim 1 wherein the inorganic oxide is $SiO_2$, the weight ratio of $SiO_2$ to layered material in said support-activator agglomerate particle is from about 1:1 to about 10:1, and the ratio of micromoles of pre-catalyst to grams of support-activator agglomerate is from about 20:1 to about 60:1.

20. The process of any one of claims 3, 4 and 5 wherein said support-activator agglomerate comprises spray dried agglomerate particles comprising constituent particles of at least one of said inorganic oxides and at least one of said layered materials wherein:

(I) at least 80% of the volume of said agglomerated particles smaller than $D_{90}$ of the entire agglomerate particle size distribution possess microspheroidal morphology;

(II) said support-activator agglomerate particles possess
   (A) an average particle size of from about 5 to about 250 microns, and
   (B) a surface area of from 20 to about 800 $m^2/gm$;

(III) the constituent inorganic oxide particles from which the agglomerate particles are derived have an average particle size, prior to spray drying, of from about 2 to about 10 microns and the constituent layered material particles have an average particle size, prior to spray drying, of from about 0.01 to about 50 microns.

21. The process of claim 20 wherein said constituent inorganic oxide particles from which said agglomerate particles are derived, prior to spray drying, have:

(I) an average particle size of from about 4 to about 9 microns;

(II) a particle size Distribution Span of from about 0.5 to about 3.0 microns; and (III) a colloidal particle size content of from about 2 to about 60 wt. %, based on the constituent inorganic oxide weight.

22. The process of claim 1 wherein said support-activator agglomerate and pre-catalyst reactants are agitated in said liquid hydrocarbon at a temperature of from about 0 to about 80° C. for a period of from about 0.5 to about 1440 minutes.

23. The process of claim 1 wherein said liquid hydrocarbon is separated from the mixture of support-activator agglomerate and pre-catalyst.

24. The process of claim 2 wherein said liquid hydrocarbon is separated from the mixture of support-activator agglomerate, pre-catalyst and organometallic compound.

25. The process of claim 2 wherein said organometallic compound is contacted with pre-catalyst reactants prior to contact with the support-activator agglomerate.

26. The process of claim 1 wherein said pre-catalyst reactants comprise Group (1) material, said process further comprising including in said liquid hydrocarbon of step III, at least one organometallic compound represented by the formula:

$$M(R^{12})_s$$

wherein M represents at least one element of Groups 1, 2, or 13 of the Periodic Table, tin or zinc, and each $R^{12}$ is independently selected from the group consisting of hydrogen, halogen, or hydrocarbyl, and s is the oxidation number of M, said organometallic compound being in intimate contact with said pre-catalyst reactants, wherein the amount of organometallic compound present is sufficient to provide a ratio of millimoles of organometallic compound to grams of support-activator agglomerate of from about 0.001:1 to about 100:1.

27. The process of claim 26 wherein said ratio is from about 0.1:1 to about 20:1.

28. The process of claim 1 wherein, prior to agglomerating, said support-activator agglomerate is calcined at a temperature of from about 100 to about 800° C. for a period of from about 1 to about 600 minutes.

29. The process of claim 1 further comprising recovering said pre-catalyst impregnated support-activator agglomerate.

30. The process of claim 1 comprising providing at least one each of said Group (1) and Group (2) materials, wherein sequentially each of said pre-catalyst reactants of said Group (1) material are reacted and each of said pre-catalyst reactants of said Group (2) material are reacted.

31. The process of claim 30 wherein said catalyst system comprises (i) agglomerate particles in which reaction products of both said Group (1) material and said Group (2) materials are present; or (ii) a mixture of agglomerate particles of reaction products of said Group (1) material and agglomerate particles of reaction products of said Group (2) material; or a mixture of (i) and (ii).

32. A polymerization process comprising contacting at least one unsaturated monomer under polymerization conditions with a coordination catalyst system prepared by the process of any one of claims 1–5, 7, 11, 14, 16, 19, or 21 through 31 inclusive.

33. The process of claim 32 wherein said contacting is accomplished:

(a) in the presence of a liquid diluent under slurry polymerization conditions; or (b) in a gas phase reactor under conditions of gas phase polymerization.

34. The process of claim 32 wherein said monomers comprise at least one member selected from the group consisting of alpha-olefins, non-conjugated diolefins, acetylenically unsaturated monomers, olefinically unsaturated aromatic monomers and $C_{20}$ to $C_{200}$ macromonomers.

35. The process of claim 34 wherein said monomers comprise at least one member selected from the group consisting of ethylene and $C_3$ to $C_{20}$ alpha-olefins.

36. The process of claim 32 wherein the molecular weight distribution, characterized by the ratio of Mw/Mn, of said polymer produced by said process is from about 3 to about 15.

37. The process of claim 32 comprising providing at least one each of said Group (1) and Group (2) materials, wherein sequentially each of said pre-catalyst reactants of said Group (1) material are reacted and each of said pre-catalyst reactants of said Group (2) material are reacted.

38. The process of claim 32 wherein said catalyst system comprises (i) agglomerate particles in which reaction products of both said Group (1) material and said Group (2) materials are present; or (ii) a mixture of agglomerate particles of reaction products of said Group (1) material and agglomerate particles of reaction products of said Group (2) material; or a mixture of (i) and (ii).

39. The process of claim 1 wherein said contact between said support-activator agglomerate occurs: (i) jointly with each of said Group (1) material and said Group (2) material; or (ii) individually with each of said Group (1) material and said Group (2) material.

40. The process of claim 39 wherein following step (ii), said agglomerate particles comprising each of said Group (1) material and said Group (2) material are blended in the desired proportion.

41. The process of claim 1 wherein the sequence of addition and contacting of the ligand-containing reactant, the transition metal reactant and the support-activator agglomerate components is selected from the group set forth in the following table:

| Variation | Component I Ligand-Containing Reactant | | Component II Transition Metal Reactant | | Component III Support-activator agglomerate |
|---|---|---|---|---|---|
| | MCN/CG | BD/TD | MCN/CG | BD/TD | |
| 1 | 1 | — | 1 | — | 1 |
| 2 | 2 | — | 2 | — | 1 |
| 3 | 1 | — | 2 | — | 1 |
| 4 | 2 | — | 1 | — | 1 |
| 5 | 1 | — | 1 | — | 2 |
| 6 | 1 | 2 | 1 | 2 | 3 |
| 7 | 1 | 3 | 1 | 3 | 2 |
| 8 | 2 | 1 | 2 | 1 | 3 |
| 9 | 3 | 1 | 3 | 1 | 2 |
| 10 | 1 | 2 | 1 | 2 | 1 |
| 11 | 2 | 1 | 2 | 1 | 1 |
| 12 | 1 | 3 | 2 | 3 | 1 |
| 13 | 2 | 3 | 1 | 3 | 1 |
| 14 | 3 | 1 | 3 | 2 | 1 |
| 15 | 3 | 2 | 3 | 1 | 1 |
| 16 | 1 | 2 | 1 | 2 | 3 |
| 17 | 2 | 1 | 2 | 1 | 3 |
| 18 | 1 | 3 | 1 | 3 | 2 |
| 19 | 3 | 1 | 3 | 1 | 2 | wherein:
(a) the word variation identifies each said sequence;
(b) the numerals 1, 2 and 3 in the columns identified as Component I ligand-containing reactant, Component II transition metal reactant and Component III support-activator agglomerate correspond to which of said Components is added first, second or third in each said reaction sequence;
(c) appearance of the same numeral for more than one Component means that such Components are added substantially simultaneously;
(d) MCN = metallocene;
(e) CG = constrained geometry;
(f) BD = bidentate;
(g) TD = tridentate; and
(h) when at least one of said Components (d)–(g) inclusive is present in said addition sequence, optionally, more than one of said (d)–(g) Components can be used.

42. The process of claim 41 wherein if required by the chemical nature of L or $L^3$, an organometallic compound can be added following addition of said ligand-containing reactant and transition metal reactant pairs.

43. The process of claim 41 wherein if required by the chemical nature of L or $L^3$, an organometallic compound can optionally be added before, with or after addition of said support-activator agglomerate.

* * * * *